United States Patent
Zampieri et al.

(10) Patent No.: US 12,527,849 B2
(45) Date of Patent: Jan. 20, 2026

(54) APPARATUS FOR DETERMINING ADMINISTRATION FORM OF A COMPOSITION OF AN ENGINEERED VIRUS-BASED NANOPARTICLE FOR A TREATMENT OF AN AUTOIMMUNE CONDITION

(71) Applicant: Diamante Srl, Verona (IT)

(72) Inventors: Roberta Zampieri, Verona (IT); Linda Avesani, Verona (IT); Elisa Gecchele, Verona (IT); Valentina Garonzi, Verona (IT)

(73) Assignee: DIAMANTE SRL, Verona (IT)

( * ) Notice: Subject to any disclaimer, the term of this patent is extended or adjusted under 35 U.S.C. 154(b) by 0 days.

(21) Appl. No.: 18/386,007

(22) Filed: Nov. 1, 2023

(65) Prior Publication Data

US 2024/0148844 A1 May 9, 2024

Related U.S. Application Data

(63) Continuation-in-part of application No. PCT/EP2022/086251, filed on Dec. 15, 2022.

(60) Provisional application No. 63/289,832, filed on Dec. 15, 2021.

(30) Foreign Application Priority Data

Dec. 15, 2022 (WO) ............... PCT/EP2022/086251

(51) Int. Cl.
G16H 20/17 (2018.01)
A61K 39/00 (2006.01)
G16H 50/70 (2018.01)

(52) U.S. Cl.
CPC ......... *A61K 39/0008* (2013.01); *G16H 20/17* (2018.01); *G16H 50/70* (2018.01); *A61K 2039/5258* (2013.01); *A61K 2039/54* (2013.01); *A61K 2039/542* (2013.01)

(58) Field of Classification Search
CPC ............ C07K 14/001; C07K 14/005; C07K 2319/00; C07K 14/705; C12N 2750/14122; C12N 2750/14143; C12N 15/86; A61K 2039/5258; A61K 35/76; A61K 39/0005; A61K 9/0019; A61K 39/0008; A61K 2039/542; A61P 37/00; C12Y 207/10002; G16H 20/10
See application file for complete search history.

(56) References Cited

U.S. PATENT DOCUMENTS

| | | |
|---|---|---|
| 2006/0216238 A1 | 9/2006 | Manchester et al. |
| 2007/0128213 A1 | 6/2007 | Rasochova et al. |
| 2008/0124358 A1 | 5/2008 | Brennan |
| 2021/0220480 A1 | 7/2021 | Peyman |
| 2021/0275651 A1 | 9/2021 | Steinmetz et al. |
| 2021/0284699 A1 | 9/2021 | Gradinaru et al. |

FOREIGN PATENT DOCUMENTS

| | | |
|---|---|---|
| WO | WO2009035494 A2 | 3/2009 |
| WO | WO2018208828 A1 | 11/2018 |
| WO | WO2021108202 A1 | 6/2021 |
| WO | WO2023111224 | 6/2023 |

OTHER PUBLICATIONS

Wang et al. The Plant Cell, vol. 29, pp. 1678-1696, Jul. 2027.*
Zapier et al. Science Advantage Research Article, May 2020, vol. 6, p. 2020, vol. 6, pp. 1-10.*
Aulakh et al. Plant, Physiology , 2019, vol. 180, pp. 1763-1974.*
Zampieri et al; "Prevention and Treatment of Autoimmune Diseases with Plant Virus Nanoparticles", May 6, 2020; Retrieved on Oct. 22, 2021 from: https://www.science.org/doi/10.1126/sciadv.aaz0295.
Grasso et al; "A Plant Derived Multifunctional Tool for Nanobiotechnology Based on Tomato Bushy Stunt Virus", Oct. 30, 2012; Retrieved on Oct. 22, 2021 from: https://link.springer.com/article/10.1007%2Fs11248-012-9663-6.
Bason et al; "Identification of a Novel Serological Marker in Seronegative Rheumatoid Arthritis Using the Peptide Library Approach", Oct. 5, 2021; Retrieved on Oct. 22, 2021 from: https://www.frontiersin.org/articles/10.3389/fimmu.2021.753400/full.
Kumar et al; "Tomato Bushy Stunt Virus (TBSV), a Versatile Platform for Polyvalent Display of Antigenic Epitopes and Vaccine Design", Apr. 2, 2009; Retrieved on Oct. 22, 2021 from: https://www.sciencedirect.com/science/article/pii/S0042682209001731?via%3Dihub.
Zampieri et al; International Search Report; PCT/EP2022/086251; May 30, 2023.

* cited by examiner

*Primary Examiner* — Bao Q Li
(74) *Attorney, Agent, or Firm* — Wiggin and Dana LLP

(57) ABSTRACT

An apparatus and method for determining administration form of a composition of an engineered virus-based nanoparticle for a treatment of an autoimmune condition are disclosed. The apparatus includes at least a processor and a memory communicatively connected to the at least a processor, wherein the memory contains instructions configuring the at least a processor to obtain administration data, wherein the administration data comprises a plurality of administrations of a composition of an engineered virus-based nanoparticle for a treatment of an autoimmune condition, compare the administration data and determine a critical administration as a function of the comparison.

19 Claims, 21 Drawing Sheets

Specification includes a Sequence Listing.

FIG. 3

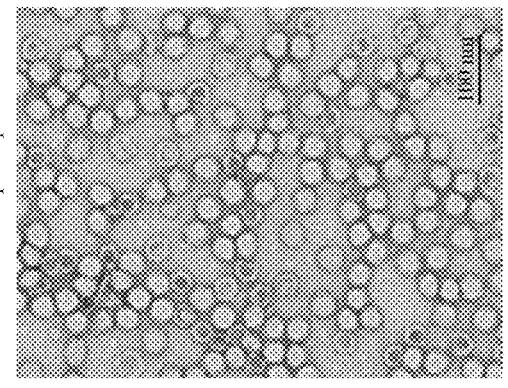
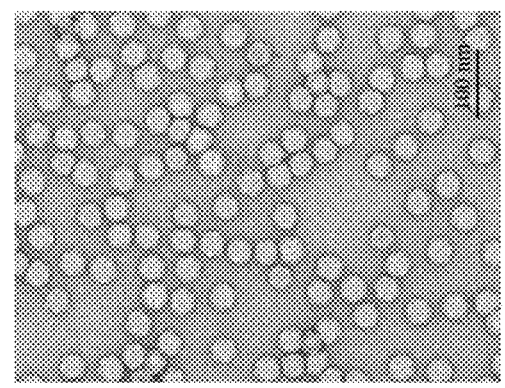
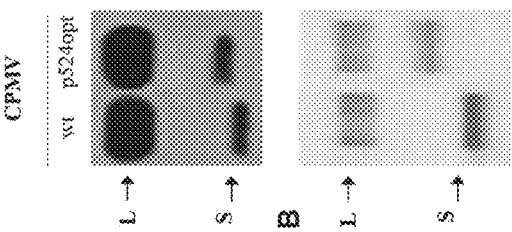
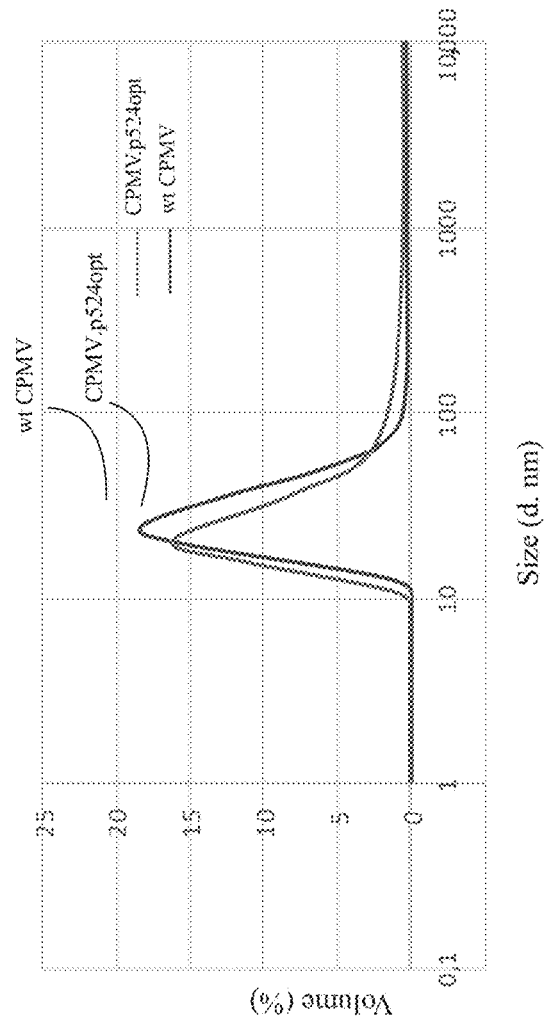
FIG. 4A  FIG. 4B  FIG. 4C  FIG. 4D  FIG. 4E

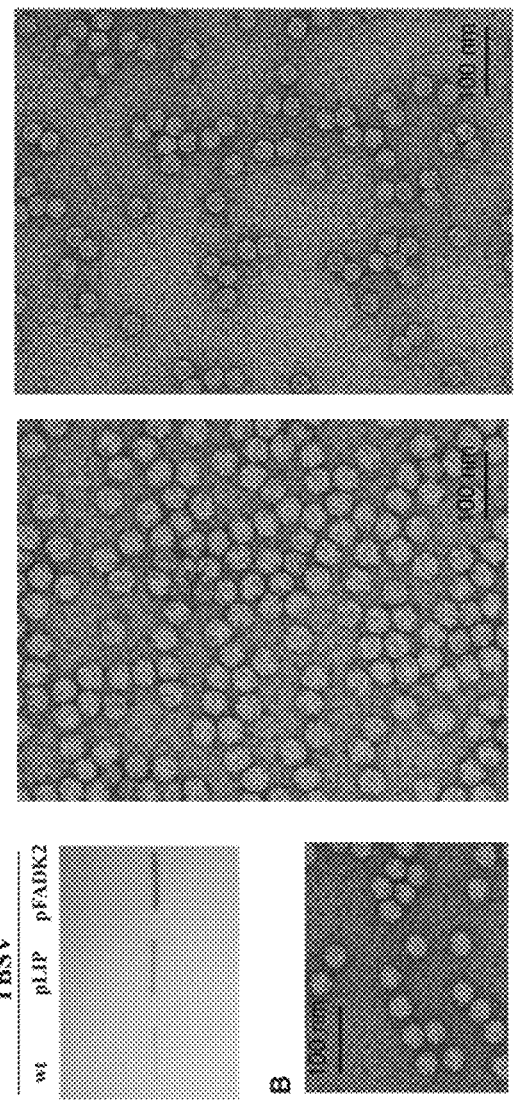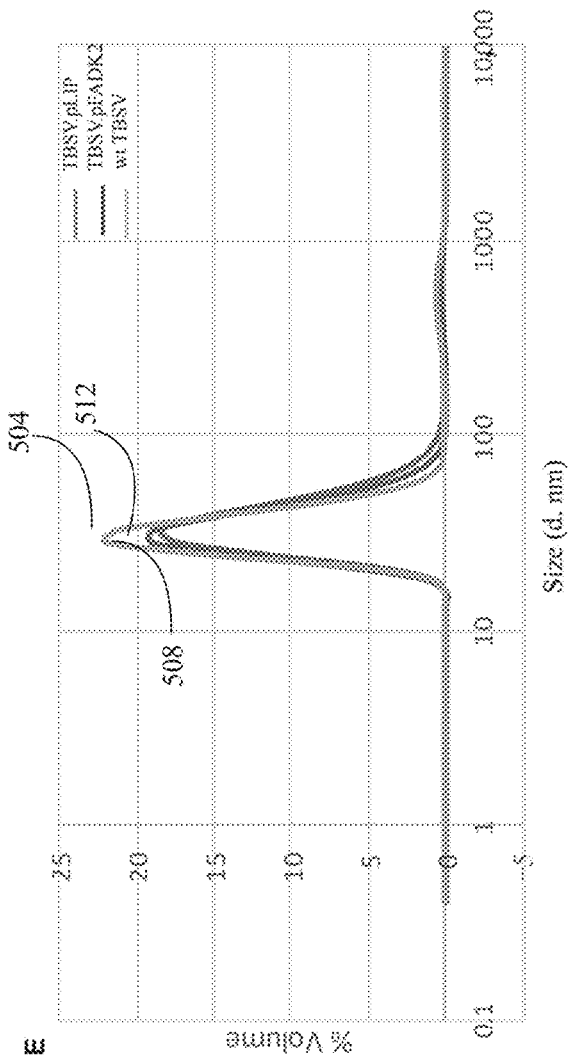
FIG. 5A FIG. 5B FIG. 5C FIG. 5D FIG. 5E

APPARATUS FOR DETERMINING ADMINISTRATION FORM OF A COMPOSITION OF AN ENGINEERED VIRUS-BASED NANOPARTICLE FOR A TREATMENT OF AN AUTOIMMUNE CONDITION

CROSS-REFERENCE TO RELATED APPLICATIONS

This application is a continuation in part of Patent Cooperation Treaty Application No. PCT/EP2022/086251, filed on Dec. 15, 2022, and entitled "APPARATUS FOR DETERMINING ADMINISTRATION FORM OF A COMPOSITION OF AN ENGINEERED VIRUS-BASED NANOPARTICLE FOR A TREATMENT OF AN AUTOIMMUNE CONDITION," which claims the benefit of priority of U.S. Provisional Application Ser. No. 63/289,832, filed on Dec. 15, 2021, and entitled "COMPOSITION OF MATTER AND METHODS OF AN ENGINEERED VIRUS-BASED NANOPARTICLE FOR THE TREATMENT OF RHEUMATOID ARTHRITIS," each of which are incorporated by reference herein in their entirety.

FIELD OF THE INVENTION

The present invention generally relates to the field of autoimmune disease. In particular, the present invention is directed to an apparatus for determining administration form of a composition of an engineered virus-based nanoparticle for a treatment of an autoimmune condition.

BACKGROUND

Currently, more than 1.3 million people in the U.S. suffer from autoimmune diseases, such as rheumatoid arthritis. Plant viruses combined with peptides have been proven to help such autoimmune diseases in animals. Plant viruses are natural, self-assembling nanostructures with versatile and genetically programmable shells, making them useful in diverse applications. The design and synthesis of plant virus nanoparticles displaying peptides associated with an autoimmune condition can help prevent or treat autoimmune disease.

SUMMARY OF THE DISCLOSURE

In an aspect, an apparatus for determining administration form of a composition of an engineered virus-based nanoparticle for a treatment of an autoimmune condition is disclosed. The apparatus includes at least a processor and a memory communicatively connected to the at least a processor, wherein the memory contains instructions configuring the at least a processor to obtain administration data, wherein the administration data comprises a plurality of administrations of a composition of an engineered virus-based nanoparticle for a treatment of an autoimmune condition, compare the administration data and determine a critical administration as a function of the comparison.

In another aspect, a method for determining administration form of a composition of an engineered virus-based nanoparticle for a treatment of an autoimmune condition is disclosed. The method includes obtaining, using at least a processor, administration data, wherein the administration data includes a plurality of administrations of a composition of an engineered virus-based nanoparticle for a treatment of an autoimmune condition, comparing, using the at least a processor, the administration data and determining, using the at least a processor, a critical administration as a function of the comparison.

In another aspect, a composition of an engineered virus-based nanoparticle for a treatment of an autoimmune condition is disclosed. The composition includes a plant virus-based particle engineered to express at least a peptide associated with an autoimmune condition, wherein the plant virus-based particle comprises a plurality of administrations and a nanoparticle and a buffer.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein:

FIG. 3 illustrates an exemplary embodiment of a method of manufacturing an engineered virus-based nanoparticle for the treatment of an autoimmune condition;

FIGS. 4A-4E are illustrations that depict the characterization of wt CPMV (Cow pea mosaic virus) and CPMV·p524opt;

FIGS. 5A-5E are illustrations that depict the characterization of wt TBSV (tomato bush stunt virus), TBSV (tomato bush stunt virus)·plip1 (*Liprin alpha* 1) and TBSV (tomato bush stunt virus)·pFADK2 (focal adhesion kinase 2);

FIG. 10E illustrates pro-inflammatory cytokines evaluations in sera of CIA Collagen mice;

DETAILED DESCRIPTION

At a high level, aspects of the present disclosure are directed to apparatus and method for determining administration form of a composition of an engineered virus-based nanoparticle for a treatment of an autoimmune condition is disclosed. The apparatus includes at least a processor and a memory communicatively connected to the at least a processor, wherein the memory contains instructions configuring the at least a processor to obtain administration data, wherein the administration data includes a plurality of administrations of a composition of an engineered virus-based nanoparticle for a treatment of an autoimmune condition and a plurality of administration results associated with the plurality of administrations, classify the administration data into one or more administration groups as a function of the plurality of administrations, generate an autoimmune score of the one or more administration groups as a function of the plurality of administration results and determine a critical administration as a function of the autoimmune score. Exemplary embodiments illustrating aspects of the present disclosure are described below in the context of several specific examples.

Figure 1:
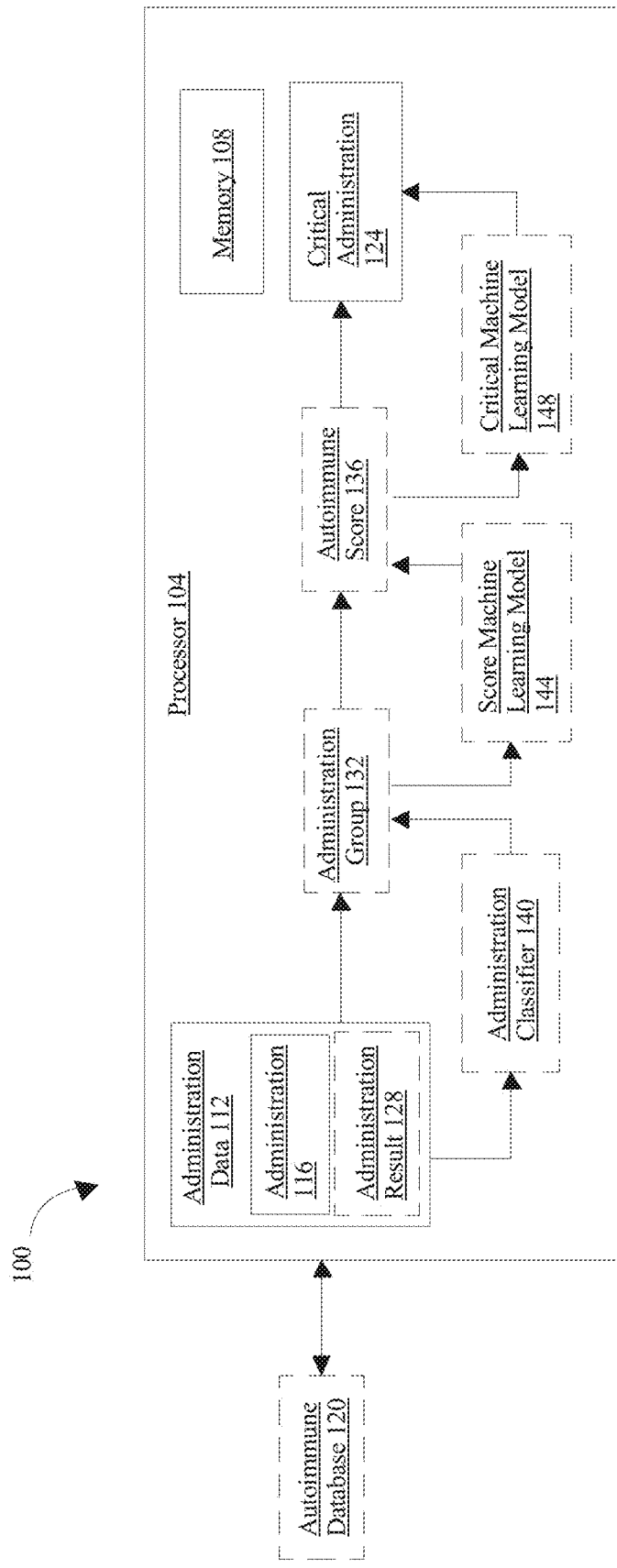
FIG. 1 is a block diagram illustrating an exemplary embodiment of an apparatus for determining administration form of a composition of an engineered virus-based nanoparticle for a treatment of an autoimmune condition.

Now referring to the drawings, FIG. 1 illustrates an exemplary embodiment of an apparatus 100 for determining administration form of a composition of an engineered virus-based nanoparticle for a treatment of an autoimmune condition. Apparatus 100 may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Apparatus 100 may include a single computing device operating independently, or may include two or more computing device operating in concert, in parallel, sequentially or the like; two or more computing devices may be included together in a single computing device or in two or more computing devices. Apparatus 100 may interface or communicate with one or more additional devices as described below in further detail via a network interface device. Network interface device may be utilized for connecting apparatus 100 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Apparatus 100 may include but is not limited to, for example, a computing device or cluster of computing devices in a first location and a second computing device or cluster of computing devices in a second location. Apparatus 100 may include one or more computing devices dedicated to data storage, security, distribution of traffic for load balancing, and the like. Apparatus 100 may distribute one or more computing tasks as described below across a plurality of computing devices of computing device, which may operate in parallel, in series, redundantly, or in any other manner used for distribution of tasks or memory between computing devices. Apparatus 100 may be implemented using a "shared nothing" architecture in which data is cached at the worker, in an embodiment, this may enable scalability of apparatus 100 and/or computing device.

With continued reference to FIG. 1, apparatus 100 may be designed and/or configured to perform any method, method step, or sequence of method steps in any embodiment described in this disclosure, in any order and with any degree of repetition. For instance, apparatus 100 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Apparatus 100 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, as used in this disclosure, an "autoimmune disease" is a condition arising from an abnormal immune response to a functioning body part. As a non-limiting example, autoimmune disease may include rheumatoid arthritis (RA), type 1 diabetes mellitus (TID), systemic lupus erythematosus (SLE), multiple sclerosis (MS), Hashimoto's thyroiditis, celiac disease, and the like. As used in this disclosure, an "immune response" is a reaction which occurs within an organism for the purpose of defending against invaders. As a non-limiting example, the invader may include a wide variety of different microorganisms, such as without limitation, viruses, bacteria, parasites, fungi, and the like, which could cause serious problems to the health of the host organism if not cleared from the body. As used in this disclosure, "rheumatoid arthritis," also called "RA" is an autoimmune disease that can cause joint pain and damage throughout your body. It typically results in swollen and painful joints. The wrist and hands may be involved, with the same joints typically involved on both sides of the body. RA may also affect other parts of the body, including skin, eyes, lungs, heart, nerves and blood. This may result in a low red blood cell count, inflammation around the lungs, and inflammation around the heart. Fever and low energy may also be present. Often, symptoms of RA may come on gradually over weeks to months. In an embodiment, a blood test that identifies the presence of rheumatoid factor (RF) may be performed to diagnose RA. In another embodiment, a blood test that identifies the presence of anti-cyclic citrullinated peptides (anti-CCP) may be performed to diagnose RA. In an embodiment, when the result of the blood test comes back positive for RF and/or anti-CCP, it may indicate seropositive RA. In an embodiment, when the result of the blood test comes back negative for RF and/or anti-CCP, but there are signs and symptoms of RA, it may indicate seronegative RA. In some embodiments, a patient with a seronegative RA may have a more active form of the disease and slower treatment response compared to a patient with a seropositive RA. The goals of a treatment using the composition may be to reduce pain, decrease inflammation, treat rheumatoid arthritis, alleviate symptoms of RA, prevent RA, and improve a person's overall functioning. As a non-limiting example, the composition may be designed to help reduce the symptoms of RA and treat RA. The composition includes at least an immunodominant peptide that is engineered to be expressed through a plant virus-based particle. The composition also includes sodium acetate and/or PBS buffer. The composition may be applied, studied, and/or used for the treatment of rheumatoid arthritis. In an embodiment, the composition may act as a carrier. In another embodiment, the composition may act as an adjuvant.

With continued reference to FIG. 1, apparatus 100 includes at least a processor 104 and a memory 108 communicatively connected to processor 104, wherein memory 108 contains instructions configuring processor 104 to obtain administration data 112. As used in this disclosure, "communicatively connected" means connected by way of a connection, attachment, or linkage between two or more relata which allows for reception and/or transmittance of information therebetween. For example, and without limitation, this connection may be wired or wireless, direct, or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio, and microwave data and/or signals, combinations thereof, and the like, among others. A communicative connection may be achieved, for example and without limitation, through wired or wireless electronic, digital, or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of an apparatus 100. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure. Apparatus 100 may include, be included in, and/or communicate with a mobile device such as a mobile telephone or smartphone.

With continued reference to FIG. 1, administration data 112 includes a plurality of administrations 116 of a composition of an engineered virus-based nanoparticle for a treatment of an autoimmune disease. As used in this disclosure, "administration data" is data related to administrating of a composition of an engineered virus-based nanoparticle for a treatment of an autoimmune condition. For the purposes of this disclosure, a "composition" is a substance consisting of two or more substances mixed together. Composition disclosed herein is further described detail. As used in this disclosure. "administration" is the way by which a drug, fluid, poison, or other substance is taken into the body. In an embodiment, administration 116 may include oral dosage. In this disclosure, "oral dosage" is ingestion of a composition through the mouth. As a non-limiting example, the oral dosage may include use of pills, syrup, tablet, thin film, liquid solution, powder, solid crystals, natural or herbal plant, seeds, or food, pastes, or the like. In another embodiment, administration 116 may include intravenous injection. As used in this disclosure, "intravenous injection" is an injection of a medication or another substance into a vein and directly into the bloodstream. The intravenous injection may be given intravenously in any suitable manner, including as a bolus and/or as an infusion. In another embodiment, administration 116 may include intraperitoneal injection. As used in this disclosure, "intraperitoneal injection" is the injection of a substance into the peritoneum. In another embodiment, administration 116 may include subcutaneous injection. As used in this disclosure, a "subcutaneous injection" is the injection that is given in the fatty tissue, just under the skin. In some embodiments, administration 116 may include intramuscular, transdermal, implantable, nasal administration, or the like. Persons skilled in the art, upon reviewing the entirety of this disclosure, may appreciate various administrations may be used in apparatus 100. In some embodiments, administration data 112 may be stored in autoimmune database 120. In some embodiments, administration data 112 may be retrieved from autoimmune database 120. Autoimmune database 120 disclosed herein is further described below.

With continued reference to FIG. 1, in some embodiments, administration data 112 may include administration form, administration frequency, dosage, dosage type, and the like. For the purposes of this disclosure, an "administration form" is a physical form of a composition of an engineered virus-based nanoparticle for a treatment of an autoimmune condition. As a non-limiting example, administration form may include tablet, capsule, liquid, aerosols, powders, or the like. For the purposes of this disclosure, an "administration frequency" is a rate at which administration of a composition of an engineered virus-based nanoparticle for a treatment of an autoimmune condition is given. As a non-limiting example, administration frequency may include hourly, daily, weekly, or monthly intervals. For example, and without limitation, administration frequency may include once a day, twice a day, every 2 hours, or the like. As another non-limiting example, administration frequency may include two administrations 116 spaced 2 weeks apart, seven administrations 116 spaced 1 month apart, or the like. For the purposes of this disclosure, a "dosage" is amount of a composition of an engineered virus-based nanoparticle for a treatment of an autoimmune condition determined for a subject. For the purposes of this disclosure, a "subject" is an animal that is getting administration of a composition of an engineered virus-based nanoparticle for a treatment of an autoimmune condition. As a non-limiting example, subject may include a mouse, a fish, a rabbit, human, and the like. In some embodiments, dosage may include milligrams (mg), micrograms (μg), or any units thereof. In some embodiments, dosage may include any amount of composition. As a non-limiting example, dosage may include 50 μg. As another non-limiting example, dosage may include 30 μg, or the like. For the purposes of this disclosure, an "dosage type" is method delivering a dosage of a composition of an engineered virus-based nanoparticle for a treatment of an autoimmune condition. As a non-limiting example, dosage type may include intermittent drip, continuous drip, or the like.

With continued reference to FIG. 1, in an embodiment, composition may be administered with an adjuvant. As a non-limiting example, composition may include focal adhesion kinase 2 (pFADK2 with incomplete Freund's adjuvant (IFA)(pFADK2±'FA), *Liprin alpha* 1 (pLip1) with IFA (pLip1+IFA) In this disclosure, an "adjuvant" is a substance that enhances the body's response to an antigen. In another embodiment, composition may be administered without adjuvant. In some embodiments, administration 116 may include one or more administrations 116. As a non-limiting example, administration 116 may include any numerical numbers of administrations 116, and the like. In some embodiments, administration 116 may include a dosage. As used in this disclosure, a "dosage" is the amount of a medicine or drug. As a non-limiting example, the dosage may include 10 ug, 18 ug, 30 ug, 50 ug, 75 ug, and the like.

With continued reference to FIG. 1, in some embodiments, administration 116 may be done to an animal. As a non-limiting example, the animal may include a mouse, a fish, a rabbit, human, and the like. As a non-limiting example, administration 116 of composition of the engineered virus-based nanoparticle for a treatment of an autoimmune condition may be done to dilute, brown, and non-agouti (DBA) mice based on their susceptibility to collagen-induced arthritis (CIA). Female DBA/1 mice 6 to 8 weeks of age may be maintained under specific pathogen-free conditions. CIA may be induced by the intradermal tail base injection of 100 μg of chicken type II collagen (Sigma-Aldrich) as previously described. Five mice per group may be immunized on days 0 and 21 to induce arthritis. The onset of disease may be confirmed on the day that swelling or erythema may be observed in any paw, typically 4 to 10 days after the second immunization. Each experimental group may be treated seven times, 5 days apart, starting from day 28 after the first immunization, with intraperitoneal injections of saline (200 μl per mouse), TBSV·pLIp1, TBSV·pFADK2, pLIp1+IFA, and pFADK2+IFA (all 50 μg per mouse in 200 μl) or dexamethasone (5 μg per mouse in 200 μl). A healthy nonimmunized group (n=5) may be included as a control. CIA may be assessed using a macroscopic score system based on the visual identification of arthritic limbs. The clinical severity of arthritis may be evaluated as follows: Each mouse may be inspected every 2 to 3 days for three different parameters: (i) swelling of the hind ankle and foot, measured with calipers; (ii) erythema of each leg; and (iii) swelling of the fingers. Each of these parameters may be assessed by severity and was graded from 0 to 4 as shown in Tables 2-4. The RA index for each mouse was expressed as the mean of the three scores from the individual parameters. At the end of the experiment (60 days), we determined the proportion of CD25+Foxp3+ cells in the lymph nodes and measured cytokine titers in the lymph nodes, joints, and serum.

With continued reference to FIG. 1, as another non-limiting example, administration 116 of composition of the engineered virus-based nanoparticle for a treatment of an autoimmune disease may be done to nonobese diabetic (NOD) mice. In another non-limiting example, administration 116 of composition of the engineered virus-based nanoparticle for a treatment of an autoimmune disease may be done to any animal disclosed in this disclosure, such as but not limited to a human. Four-week-old female NOD mice may be obtained from Charles River Laboratories and may be housed under specific pathogen-free conditions in the animal facility at the University of Perugia, with ad libitum access to water and food. NOD mice may be randomly subdivided into four groups. In group 1 (n=18), CPMV·p524opt [50 μg per mouse, resuspended in 100 μl of phosphate-buffered saline (PBS)] may be injected twice intraperitoneally, with 2 weeks between doses. In group 2 (n=20), wild-type CPMV particles (50 μg per mouse, resuspended in 100 μl of PBS) may be administered with the same schedule. In group 3 (n=15), synthetic peptide p524 (50 μg per mouse, resuspended in 100 μl of PBS plus IFA) may be administered with the same schedule. In group 4 (n=15), the same schedule and dosing may be used for synthetic peptide p524opt. Another group of NOD mice (n=14) may receive a single dose of CPMV·pS24 (50 μg per mouse, resuspended in 100 μl of PBS). A control group may be left untreated (n=20). Mice may be monitored for the appearance of clinical signs of diabetes and may be euthanized when the disease was confirmed by glucosuria. In some embodiments, composition may include any doses that can be used for administration 116 of composition of the engineered virus-based nanoparticle for a treatment of an autoimmune disease. In a non-limiting example, composition may be configured to be administered to a human. In some embodiments, a set of doses for human may be greater than 5-fold higher than a set of doses for NOD mice. n some embodiments, a set of doses for human may be greater than 7-fold higher than a set of doses for NOD mice. n some embodiments, a set of doses for human may be greater than 9-fold higher than a set of doses for NOD mice. In some embodiments, a set of doses for human may be 10-fold higher than a set of doses for NOD mice.

With continued reference to FIG. 1, composition of an engineered virus-based nanoparticle for a treatment of an autoimmune disease may include a plant virus-based particle. In this disclosure, a "plant virus-based particle" is a particle of a virus that infects plants; in some embodiments, such virus may be unable to infect or otherwise harm animals such as mammals. In some embodiments, plant virus-based particle may include, be included in, comprise, or be a nanoparticle. As used in this disclosure, a "nanoparticle" is a particle of matter that is between 1 and 100 nanometers (nm) in diameter. In some embodiments, the plant virus-based particle may be negatively charged. The negatively charged plant virus-based particle may help to bind two major histocompatibility complex class II antigen chains. Thus it may improve its stability. In an embodiment, plant virus-based particle may be used to deliver drugs. In another embodiment, plant virus-based particle may be used to image molecules to particular target cells. In some embodiments, a plant virus-based particle may be used to display and/or deliver peptides. Peptides may include, without limitation, antigens. As used in this disclosure, an "antigen" is a molecule or molecular structure or any foreign particulate matter or a pollen grain that can bind to a specific antibody or T-cell receptor. As used in this disclosure, a "antibody" is a protein used by the immune system to identify and neutralize invaders. In some embodiments, the presence of the antigen in a mammal body may trigger an immune response. In some embodiments, a plant virus-based particle may be configured and/or modified to display epitopes. As used in this disclosure, an "epitope" is a part of an antigen that is recognized by the immune system. As a non-limiting example, the epitope may be recognized by the antibodies, B cells, T cells, and the like. In some embodiments, a plant virus-based particle may include immunomodulatory effect. As used in this disclosure, an "immunomodulatory effect" is an effect of modulating the immune system. As a non-limiting example, a plant virus-based particle may modulate the immune system to induce tolerance and therefore prevent autoimmune disease, such as without limitation RA or type 1 diabetes. As a non-limiting example, a plant virus-based particle may modulate the immune system to induce tolerance and therefore treat autoimmune disease, such as without limitation RA, type 1 diabetes mellitus, and/or the like.

With continued reference to FIG. 1, in an embodiment, a plant virus-based particle may include icosahedral structure. As used in this disclosure, an "icosahedron" is a geometric shape with 20 sides, each composed of an equilateral triangle. In another embodiment, plant virus-based particle may include filamentous structure. In some embodiments, plant virus-based particle may include rod-shaped structure. In some embodiments, plant virus-based particle may include helical capsid structure. In some embodiments, plant virus-based particle may include a spherical structure. Additionally without limitation, plant virus-based particle may include any structure thereof. In some embodiments, a plurality of plant virus-based particles may be homogeneous in size. In some embodiments, the plurality of plant virus-based particles may be homogeneous in shape.

With continued reference to FIG. 1, plant virus-based particle, in some embodiments, plant virus-based particle may be engineered from a host plant. As a non-limiting example, the host plant may include *Nicotiana benthamiana* plant, a *Cycorium intybus* plant, a *Brassica oleracea* var. *capitata* plant, a *Beta vulgaris* var *cicla* plant, a *Ocimum basilicum* plant, a red beet plant, or a spinach plant, and the like. As used in this disclosure, a "*Nicotiana benthamiana* plant" is a plant that is close relative of tobacco and species of *Nicotiana* indigenous to Australia and used for "pharming" of monoclonal antibodies and other recombinant proteins. As used in this disclosure, a "*Cycorium intybus* plant" is a hardy plant widely used in folklore medicine to treat various ailments ranging from wounds to diabetes. In some embodiments, the *Cycorium intybus* plant may include antimicrobial, anthelmintic, antimalarial, hepatoprotective, antidiabetic, gastroprotective, anti-inflammatory, analgesic, antioxidant, tumor-inhibitory, and antiallergic activities. The *Brassica oleracea* var. *capitata* plant in its uncultivated form is called wild cabbage. Some cultivated versions include cabbage, broccoli, cauliflower, kale, brussels sprouts, collard greens, savoy cabbage, kohlrabi and gai lan. As used in this disclosure, a "*Beta vulgaris* var *cicla* plant" is a plant that originated from the Mediterranean. The *Beta vulgaris* var *cicla* plant may include medicinal properties. As a non-limiting example, the medicinal properties may include boosting immune system and/or lowering blood pressure. As used in this disclosure, a "*Ocimum basilicum* plant" is a plant that is in the Lamiaceae (mint) family. The red beet plant shows some promising medicinal uses, such as the phytochemicals present in red beet provide protection against diseases including cancer and cardiovascular diseases. In some embodiments, the plant virus-based may be extracted from a spinach plant. As used in this disclosure, a "spinach plant" is a leafy green that belongs to the amaranth family.

With continued reference to FIG. 1, plant virus-based particle may include one or more viruses. As a non-limiting example, the one or more viruses may include tomato bush stunt virus, cowpea mosaic virus, and/or any combination thereof. In this disclosure, a "tomato bushy stunt virus," also called "TBSV" is a plant virus from the tombusvirus group primarily infecting vegetable crops that causes stunting of growth, leaf mottling, and deformed or absent fruit in the plants infected. The structure of tomato bush stunt virus may include a single-stranded RNA virus with a linear genome of about 4,800 nucleotides. Tomato bush stunt virus may also possess three symmetrically distinct coat protein monomers. The tomato bush stunt virus may be icosahedral. In some embodiments, TBSV may be produced as an infectious virus. The TBSV may include 30-nm capsid, comprising 180 subunits of a single capsid protein tomato bush stunt virus may replicate, without limitation, using cytoplasmic replication. This virus may penetrate a host cell by uncoating and releasing viral RNA into cytoplasm. Tomato bush stunt virus may also spread indirectly, such as without limitation through water, soil, and/or infected seeds. When engineered to express peptides, behavior of tomato bush stunt virus may experience one or more modifications, such as without limitation a decrease in virus concentration, infection percent, and/or disease severity. In some embodiments, the TBSV may be used to reduce the severity of RA.

With continued reference to FIG. 1, as used in this disclosure, a "cowpea mosaic virus," also called "CPMV," which may also be known as a "Sunn-hemp mosaic virus," is a non-enveloped plant virus of the comovirus group, infection of a susceptible cowpea leaf causes a "mosaic" pattern in the leaf, and results in high virus yields. Cowpea mosaic virus genome may include 2 molecules of RNA which are separately encapsulated. In some embodiments, the virus particles of cowpea mosaic virus may be approximately 30 nm in diameter. In some embodiments, the virus particles of cowpea mosaic virus may include 60 copies each of a Large (L) and Small (S) coat proteins. In some embodiments, the cowpea mosaic viral particles may be thermostable. The cowpea mosaic viral particles may be isolated readily from plants.

With continued reference to FIG. 1, plant virus-based particle may be engineered to express at least an immunodominant peptide. As used in this disclosure, an "immunodominant peptide" is a peptide that is a representative epitope of a protein antigen given to the immune system. As a non-limiting example, immunodominant peptide may include p524opt, pLIp1, pFADK2, and/or the like. In some embodiments, pLIp1 and pFADK2 may be cytoplasmically located proteins. As used in this disclosure, "cytoplasmically located" indicates a protein located in cytoplasm of a cell. In some embodiments, a coat protein of a plant based-virus particle 104 may be engineered to display immunodominant peptides 104. As used in this disclosure, a "coat protein" is any protein that is a constituent of the capsid of a virus. As used in this disclosure, a "capsid" is a protein shell that surrounds and protects the viral genome. In some embodiments, at least an immunodominant peptide may be fused to a protein of the tomato bushy stunt virus. As a non-limiting example, pLIp1, pFADK2 may be fused to TBSV. For instance, and without limitation, composition may include TBSV·pLIp1, TBSV·FADK2, or the like. As another non-limiting example, p524 and/or p524opt may be fused to CPMV. For example, and without limitation, composition may include CPMV·p524opt, CPMV·p524 and/or any combination thereof. In some embodiments, composition may include wild type virus. As a non-limiting example, composition may include wild type TBSV (wt TBSV), wild type CPMV (wt CPMV), or the like. As used in this disclosure, a "wild type virus," is the naturally occurring, non-mutated strain of a virus. In some embodiments, the presence of the immunodominant peptide may reduce the yield of the plant based-virus particles in plants. As a non-limiting example, the presence of pS24opt may reduce the yield of the CPMV particles. In some embodiments, the presence of the immunodominant peptide may improve the yield of the plant based-virus particles in plants. As a non-limiting example, the presence of pLIp1 may improve the yield of TBSV.

With continued reference to FIG. 1, in some embodiments, composition may include sodium acetate. In this disclosure, "sodium acetate" is organic sodium salt. It also can be known as acetic acid, sodium salt, sodium acetate anhydrous, or acetic acid sodium salt. Sodium acetate is the anhydrous, sodium salt form of acetic acid. Sodium acetate anhydrous disassociates in water to form sodium ions (Na+) and acetate ions. Sodium may be a principal cation of extracellular fluid and may play a large part in fluid and electrolyte replacement therapies. Sodium acetate may be used as an electrolyte replenisher in isosmotic solution for parenteral replacement of acute losses of extracellular fluid without disturbing normal electrolyte balance. Sodium acetate may include a hygroscopic powder. In some embodiments, a solution of sodium acetate and acetic acid may act as a buffer to keep a relatively constant pH level. This may be useful in biochemical applications where reactions are pH-dependent in a mildly acidic range. In this case, the sodium acetate may be used to titrate the composition to change its pH, which is further explained below in reference to FIG. 2. In some embodiments, composition may include sodium bicarbonate. As used in this disclosure, "sodium bicarbonate" is a chemical compound that is a salt composed of a sodium cation and a bicarbonate anion. Sodium bicarbonate may break down to form sodium and bicarbonate in water. Sodium bicarbonate may be able to neutralize acid.

With continued reference to FIG. 1, in some embodiments, composition may include a phosphate-buffered saline (PBS) buffer. In another non-limiting example, composition may include PBS puffer with IFA (PBS+IFA). In this disclosure, a "PBS buffer" is a water-based salt buffer solution. In some embodiments, PBS buffer may include disodium hydrogen phosphate N, sodium chloride, potassium chloride, potassium dihydrogen phosphate, and the like. PBS buffer may help to maintain a constant pH. As a non-limiting example, PBS buffer may maintain the pH of the composition. Osmolarity and ion concentrations may be isotonic. PBS buffer is further explained herein with reference to FIG. 2. In some embodiments, composition may include normal saline buffer. As used in this disclosure, a "normal saline" is an aqueous solution of electrolytes and other hydrophilic molecules. Normal saline buffer may include pH level of 5.5. In some embodiments, composition may include sodium bicarbonate buffer. Sodium bicarbonate may include pH level of 8.5. Sodium bicarbonate may be used in conjunction with acetic acid to lower pH level and create a buffer. In some embodiments, composition may include 4-(2-hydroxyethyl)-1-piperazineethanesulphonic acid (HEPES) buffer. As used in this disclosure, "HEPES" is a zwitterionic sulfonic acid buffering agent. In some cases, the HEPES buffer may include more pH maintenance power than phosphate-buffered saline.

With continued reference to FIG. 1, in some embodiments, composition may include one or more anti-rheumatic-ingredients. An "anti-rheumatic ingredient," as used in this disclosure, is any medication used to treat and/or prevent rheumatoid arthritis. An anti-rheumatic ingredient may include a non-steroidal anti-inflammatory drug (NSAID), a corticosteroid, methotrexate, hydroxychloroquine, sulfasalazine, leflunomide, a tumor necrosis factor inhibitor, a T-cell costimulatory blocking agent, a B-cell depleting agent, an Interleukin-1 receptor antagonist therapy, and/or any other immunomodulatory and/or cytotoxic agent. In some embodiments, composition may include dexamethasone. For the purposes this disclosure. "dexamethasone" is a corticosteroid medication that belongs to the glucocorticoid class of drugs.

With continued reference to FIG. 1, additionally without limitation, Table 1 shows an exemplary method of administering a composition of an engineered virus-based nanoparticle for a treatment of an autoimmune condition using a plurality of administrations 116 that can be compared to determine a critical administration 124. Critical administration 124 disclosed herein is further described below. Q5D represents administration 5 days a part. TBSV·pLIp1 and wt TBSV shown in Table 1 may include liquid form that are not sterile and stored in −20° C. TBSV·pLIp1 may be given at the dose of 50 µG/100 µL Male DBA/1J mice (8 weeks; Envigo, Italy) may be used for these studies. Mice may be housed in individual cages (two for each group) and maintained under a 12:12 light-dark cycle at 21° C.±1° C. and 50%±5% humidity. The animals may be acclimated to their environment for 1 week and had ad libitum access to tap water and standard rodent diet. All animal experiments may be complied with regulations in Italy (D.M. 116192), Europe (O.J of E.C. L 358/112/18/1986), and the United States (Animal Welfare Assurance Number A5594-01, Department of Health and Human Services, USA). DBA/1J mice, except those in sham group (Group 1), may be challenged by Chicken type-II collagen with Complete Freund's adjuvant (CFA) on Day 0 (0.1 mg/0.1 mL/mouse), intradermally (ID) at the basis of the tail and boosted ID on day 21 with collagen emulsified with IFA/CFA (TBD) (0.1 mg/0.1 mL/mouse). Animals may be divided into 8 groups on Day 28 based on clinical score and/or paw volume of Group 9 so that the average score for each group is similar between groups and dosing begins on day 29. TBSV and TBSV·pLIp1 may be given by different route of administration starting from day 28, and then every 5 days until day 58 (Days 28, 33, 38, 43, 48, 53 and 58). The positive control (dexamethasone) may be administered orally. Arthritis was assessed by using qualitative severity score system and hind paw volume (mL) measured by a plethysmometer on day 20, 22, 24, 26, 28, 30, 32, 34, 36, 38, 40, 42, 44, 46 48, 50, 52, 54, 56 and 58. Body weight was recorded on day 0, 6, 13, 16, 18, 20, 22, 24, 26, 28, 30, 32, 34, 36, 38, 40, 42, 44, 46, 50, 52, 54, 56 and 58. Mice may be divided into 8 experimental groups (this part of the study was performed after a set up study in which mice may be immunized with collagen at day 0 and 21 and at days 28, 33, and 38 100 µl of water may be injected in order to assess the accessibility of the vein). The animals may be sacrificed 58 days after CIA induction.

TABLE 1

| GROUP | TEST ARTICLE | ROUTE | DOSAGE μL | μG, Dosing Regimen | MICE |
|---|---|---|---|---|---|
| 1 | Control (sham) | N/A | N/A | N/A | 10 |
| 2 | TBSV.pLIp1 | Oral (OS) | 100 | 50, Q5D, Days 28, 33, 38, 43, 48, 53, 58 | 10 |
| 3 | TBSV.pLIp1 | Subcutaneous (SC) | 100 | 50, Q5D, Days 28, 33, 38, 43, 48, 53, 58 | 10 |
| 4 | TBSV.pLIp1 | Intraperitoneal (IP) | 100 | 50, Q5D, Days 28, 33, 38, 43, 48, 53, 58 | 10 |
| 5 | TBSV.pLIp1 | Intravenous (IV) | 100 | 50, Q5D, Days 28, 33, 38, 43, 48, 53, 58 | 10 |
| 6 | wt TBSV | Oral (OS) | 100 | 50, Q5D, Days 28, 33, 38, 43, 48, 53, 58 | 10 |
| 7 | wt TBSV | Subcutaneous (SC) | 100 | 50, Q5D, Days 28, 33, 38, 43, 48, 53, 58 | 10 |
| 8 | wt TBSV | Intravenous (IV) | 100 | 50, Q5D, Days 28, 33, 38, 43, 48, 53, 58 | 10 |
| 9 | Dexamethasone | Oral (OS) | 1 mg/kg | 20 times between day 28 and 57 | 10 |
| 10 | CIA group (collagen) | N/A | N/A | N/A | 10 |

With continued reference to FIG. 1, administration data 112 may include a plurality of administration results 128. For the purposes of this disclosure, an "administration result" is an outcome of administration of composition of an engineered virus-based nanoparticle for a treatment of an autoimmune condition. As a non-limiting example, administration result 128 may include joint swelling, joint tenderness, joint range of motion, joint stiffness (morning stiffness), laboratory markers such as C-reactive protein (CRP) level, erythrocyte sedimentation rate (ESR) or inflammation markers, joint damage, erosions, joint space narrowing, erythema, heart rate, blood pressure, change in skin temperature, or the like. As another non-limiting example, administration result 128 may include immune cell inflammation, immune cell infiltration, beta cell destruction, change or damage in immune cell population, change or damage in pancreatic islets such as islet infiltration, blood glucose levels, or the like. In some embodiments, administration data 112 may be obtained using histological analysis, radiographic findings such as X-ray, magnetic resonance imaging (MRI), or ultrasound, caliper measurements, physical examinations, observations, palpations, blood tests, questionnaires, staining techniques such as immunohistochemistry, immunofluorescence analysis, two-way orthogonal partial least squares discriminant analysis (OPLS-DA), or the like. For histology and immunohistochemistry, mice may be euthanized 5, 10, and 27 weeks after treatment. The pancreas may be removed and fixed in 10% buffered formalin for 20 hours and embedded in paraffin. Sections of 5 mm may be cut 40 μm apart throughout the gland and stained with hematoxylin-eosin (Merck) to determine the insulitis score using the following grading scale: 0, intact islet; 1, peri-insulitis; 2, moderate insulitis (<50% of the islet infiltrated); and 3, severe insulitis (≥50% of the islet infiltrated). At least 15 islets per pancreas may be analyzed by two independent examiners as previously described. Some sections, after deparaffinization and rehydration through an ethanol series, were analyzed by double immunofluorescence staining for Foxp3 and insulin. The number of Foxp3+ cells within and around pancreatic islets may be determined by manual counting. In some embodiments, administration result 128 may be stored in autoimmune database 120. In some embodiments, administration result 128 may be retrieved from autoimmune database 120. Administration result 128 disclosed herein is further described with respect to FIGS. 10A-10F.

With continued reference to FIG. 1, in some embodiments, apparatus 100 may include an autoimmune database 120. As used in this disclosure, "autoimmune database" is a data structure configured to store data associated with administration of composition of an engineered virus-based nanoparticle for a treatment of an autoimmune condition. In one or more embodiments, autoimmune database 120 may include inputted or calculated information and datum related to administration of composition of an engineered virus-based nanoparticle for a treatment of an autoimmune condition. As a non-limiting example, autoimmune database 120 may store administration data 112, administration group 132, autoimmune score 136, critical administration 124, and the like. In some embodiments, a datum history may be stored in autoimmune database 120. As a non-limiting example, the datum history may include real-time and/or previous inputted data related to administration of composition of an engineered virus-based nanoparticle for a treatment of an autoimmune condition. As a non-limiting example, autoimmune database 120 may include instructions from a user, who may be an expert user, a past user in embodiments disclosed herein, or the like, where the instructions may include examples of data related to administration of composition of an engineered virus-based nanoparticle for a treatment of an autoimmune condition.

With continued reference to FIG. 1, in some embodiments, processor 104 may be communicatively connected with autoimmune database 120. For example, and without limitation, in some cases, autoimmune database 120 may be local to processor 104. In another example, and without limitation, autoimmune database 120 may be remote to processor 104 and communicative with processor 104 by way of one or more networks. The network may include, but is not limited to, a cloud network, a mesh network, and the like. By way of example, a "cloud-based" system can refer to a system which includes software and/or data which is stored, managed, and/or processed on a network of remote servers hosted in the "cloud," e.g., via the Internet, rather than on local severs or personal computers, A "mesh network" as used in this disclosure is a local network topology in which the infrastructure processor 104 connect directly, dynamically, and non-hierarchically to as many other computing devices as possible. A "network topology" as used in this disclosure is an arrangement of elements of a communication network. The network may use an immutable sequential listing to securely store autoimmune database 120. An "immutable sequential listing," as used in this disclosure, is a data structure that places data entries in a fixed sequential arrangement, such as a temporal sequence of entries and/or blocks thereof, where the sequential arrangement, once established, cannot be altered or reordered. An immutable sequential listing may be, include and/or implement an immutable ledger, where data entries that have been posted to the immutable sequential listing cannot be altered.

With continued reference to FIG. 1, in some embodiments, autoimmune database 120 may include keywords. As used in this disclosure, a "keyword" is an element of word or syntax used to identify and/or match elements to each other. For example, without limitation, the keyword may include "oral" in the instance that a user is looking for data related to oral administration of composition of an engineered virus-based nanoparticle for a treatment of an autoimmune condition. In another non-limiting example, the keyword may include "TBSV" in the instance that a user is looking for data related to tomato bushy stunt virus.

With continued reference to FIG. 1, in autoimmune database 120 may be implemented, without limitation, as a relational database, a key-value retrieval database such as a NOSQL database, or any other format or structure for use as a database that a person skilled in the art would recognize as suitable upon review of the entirety of this disclosure. Autoimmune database 120 may alternatively or additionally be implemented using a distributed data storage protocol and/or data structure, such as a distributed hash table or the like. Autoimmune database 120 may include a plurality of data entries and/or records as described above. Data entries in autoimmune database 120 may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in autoimmune database 120 may store, retrieve, organize, and/or reflect data and/or records as used herein, as well as categories and/or populations of data consistently with this disclosure.

With continued reference to FIG. 1, in some embodiments, processor 104 may receive administration data 112 from a user device. For the purposes of this disclosure, a "user device" is any device a user uses to input data. As a non-limiting example, user may input administration data 112, administration group 132, autoimmune score 136, critical administration 124, and the like. In an embodiment, user device may include a desktop, laptop, tablet, mobile phone, smart watch, or things of the like. In some embodiments, user device may include an interface configured to receive inputs from the user. In some embodiments, user may have a capability to process, store or transmit any information independently.

With continued reference to FIG. 1, in another embodiment, user device may include a wearable device. A "wearable device," as used in this disclosure, is a device on a subject of administration that collects administration data, where "on the subject" indicates that the device is portable and is either worn on the subject, inside the subject, in contact with the subject, or in close proximity to the subject. In some embodiments, administration data 112 may include data generated, collected, and/or transmitted by wearable device. As a non-limiting example, processor 104 may receive administration result 128 from wearable device. In some embodiments, wearable device in contact with subject's skin, wearable device may be placed inside and/or within subject, and/or wearable device may be adapted to be placed outside of subject but aimed at collecting data pertaining to subject. Wearable devices may be any devices capable and useful in acquiring, measuring, and/or transmitting administration data 112. As a non-limiting example, wearable device may include electrocardiography (ECG), electrooculography (EOG), bioimpedance, blood pressure and heart rate monitoring, oxygenation data, biosensors, activity tracker such as fitness band or smartwatches, smart clothing, joint monitor, continuous glucose monitoring system (CGM), or the like.

With continued reference to FIG. 1, in some embodiments, obtaining administration data 112 may further include classifying administration data 112 into one or more administration groups 132. In some embodiments, memory may contain instructions configuring processor 104 to classify administration data 112 into one or more administration groups 132. For the purposes of this disclosure, an "administration group" is a set of associative administration data. As a non-limiting example, administration group 132 may include an oral, intravenous, intraperitoneal, subcutaneous, intramuscular, transdermal, implantable, nasal group, or the like. In some embodiments, each administration group 132 may include one administration 116 and associated administration data 112. As a non-limiting example, oral group may include oral dosage administration and associated administration result 128. As another non-limiting example, intravenous group may include intravenous injection administration and associated administration result 128. As another non-limiting example, intraperitoneal group may include intraperitoneal injection administration and associated administration result 128. As another non-limiting example, subcutaneous group may include subcutaneous injection administration and associated administration result 128. In some embodiments, each administration group 132 may include a subgroup. For the purposes of this disclosure, a "subgroup" is a subset of associative administration data. In some embodiments, administration group 132 may be stored in autoimmune database 120. In some embodiments, administration group 132 may be retrieved from autoimmune database 120.

With continued reference to FIG. 1, as a non-limiting example, oral group may include a plurality of administration form, administration frequency, dosage, dosage type groups, and the like. For example, and without limitation, oral group may include a tablet administration form of 50 µg of TBSV·pLIp1 composition with seven administrations 116 spaced 1 month apart group, tablet administration form of 35 µg of TBSV pLIp1 composition with seven administrations 116 spaced 1 month apart group, tablet administration form of 50 µg of TBSV·FADK2 composition with six administrations 116 spaced 1 month apart group, tablet administration form of 50 µg of TBSV·pLIp1 composition with five administrations 116 spaced 1 month apart group, tablet administration form of 50 µg of TBSV·FADK2 composition with seven administrations 116 spaced 2 month apart group, liquid administration form of 50 µg of TBSV FADK2 composition with seven administrations 116 spaced 1 month apart group, aerosol administration form of 50 μg of TBSV·FADK2 composition with seven administrations 116 spaced 1 month apart group, or the like.

With continued reference to FIG. 1, as another example, and without limitation, subcutaneous group may include a liquid administration form of 50 μg of TBSV pLIp1 composition with seven administrations 116 spaced 1 month apart group, liquid administration form of 50 μg of wt TBSV composition with seven administrations 116 spaced 1 month apart group, liquid administration form of 50 μg of Dexamethasone composition with seven administrations 116 spaced 1 month apart group, liquid administration form of saline buffer composition with seven administrations 116 spaced 1 month apart group, liquid administration form of pLip1+IFA composition with seven administrations 116 spaced 1 month apart group, liquid administration form of pFADK2+IFA composition with seven administrations 116 spaced 1 month apart group, or the like.

With continued reference to FIG. 1, as another example, and without limitation, intraperitoneal group may include a liquid administration form of 50 μg of p524 composition with seven administrations 116 spaced 1 month apart group, liquid administration form of 50 μg of wt CPMV composition with seven administrations 116 spaced 1 month apart group, liquid administration form of 50 μg of p524opt composition with seven administrations 116 spaced 1 month apart group, liquid administration form of CPMV·p524 composition with seven administrations 116 spaced 1 month apart group, liquid administration form of CPMV p524opt composition with seven administrations 116 spaced 1 month apart group, or the like.

With continued reference to FIG. 1, as another example, and without limitation, intravenous group may include a liquid administration form of 50 μg of CPMV·p524opt composition with seven administrations 116 spaced 1 month apart group, liquid administration form of 35 g of CPMV·p524opt composition with seven administrations 116 spaced 1 month apart group, liquid administration form of 50 μg of CPMV·p524 composition with six administrations 116 spaced 1 month apart group, liquid administration form of 50 μg of CPMV p524 composition with five administrations 116 spaced 1 month apart group, liquid administration form of 50 μg of CPMV·p524 composition with seven administrations 116 spaced 2 month apart group, liquid administration form of 50 μg of CPMV·p524opt composition with seven administrations 116 spaced 1 month apart group, aerosol administration form of 50 μg of CPMV·p524 composition with seven administrations 116 spaced 1 month apart group, or the like. Examples above are merely examples and persons skilled in the art, upon reviewing the entirety of this disclosure, may appreciate various administration groups that can be used in apparatus 100.

With continued reference to FIG. 1, in some embodiments, processor 104 may classify administration data 112 into administration group 132 using an administration classifier 140. As used in this disclosure, an "administration classifier" is a machine-learning model, such as a mathematical model, neural net, or program generated by a machine learning algorithm known as a "classification algorithm," that sorts administration data related inputs into categories or bins of data, outputting one or more administration groups associated therewith. The administration classifier 140 disclosed herein may be consistent with a classifier disclosed with respect to FIG. 10. In some embodiments, administration classifier 140 may be trained with administration training data correlating administration data set to administration group 132. The training data disclosed herein is further disclosed with respect to FIG. 10. In some embodiments, administration training data may be stored in autoimmune database 120. In some embodiments, administration training data may be received from one or more users, autoimmune database 120, external computing devices, and/or previous iterations of processing. As a non-limiting example, administration training data may include instructions from a user, who may be an expert user, a past user in embodiments disclosed herein, or the like, which may be stored in memory and/or stored in autoimmune database 120, where the instructions may include labeling of training examples.

With continued reference to FIG. 1, in some embodiments, administration classifier 140 may be trained with administration training data correlating administration data set to administration group 132. As a non-limiting example, administration training data may correlate oral dosage administration and associated administration result 128 to oral group. For example, and without limitation, administration training data may correlate administration data 112 that includes oral dosage that includes a tablet administration form of 50 μg of composition with seven administrations 116 spaced 1 month apart and associated administration results 128 to a tablet administration form of 50 μg of composition with seven administrations 116 spaced 1 month apart group of oral group. As another non-limiting example, administration training data may correlate intravenous injection administration and associated administration result 128 to intravenous group. For example, and without limitation, administration training data may correlate administration data 112 that includes intravenous injection that includes liquid administration form of 50 μg of composition with seven administrations 116 spaced 1 month apart and associated administration results 128 to a liquid administration form of 50 μg of composition with seven administrations 116 spaced 1 month apart group of intravenous group. As another non-limiting example, administration training data may correlate intraperitoneal injection administration and associated administration result 128 to intraperitoneal group. For example, and without limitation, administration training data may correlate administration data 112 that includes intraperitoneal injection that includes tablet administration form of 50 μg of composition with seven administrations 116 spaced 2 month apart and associated administration results 128 to a tablet administration form of 50 μg of composition with seven administrations 116 spaced 2 month apart group of intraperitoneal group. As another non-limiting example, administration training data may correlate subcutaneous injection administration and associated administration result 128 to subcutaneous group. For example, and without limitation, administration training data may correlate administration data 112 that includes intraperitoneal injection that includes tablet administration form of 50 μg of composition with five administrations 116 spaced 1 month apart and associated administration results 128 to a tablet administration form of 50 μg of composition with five administrations 116 spaced 1 month apart group of subcutaneous group.

With continued reference to FIG. 1, processor 104 may be configured to generate a classifier (such as but not limited to administration classifier) using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as P(A/B)=P(B/A) P(A)÷P(B), where P(A/B) is the probability of hypothesis A given data B also known as posterior probability, P(B/A) is the probability of data B given that the hypothesis A was true, P(A) is the probability of hypothesis A being true regardless of data also known as prior probability of A; and P(B) is the probability of the data regardless of the hypothesis. A naïve Bayes algorithm may be generated by first transforming training data into a frequency table. Processor 104 may then calculate a likelihood table by calculating probabilities of different data entries and classification labels. Processor 104 may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts Naïve Bayes classification algorithm may include a Bernoulli model that may be utilized when vectors are binary.

With continued reference to FIG. 1, processor 104 may be configured to generate classifier (such as but not limited to administration classifier) using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data, this may be performed by representing both training data and input data in vector forms, and using one or more measures of vector similarity to identify classifications within training data, and to determine a classification of input data K-nearest neighbors algorithm may include specifying a K-value, or a number directing the classifier to select the k most similar entries training data to a given sample, determining the most common classifier of the entries in the database 200, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 1, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent, however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm:

$$l = \sqrt{\sum\nolimits_{i=0}^{n} a_i^2},$$

where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

With continued reference to FIG. 1, in some embodiments, processor 104 may be configured to classify administration data 112 into one or more administration groups 132 using an administration lookup table. For the purposes of this disclosure, a "administration lookup table" is a lookup table that relates administration data to one or more administration groups. A "lookup table," for the purposes of this disclosure, is an array of data that maps input values to output values. A lookup table may be used to replace a runtime computation with an array indexing operation. In an embodiment, the lookup table may include interpolation. For the purposes of this disclosure, an "interpolation" refers to a process for estimating values that lie between the range of known data. As a non-limiting example, the lookup table may include an output value for each of input values. When the lookup table does not define the input values, then the lookup table may estimate the output values based on the nearby table values. In another embodiment, the lookup table may include an extrapolation. For the purposes of this disclosure, an "extrapolation" refers to a process for estimating values that lie beyond the range of known data. As a non-limiting example, the lookup table may linearly extrapolate the nearest data to estimate an output value for an input beyond the data.

With continued reference to FIG. 1, in some embodiments, processor 104 may 'lookup' given administration data 112 to find corresponding administration groups 132 using an administration lookup table. As a non-limiting example, administration lookup table may correlate oral dosage administration and associated administration result 128 to oral group. For example, and without limitation, administration lookup table may correlate administration data 112 that includes oral dosage that includes a tablet administration form of 50 µg of composition with seven administrations 116 spaced 1 month apart and associated administration results 128 to a tablet administration form of 50 μg of composition with seven administrations 116 spaced 1 month apart group of oral group. As another non-limiting example, administration lookup table may correlate intravenous injection administration and associated administration result 128 to intravenous group. For example, and without limitation, administration lookup table may correlate administration data 112 that includes intravenous injection that includes liquid administration form of 50 μg of composition with seven administrations 116 spaced 1 month apart and associated administration results 128 to a liquid administration form of 50 μg of composition with seven administrations 116 spaced 1 month apart group of intravenous group. As another non-limiting example, administration lookup table may correlate intraperitoneal injection administration and associated administration result 128 to intraperitoneal group. For example, and without limitation, administration lookup table may correlate administration data 112 that includes intraperitoneal injection that includes tablet administration form of 50 μg of composition with seven administrations 116 spaced 2 month apart and associated administration results 128 to a tablet administration form of 50 μg of composition with seven administrations 116 spaced 2 month apart group of intraperitoneal group. As another non-limiting example, administration lookup table may correlate subcutaneous injection administration and associated administration result 128 to subcutaneous group. For example, and without limitation, administration lookup table may corelate administration data 112 that includes intraperitoneal injection that includes tablet administration form of 50 μg of composition with five administrations 116 spaced 1 month apart and associated administration results 128 to a tablet administration form of 50 μg of composition with five administrations 116 spaced 1 month apart group of subcutaneous group.

With continued reference to FIG. 1, in some embodiments, comparing administration data 112 may include generating autoimmune score 136 of administration groups 132 and comparing the autoimmune score 136 of the administration groups 132. In some embodiments, memory 108 may contain instructions configuring processor 104 to generate an autoimmune score 136 of administration group 132. As used in this disclosure, an "autoimmune score" is a numerical value that indicates severity of an autoimmune disease of a subject on a number scale. As a non-limiting example, autoimmune score 136 may include four-point scale from 0 to 4. As a non-limiting example, 0 may represent lowest level of severity of autoimmune disease, while 4 represents highest level of severity of the autoimmune disease. In some embodiments, processor 104 may generate autoimmune score 136 as a function of a plurality of parameters, such as administration results 128. In some embodiments, processor 104 may generate autoimmune score 136 for each administration groups 132. In some embodiments, autoimmune score 136 may be stored in autoimmune database 120. In some embodiments, autoimmune score 136 may be retrieved from autoimmune database 120. In some embodiments, autoimmune score 136 may be consistent with clinical score described in the entirety of this disclosure and with respect to FIG. 10C.

With continued reference to FIG. 1, in an embodiment, autoimmune score 136 may include a quantitative characteristic, such as a numerical value within a set range. As a non-limiting example, autoimmune score 136 may include any numerical value within a set range of 0-4, where '0' represents subject having a minimum and/or no progression of autoimmune disease and '4' represents subject having a maximum and/or highest progression or severity of autoimmune disease. As another non-limiting example, autoimmune score 136 may include any numerical value within a set range of 0-10, where '0' represents subject having a minimum and/or no progression of autoimmune disease and '10' represents subject having a maximum and/or highest progression or severity of autoimmune disease. In other non-limiting embodiments, autoimmune score 136 may include a quality characteristic. As a non-limiting example, autoimmune score 136 may include a color coding, where each color is associated with a level of progression and/or severity of autoimmune disease in subject. For example, and without limitation, autoimmune score 136 may be green, where green may represent a minimum and/or no progression and/or severity of autoimmune disease in subject. For another example, and without limitation, autoimmune score 136 may be red, where red may represent high or extreme progression and/or severity of autoimmune disease in subject. As another non-limiting example, autoimmune score 136 may be light grey when there is minimum and/or no progression and/or severity of autoimmune disease in subject and the color may get darker as progression and/or severity of autoimmune disease in subject increases. In some embodiments, autoimmune score 136 may include low to high scoring. As a non-limiting example, autoimmune score 136 may be 'low' when there is minimum and/or no progression and/or severity of autoimmune disease in subject and autoimmune score 136 may be 'high' when there is high progression and/or severity of autoimmune disease. In some embodiments, autoimmune score 136 may be updated in real-time as processor 104 receives new administration data 112.

With continued reference to FIG. 1, processor 104 is configured to compare administration data 112. In some embodiments, processor 104 may be configured to generate autoimmune score 136 of administration group 132 as a function of administration result 128. As a non-limiting example, autoimmune score 136 may include an arthritis score. For the purposes of this disclosure, an "arthritis score" is an autoimmune score that assesses the severity or progression of arthritis. For the purposes of this disclosure, "arthritis" is inflammation or swelling of one or more joints. In some embodiments, processor 104 may generate arthritis score as a function of administration result 128 such as but not limited to joint swelling, joint tenderness, joint range of motion, joint stiffness (morning stiffness), laboratory markers such as C-reactive protein (CRP) level, erythrocyte sedimentation rate (ESR) or inflammation markers, joint damage, erosions, joint space narrowing, erythema, heart rate, blood pressure, change in skin temperature, or the like. For example, and without limitation, processor 104 may generate arthritis score as a function of caliper measurement of hind ankle and feet of administration result 128. In a non-limiting example, higher arthritis score may indicate more severe or higher progression than lower arthritis score. For the purposes of this disclosure, a "caliper measurement" is a measure of the dimensions or thickness of an object or body part using a caliper. In a non-limiting example, caliper measurement may include median of caliper measurements of selling of hind ankle and feet. For example, and without limitation, processor 104 may generate arthritis score as a function of administration result 128, where the administration result 128 includes a level of erythema on legs. In a non-limiting example, higher arthritis score may indicate more severe or higher progression than lower arthritis score. For the purposes of this disclosure, "erythema" is redness of the skin or mucous membranes, caused by hyperemia in superficial capillaries. For example, and without limitation, processor 104 may generate arthritis score as a function of administration result 128, where the administration result 128 includes a level of swelling of fingers. In a non-limiting example, higher arthritis score may indicate more severe or higher progression than lower arthritis score. Additionally and without limitation, tables 2-4 show exemplary parameters (administration result 128) used to assess arthritis to generate arthritis score of autoimmune score 136.

TABLE 2

| Caliper Measurement (mm) | Score |
| --- | --- |
| 2.0-2.2 | 0 |
| 2.3-2.4 | 1 |
| 2.5-2.6 | 2 |
| 2.7-2.8 | 3 |
| 2.9 or longer | 4 |

TABLE 3

| Erythema | Score |
| --- | --- |
| No erythema | 0 |
| Weak erythema on at least two legs | 1 |
| Moderate erythema on at least two legs | 2 |
| Strong erythema on at least two legs | 3 |
| Strong erythema on more than two legs | 4 |

TABLE 4

| Swelling of Fingers | Score |
| --- | --- |
| No finger swollen | 0 |
| One finger swollen | 1 |
| Two finger swollen | 2 |
| Three finger swollen | 3 |
| Four or more fingers swollen | 4 |

With continued reference to FIG. 1, as another non-limiting example, autoimmune score 136 may include an insulitis score. For the purposes of this disclosure, an "insulitis score" is an autoimmune score that assesses the severity or progression of insulitis. For the purposes of this disclosure. "insulitis" is an inflammation of the islets of Langerhans, a collection of endocrine tissue located in the pancreas that helps regulate glucose levels. In some embodiments, processor 104 may generate arthritis score as a function of administration result 128 such as but not limited to immune cell inflammation, immune cell infiltration, beta cell destruction, change or damage in immune cell population, change or damage in pancreatic islets such as islet infiltration, blood glucose levels, histological analysis, or the like.

With continued reference to FIG. 1, in some embodiments, processor 104 may generate autoimmune score 136 using a score machine learning model 144. As used in this disclosure, a "score machine-learning model" is a machine-learning model that is used to generate an autoimmune score. Score machine learning model 144 may be consistent with a machine-learning module disclosed with respect to FIG. 10. In some embodiments, score machine learning model 144 may be trained with score training data that correlates an administration data set to autoimmune scores 136. As a non-limiting example, score training data may correlate administration result 128 of administration group 132 to arthritis score of the administration group 132. As another non-limiting example, score training data may correlate administration result 128 of administration group 132 to insulitis score of the administration group. In some embodiments, score machine learning model 144 may be created and/or trained using a machine learning module described with respect to FIG. 10. In some embodiments, score training data may be stored in autoimmune database 120. In some embodiments, score training data may be received from one or more users, autoimmune database 120, external computing devices, and/or previous iterations of processing. As a non-limiting example, score training data may include instructions from a user, who may be an expert user, a past user in embodiments disclosed herein, or the like, which may be stored in memory and/or stored in autoimmune database 120, where the instructions may include labeling of training examples.

With continued reference to FIG. 1, in some embodiments, processor 104 may receive a machine-learning model from a remote device that utilizes one or more machine learning processes. As used in this disclosure "remote device" is an external device to processor 104. For example, and without limitation, a remote device may include a computing device, external device, processor, and the like thereof. In some embodiments, remote device may perform machine-learning process using score training data to generate autoimmune score 136 and transmit the output to processor 104. In some embodiments, remote device may transmit a signal, bit, datum, or parameter to processor 104 that at least relates to administration data 112. Additionally or alternatively, remote device may provide an updated machine-learning model. For example, and without limitation, an updated machine-learning model may be comprised of a firmware update, a software update, a machine-learning process correction, and the like thereof. As a non-limiting example a software update may incorporate a new function that relates to a modified administration data 112. Additionally or alternatively, updated machine learning model may be transmitted to remote device, wherein the remote device may replace score machine learning model 144 with the updated machine-learning model and determine autoimmune score 136 as a function of administration data 112 using the updated machine-learning model. In some embodiments, updated machine-learning model may be transmitted by remote device and received by processor 104 as a software update, firmware update, or corrected score machine-learning model. For example, and without limitation, score machine-learning model may utilize a random forest machine-learning process, wherein updated machine-learning model may incorporate a gradient boosting machine-learning process.

With continued reference to FIG. 1, memory 108 contains instructions configuring processor 104 to determine a critical administration 124. For the purposes of this disclosure, a "critical administration" is an administration of a composition that results in the most efficacy of the composition. In a non-limiting example, critical administration 124 may result in the least severity or progression of autoimmune disease. Processor 104 is configured to determine critical administration 124 as a function of comparison. In some embodiments, processor 104 may be configured to determine critical administration 124 as a function of autoimmune score 136. In some embodiments, critical administration 124 may include a minimum autoimmune score. As used in this disclosure, a "minimum autoimmune score" is the lowest autoimmune score of an administration group among a plurality of administration groups in some embodiments, critical administration 124 may be stored in autoimmune database 120. In some embodiments, critical administration 124 may be retrieved from autoimmune database 120. In some embodiments, critical administration 124 may be determined manually by a user.

With continued reference to FIG. 1, as a non-limiting example, oral dosage administration 116 of tablet administration form of 50 μg of TBSV·FADK2 composition with six administrations 116 spaced 1 month apart, which is included in tablet administration form of 50 μg of TBSV·FADK2 composition with six administrations 116 spaced 1 month apart group of oral group of administration group 132, may be critical administration 124 when autoimmune score 136 of 2 is minimum autoimmune score, where autoimmune score 136 of oral dosage administration 116 of tablet administration form of 50 g of TBSV FADK2 composition with six administrations 116 spaced 1 month apart is lower than other autoimmune scores 136 of oral dosage administration 116 of oral group of administration group 132, such as oral dosage administration 116 of tablet administration form of 50 μg of TBSV·pLIp1 composition with six administrations 116 spaced 1 month apart and tablet administration form of 50 μg of wt TBSV composition with six administrations 116 spaced 1 month apart.

With continued reference to FIG. 1, as another non-limiting example, intravenous administration 116 of liquid administration form of 50 μg of TBSV·pLIp1 composition with seven administrations 116 spaced 1 month apart, which is included in liquid administration form of 50 μg of TBSV·pLIp1 composition with seven administrations 116 spaced 1 month apart group of intravenous group of administration group 132, may be critical administration 124 when autoimmune score 136 of 3 is minimum autoimmune score, where autoimmune score 136 of intravenous administration 116 of liquid administration form of 50 μg of TBSV·pLIp1 composition with seven administrations 116 spaced 1 month apart is lower than other autoimmune scores 136 of administrations 116 of administration groups 132, such as subcutaneous administration 116 of liquid administration form of 50 μg of TBSV·pLIp1 composition with seven administrations 116 spaced 1 month apart, intraperitoneal administration 116 of liquid administration form of 50 μg of TBSV pLIp1 composition with seven administrations 116 spaced 1 month apart, oral dosage administration 116 of liquid administration form of 50 μg of TBSV·pLIp1 composition with seven administrations 116 spaced 1 month apart, oral dosage administration 116 of liquid administration form of 50 μg of wt TBSV composition with seven administrations 116 spaced 1 month apart, subcutaneous dosage administration 116 of liquid administration form of 50 μg of wt TBSV composition with seven administrations 116 spaced 1 month apart, intravenous dosage administration 116 of liquid administration form of 50 μg of wt TBSV composition with seven administrations 116 spaced 1 month apart and oral dosage administration 116 of liquid administration form of 50 μg of dexamethasone composition with seven administrations 116 spaced 1 month apart. Examples above are merely examples and persons skilled in the art, upon reviewing the entirety of this disclosure, may appreciate various critical administrations 124 that can be determined in apparatus 100.

With continued reference to FIG. 1, in some embodiments, processor 104 may determine critical administration 124 as a function of a result weight. For the purposes of this disclosure, a "result weight" is a numerical value that indicates a level of significance of an administration result. In some embodiments, each administration result 128 may include result weight. In some embodiments, a higher result weight may indicate a greater significance of administration result 128, thereby impacting autoimmune diseases. In some embodiments, some administration results 128 may include the same result weight while some other administration results 128 may include different result weights. As a non-limiting example, administration result 128 of joint swelling may include result weight of 5 while administration result 128 of erythema includes result weight of 2. As another non-limiting example, administration result 128 of change of blood glucose level may include result weight of 2 while immune cell inflammation includes result weight of 6 and damage in immune cell population includes result weight of 6. In some embodiments, administration result 128 may include result weight of 0 for specific autoimmune disease. In a non-limiting example, administration result 128 that includes result weight of 0 may indicate that administration result 128 is irrelevant to a specific immune disease. For example, and without limitation, administration result 128 of joint swelling may include result weight of 0 for diabetes. For another example, and without limitation, administration result 128 of change of blood glucose level may include result weight of 0 for arthritis. In a non-limiting example, when a first administration group includes autoimmune score 136 of 5 and result weight of 3 and a second administration group includes autoimmune score 136 of 5 and result weight of 5, then processor 104 may determine the second administration group that includes the same autoimmune score 136 but higher result weight compared to the first administration group. In some embodiments, result weight may be stored in autoimmune database 120. In some embodiments, result weight may be retrieved from autoimmune database 120. In some embodiments, user may manually input result weight.

With continued reference to FIG. 1, in some embodiments, processor 104 may determine critical administration 124 using a critical machine learning model 148. As used in this disclosure, a "critical machine learning model" is a machine-learning model that is configured to determine a critical administration. The critical machine learning model 148 disclosed herein may be consistent with a machine learning model disclosed with respect to FIG. 10. In some embodiments, critical machine learning model may be trained with critical training data. For the purposes of this disclosure. "critical training data" is training data that trains a critical machine learning model. In some embodiments, critical training data may correlate an administration group data set, autoimmune score data set and/or result weight data set to output critical administrations. As a non-limiting example, critical training data may correlate administration 116 and administration result 128 of administration group 132, its autoimmune score 136 and/or result weight to output critical administration 124. Critical training data disclosed herein may be consistent with training data described with respect to FIG. 10. In some embodiments, critical training data may be stored in autoimmune database 120. In some embodiments, critical training data may be received from one or more users, autoimmune database 120, external computing devices, and/or previous iterations of processing. As a non-limiting example, critical training data may include instructions from a user, who may be an expert user, a past user in embodiments disclosed herein, or the like, which may be stored in memory and/or stored in autoimmune database 120, where the instructions may include labeling of training examples.

With continued reference to FIG. 1, in some embodiments, remote device may perform machine-learning process using critical training data to determine critical administration 124 and transmit the output to processor 104. In some embodiments, remote device may transmit a signal, bit, datum, or parameter to processor 104 that at least relates to administration data 112, administration group 132, autoimmune score 136 and/or result weight. Additionally or alternatively, remote device may provide an updated machine-learning model. For example, and without limitation, an updated machine-learning model may be comprised of a firmware update, a software update, a machine-learning process correction, and the like thereof. As a non-limiting example a software update may incorporate a new function that relates to a modified administration data 112, administration group 132, autoimmune score 136 and/or result weight. Additionally or alternatively, updated machine learning model may be transmitted to remote device, wherein the remote device may replace critical machine learning model 148 with the updated machine-learning model and determine critical administration 124 as a function of autoimmune score 136 using the updated machine-learning model. In some embodiments, updated machine-learning model may be transmitted by remote device and received by processor 104 as a software update, firmware update, or corrected critical machine-learning model 148. For example, and without limitation, critical machine-learning model 148 may utilize a random forest machine-learning process, wherein updated machine-learning model may incorporate a gradient boosting machine-learning process.

With continued reference to FIG. 1, in some embodiments, processor 104 may determine critical administration 124 using a critical lookup table. For the purposes of this disclosure, a "critical lookup table" is a lookup table that relates administration data and autoimmune score to output a critical administration. Critical lookup table disclosed herein may be consistent with lookup table described above. In some embodiments, critical lookup table may correlate an administration group data set, autoimmune score data set and/or result weight data set to find a corresponding critical administrations 124. As a non-limiting example, critical lookup table may correlate administration 116 and administration result 128 of administration group 132, its autoimmune score 136 and/or result weight to find a corresponding critical administration 124.

Figure 6A:
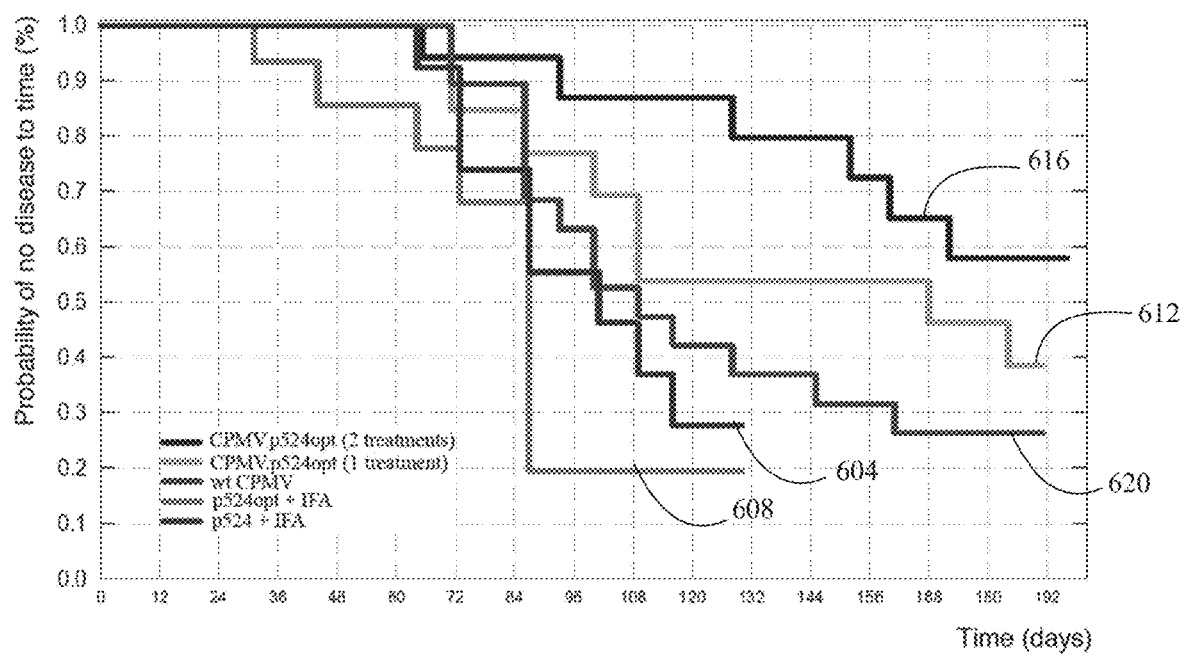
FIGS. 6A-6B are illustrations of diagrams that depict partial protection from autoimmune diabetes in NOD mice treated with CPMV (Cow pea mosaic virus)-derived particles displaying the p524opt peptide.
Figure 6B:
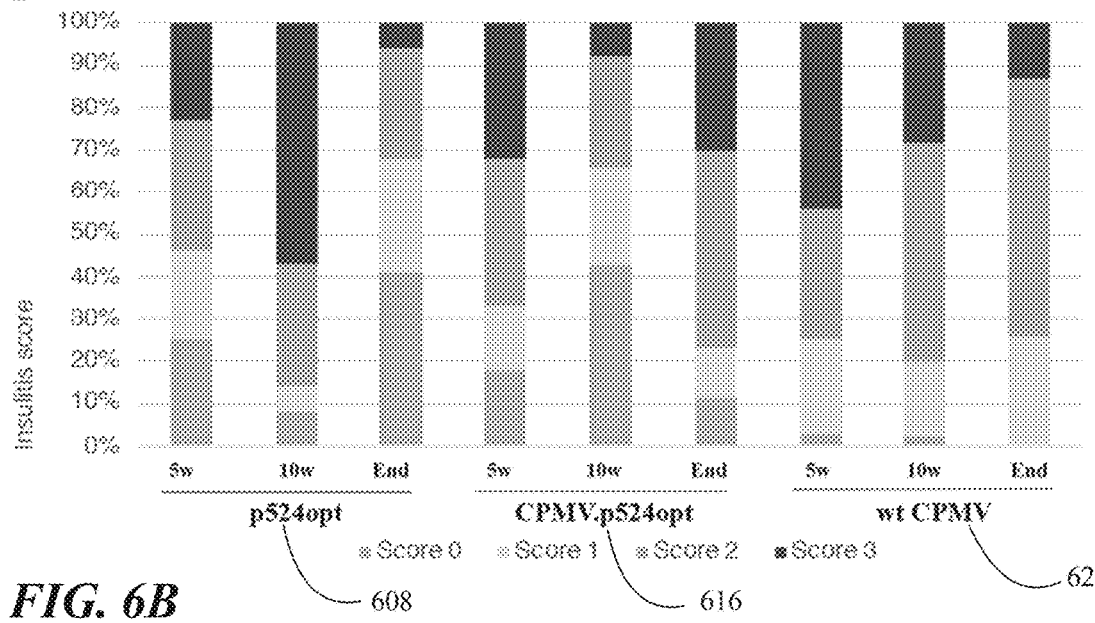

With continued reference to FIG. 1, in some embodiments, processor 104 may determine critical administration 124 as a function of a statistical comparison between administration groups 132. In some embodiments, administration result 128 of administration group 132 may include a survival curve. For the purposes of this disclosure, a "survival curve," also called as "Kaplan-Meier curve" is a graphical representation of the probability of survival over time in a group of subjects after administration of a composition. As a non-limiting example, processor 104 may generate autoimmune score 136 as a function of a p-value of statistical comparison of survival curve. In some embodiments, p-value may be stored in autoimmune database 120. In some embodiments, p-value may be retrieved in autoimmune database 120. Table 5 below shows a statistical comparison of survival curves of administration groups 132. In a non-limiting example, for studies in NOD mice, diabetes-free survival in the treatment groups (administration groups 132) may be compared by Kaplan-Meier analysis with a log-rank test. As used in this disclosure, a "Kaplan-Meier analysis" is an analysis that is used to measure the fraction of subjects living for a certain amount of time after treatment. As a non-limiting example, a Kaplan-Meier analysis may be calculated using the following formula:

$$\prod_{i:t_i \leq t}\left(1 - \frac{d_i}{n_i}\right),$$

wherein $\prod$ is a product of a sequence, $t_i$ is a time when at least one event happened, $d_i$ is the number of events that happened at time $t_i$, and $n_i$ is the subjects that have survived up to time $t_i$. NOD female mice before the onset of insulitis by intraperitoneal injection with synthetic peptides (p524 and p524opt), plant virus nanoparticles (pVNPs) (one or two doses of CPMV·p524opt), or wild-type CPMV as a control may be treated. The Mann-Whitney U test may be used to compare insulitis scores among different groups. In a non-limiting example, OPLS-DA may be used to integrate principal components analysis data and reduce experimental variability and may be performed using SIMCA PLUS v13.0 (Umetrics). In some embodiments, to define the number of classes for the OPLS-DA model, partial cross-validation and a permutation test may be applied to reveal overfitting. In a non-limiting example, for DBA/1 mice, quantitative variables may be tested for normal distribution in GraphPad Prism v7. Statistical differences in cytokine levels between treatment groups may be determined by analysis of variance (ANOVA), followed by Bonferroni's test. Statistical differences in the arthritic score and number of $T_{reg}$ cells detected in the lymph nodes of RA mice may be determined by applying the Kruskal-Wallis test followed by Dunn's multiple comparison test. In some embodiments, a value of $P<0.05$ may be considered significant. Further description related to Table 5 is disclosed with respect to FIGS. 6A-6B.

TABLE 5

| Compared Compositions | | p-value |
|---|---|---|
| p524 | p524opt | 0.364 |
| | CPMV wt | 0.551 |
| | CPMV p524 1 treatment | 0.227 |
| | CPMV p524 2 treatment | 0.008 |
| p524opt | CPMV wt | 0.109 |
| | CPMV p524 1 treatment | 0.052 |
| | CPMV p524 2 treatment | 0.001 |
| CPMV wt | CPMV p524 1 treatment | 0.398 |
| | CPMV p524 2 treatment | 0.04 |
| CPMV p524 1 treatment | CPMV p524 2 treatment | 0.294 |

With continued reference to FIG. 1, in some embodiments, processor 104 may determine critical administration 124 as a function of a cytokine profile and a proportion of $CD25^+$ $Foxp3^+$ cells. In some embodiments, administration result 128 of administration group 132 may include cytokine profile and a proportion of $CD25^+$ $Foxp3^+$ cells. As a non-limiting example, processor 104 may generate autoimmune score 136 as a function of cytokine profile and a proportion of $CD25^'$ $Foxp3^+$ cells. For the purposes of this disclosure, a "cytokine profile" is the pattern and levels of cytokines produced by immune cells in a specific context or condition. For the purposes of this disclosure, "cytokine" is proteins that act as signaling molecules within the immune system. For the purpose of this disclosure, "$CD25^+$ $Foxp3^+$ cell" is a regulatory T cells that are specific subset of immune cells that maintain immune balance. As a non-limiting example, processor 104 may generate autoimmune score 136 as a function of cytokine profile and a proportion of CD25+Foxp3+ cells. In some embodiments, cytokine profile and a proportion of $CD25^+$ $Foxp3^+$ cells may be stored in autoimmune database 120. In some embodiments, cytokine profile and a proportion of $CD25^+$ $Foxp3^+$ cells may be retrieved in autoimmune database 120. In a non-limiting example, in the serum of NOD mice, 23 cytokines [IL1α, IL1β, IL2, IL3, IL4, IL5, IL6, IL9, IL10, IL12 (p40), IL12 (p70), IL13, IL17A, eotaxin, G-CSF (granulocyte colony-stimulating factor), GM-CSF (granulocyte-macrophage CSF), IFNγ, KC, MCP1 (MCAF), MIP1α, MIP1β, RANTES, and TNFα] may be quantified using Luminex xMAP technology (Bio-Plex Pro Mouse Cytokine 23-Plex, Bio-Rad Laboratories). In some embodiments, to quantify cytokines in DBA mice, joint tissues may be pulverized and resuspended in 1 ml of lysis medium per 100-mg joint weight for 60 min at 37'C, followed by centrifugation to remove debris. In a non-limiting example, lymph nodes may be removed, homogenized, and centrifuged. In a non-limiting example, supernatants from both preparations may be sterilized by passing through a Millipore filter (0.45 μm pore size) and stored at −80° C. TNFα, IL17A, IL1β, IFNγ, TGFβ1, and IL10 concentrations may be determined in serum and supernatants using commercial enzyme-linked immunosorbent assay kits (eBioscience) according to the manufacturer's recommendations. Tables 6-9 below show effect (administration result 128) of administration 116 of TBSV-derived particles on cytokine profiles and the proportion of CD25⁺ Foxp3⁺ cells.

TABLE 6

| collagen-induced arthritis (CIA) | Composition | % CD25⁺/Foxp3⁺ |
| --- | --- | --- |
| No CIA | | 1.55 (0.31) |
| CIA | Saline buffer | 1.08 (0.63) |
| | Dexamethasone | 3.26 (0.84) |
| | Wt TBSV | 1.40 (0.10) |
| | TBSV.pLIp1 | 2.16 (0.83) |
| | TBSV.pFADK2 | 2.90 (1.00) |
| | pLIp1 + IFA | 2.20 (0.40) |
| | pFADK2 + IFA | 0.53 (0.04) |

With continued reference to FIG. 1, with respect to Table 6, the percentage of CD25⁺ Foxp3⁺ cells may be determined in the lymph nodes of non-CIA mice and CIA mice treated with saline, dexamethasone, wild-type TBSV, TBSV·pLIp1, TBSV·pFADK2, pLIp1+IFA, and pFADK2+IFA on day 60 after immunization. Values represent means±standard error of the mean (SEM) (n=3; except for non-CIA mice, where n=2).

As used in this disclosure, a "standard error" is the standard deviation of its sampling distribution. As used in this disclosure, a "standard deviation" is a measure of the amount of variation or dispersion of a set of values. In some embodiments, the values of Table 6 may be calculated using the following formula:

$$\text{Mean} = \frac{\sum_{i=1}^{n} x_i}{n},$$

wherein n represents a total number of samples and x represents a sample. In some embodiments, the standard error may be calculated using the following formula.

$$SE = \frac{\sigma}{\sqrt{n}},$$

wherein SE represents the standard error and σ represents standard deviation. In some embodiments, the standard deviation may be calculated using the following formula:

$$\sigma = \sqrt{\frac{\sum_{i=1}^{n} (x_i - \text{Mean})^2}{n-1}}.$$

In some embodiments, statistical significance may be determined by applying a Kruskal-Wallis test. As used in this disclosure, a "statistical significance" is a determination that a relationship between two or more variables is caused by something other than chance. As used in this disclosure, a "Kruskal-Wallis test" is a non-parametric method for testing whether samples originate from the same distribution. The Kruskal-Wallis test may be used for comparing two or more independent samples of equal or different sample sizes. The Kruskal-Wallis test may be conducted by ranking all data from all groups together from 1 to n. Then, the test statistic (H) for the Kruskal-Wallis test may be the following:

$$H = \frac{12}{n(n+1)} \sum_{i=1}^{k} \frac{R_i^2}{n_i} - 3(n+1),$$

wherein $R_l$ is the sum of the ranks of the lth sample and k is a number of groups. In some embodiments, statistical significance may be determined by applying a Dunn's multiple comparison test. As used in this disclosure, a "Dunn's multiple comparison test" is a test that compares the difference in the sum of ranks between two columns with the expected average difference based on the number of groups and their size.

TABLE 7

| collagen-induced arthritis | Composition | TGF-β1 | IL-10 |
| --- | --- | --- | --- |
| No CIA | | 2184.0 | 0 |
| CIA | Saline buffer | 4652.8 | 89.0 |
| | Dexamethasone | 10385.0 | 71.6 |
| | Wt TBSV | 9177.6 | 281.8 |
| | TBSV.pLIp1 | 4077.4 | 438.6 |
| | TBSV.pFADK2 | 5905.9 | 328.8 |
| | pLIp1 + IFA | 4352.0 | 66.6 |
| | pFADK2 + IFA | 12041.0 | 81.4 |

With continued reference to FIG. 1, with respect to Table 7, levels (pg/ml) of TGFβ1 and IL10 may be determined in the serum of non-CIA mice and CIA mice treated with saline, dexamethasone, wild-type TBSV, TBSV·pLIp1, TBSV·pFADK2, pLIp1+IFA, and pFADK2+IFA on day 60 after immunization. Serum values represent data pooled from five mice. Treatment with dexamethasone may result in the more effective modulation of all proinflammatory cytokines in lymph nodes, as well as TNFα, IL1β, and IFNγ in joints, and TNFα in serum. Moreover, the administration of dexamethasone and pFADK2+IFA may induce a therapeutic effect driven by TGFβ (transforming growth factor-β), a pleiotropic cytokine with potent regulatory and inflammatory activity. In contrast, TBSV·pLIp1 and TBSV·pFADK2 may induce a more direct activation of IL10. Wild-type TBSV may also partially induce the production of TGFβ and IL10 in serum as shown in Table 7. The cytofluorimetric analysis of Treg (CD25+/Foxp3+) cells in lymph nodes may show that TBSV pFADK2 strongly increased the proportion of these cells, and a similar effect, although less pronounced, may be observed for TBSV·pLIp1 and pLIp1+IFA, whereas dexamethasone showed the most potent effect overall.

with TBSV·pLIp1 may be associated with a more effective depletion of all proinflammatory cytokines in the lymph nodes and of TNFα and IL17A in serum, with no effect on

TABLE 8

| | | TNF-α | | | IL-17A | | |
|---|---|---|---|---|---|---|---|
| | Composition | LN | J | S | LN | J | S |
| No CIA | | 61.53 (8.68) | 15.26 (1.42) | 20.0 | 1029.06 (187.3) | 444.96 (34.74) | 0 |
| CIA | Saline buffer | 309.46 (97.64) | 75.83 (0.58) | 95.8 | 2468.96 (360.87) | 1173.16 (54.90) | 221.4 |
| | Dexamethasone | 107.90 (32.71) | 49.20 (16.0) | 24.2 | 1540.40 (446.49) | 1219.43 (91.70) | 313.8 |
| | Wt TBSV | 381.70 (113.95) | 92.23 (5.35) | 52.0 | 3054.86 (672.32) | 1504.33 (158.55) | 71.6 |
| | TBSV.pLIp1 | 182.76 (21.23) | 95.73 (19.59) | 51.2 | 1209.06 (16.22) | 1202.26 (213.01) | 71.6 |
| | TBSV.pFADK2 | 309.16 (54.44) | 103.4 (4.98) | 86.4 | 1994.86 (70.98) | 906.0 (46.13) | 72.8 |
| | pLIp1 + IFA | 206.03 (19.88) | 80.16 (13.98) | 90.0 | 1497.76 (185.36) | 1093.30 (103.94) | 78.6 |
| | pFADK2 + IFA | 189.86 (11.01) | 54.66 (4.67) | 90.2 | 1443.73 (36.64) | 899.20 (59.39) | 69.0 |

TABLE 9

| | | IL-1β | | | IFN-γ | | |
|---|---|---|---|---|---|---|---|
| | Composition | LN | J | S | LN | J | S |
| No CIA | | 37.60 (6.0) | 16.3 (0.42) | 18.0 | 79.30 (6.81) | 44.70 (8.61) | 32.4 |
| CIA | Saline buffer | 543.56 (47.72) | 91.3 (8.13) | 39.6 | 700.63 (266.0) | 384.63 (22.89) | 55.0 |
| | Dexamethasone | 65.63 (23.85)* | 38.43 (19.32) | 26.6 | 210.86 (63.05) | 187.23 (35.15) * | 75.6 |
| | Wt TBSV | 391.70 (84.83) | 83.83 (9.34) | 40.8 | 723.30 (204.48) | 306.90 (59.73) | 238.8 |
| | TBSV.pLIp1 | 237.06 (14.87) * | 95.13 (28.20) | 30.0 | 406.80 (52.93) | 388.53 (59.73) | 123.4 |
| | TBSV.pFADK2 | 318.20 (9.97) | 162.20 (12.65) | 32.0 | 596.60 (101.26) | 337.63 (10.25) | 158.2 |
| | pLIp1 + IFA | 372.0 (97.0) | 85.63 (16.56) | 32.0 | 370.70 (24.45) | 314.73 (22.69) | 55.2 |
| | pFADK2 + IFA | 353.86 (38.48) | 83.43 (14.91) | 43.8 | 371.46 (18.36) | 195.40 (15.15) * | 174.8 |

With continued reference to FIG. 1, with respect to Tables 8-9, TNFα, IL17A, IL-1β, and IFNγ levels (pg/ml) may be determined in the serum (S) and lymph node (LN)/joint (J) supernatants of non-CIA mice and CIA mice treated with saline, dexamethasone, wild-type TBSV, TBSV·pLIp1, TBSV·pFADK2, pLIp1+IFA, and pFADK2+IFA on day 60 after immunization. Values represent means±SEM (n=3). Serum values represent data pooled from five mice. Statistical significance may be determined by ANOVA, followed by Bonferroni correction. Values of P<0.05 may be considered significant (*). Significance may be established for CIA mice treated versus saline-treated+CIA. Given the positive effect of the pLIp1 and pFADK2 peptides in mice when presented on the pVNPs, a hypothesis that both peptides may induce the expansion of immunomodulatory cell populations can be tested. In a non-limiting example, a panel of proinflammatory and anti-inflammatory cytokines in the serum, joints, and lymph nodes of the treated mice may be evaluated as shown in Tables 8-9. In a non-limiting example, a general depletion of proinflammatory cytokines such as TNFα (tumor necrosis factor-α), IL17A IL1β, and IFNγ in the groups treated with TBSV and the synthetic peptides pLIp1 and pFADK2+IFA may be observed, but treatment cytokine levels in the joints. Furthermore, pFADK2+IFA may markedly reduce the levels of TNFα, IL17A, IL1β, and IFNγ in the lymph nodes and IL17A in the serum, as well as achieving a general trend toward the depletion of proinflammatory cytokines in the joints (significant in the case of IFNγ). On the other hand, treatment with TBSV·pFADK2 may strongly reduce the levels of IL17A in lymph nodes and serum and IL1β and IFNγ in lymph nodes.

With continued reference to FIG. 1, the development of virus nanoparticles (VNPs) for medical applications has far focused mainly on the delivery of drugs and imaging molecules to particular target cells. However, the ability of VNPs to display peptide antigens or epitopes has also resulted in their application as vaccines, for example, the display of pathogen-derived peptides as an active immunization strategy against infectious diseases or the display of self-antigens found on cancer cells as a means to turn the immune system against tumors. The investigation and preclinical testing of these approaches has generated a body of evidence that VNPs also have immunomodulatory effects. For example, pVNPs have been shown to suppress cancer cell proliferation and metastasis through the activation of both local (tumor microenvironment) and systemic anticancer immune responses involving the modulation of cytokine secretion and the activation states of different immune cell populations it may be hypothesized that pVNPs displaying autoimmune disease self-antigens may be able to modulate the immune system to induce tolerance and therefore either prevent or treat diseases such as T1D and RA.

With continued reference to FIG. 1, coat proteins of CPMV and TBSV may be engineered to display immunodominant peptides associated with T1D (p524opt) and RA (pLIp1 or pFADK2), respectively. These viruses may be similar in shape and size, but the density of peptide display may be threefold lower in CPMV due to the assembly of the virion from two different coat protein subunits, compared to the single coat protein of TBSV. Icosahedral nanoparticles may tend to circulate in vivo for a few hours, whereas filamentous and rod-shaped viruses may persist for longer, but the residence time in our case should be sufficient to trigger the desired effects. The presence of p524opt may reduce the yield of CPMV particles in plants by 10-fold compared to the wild-type virus, perhaps due to the loss of stability or promotion of aggregation, although the pI of the recombinant particles is optimized. In contrast, the presence of either pLIp1 or pFADK2 may improve the yields of TBSV, perhaps by the opposite effect of increasing stability.

With continued reference to FIG. 1, the recombinant pVNPs may be tested in appropriate mouse models of T1D and RA and may be compared their efficacy to the corresponding peptides without a virus scaffold. The peptides may be administered with an adjuvant, which is necessary to ensure a strong immune response, whereas the pVNPs may be administered without an adjuvant, because the repetitive structure of the virus scaffold is known to achieve a similar effect. Adjuvants can trigger local or systemic reactogenicity, which negatively affects public perception of the risk-benefit balance of immunization. In contrast, the safety profile of plant viruses may be positive, given their ubiquitous presence in the environment and especially in all plant-based foods.

With continued reference to FIG. 1, the analysis of NOD mice may reveal that two treatments with the CPMV·p524opt formulation achieved partial protection from the onset of diabetes, whereas the free p524opt peptide had no protective effect. The protective mechanism induced by CPMV·p524opt may not appear to be mediated by $T_{reg}$ cells, given that fewer Foxp3$^{+}$ cells may present around the pancreatic islets of mice treated with the pVNP formulation. Similarly, the analysis of recent-onset NOD mice may treat with the bacterium *Lactococcus lactis* engineered to secrete GAD65370-575 (and the anti-inflammatory cytokine IL10) in the gut combined with short-course low-dose anti-CD3 (combi-GAD therapy) achieved the stabilization of insulitis, the preservation of functional β-cell mass, and the restoration of normoglycemia, with no significant difference in the number of Foxp3$^{+}$ cells in and around pancreatic islets compared to untreated mice. The positive outcomes observed may reflect the differential activation of cytokines by the various treatment groups, with IL10 and IL2 playing a major role in the double-dose treatment with CPMV·p524.

With continued reference to FIG. 1, the analysis of DBA mice following the establishment of CIA may provide preliminary evidence that the administration of TBSV particles displaying pFADK2 or pLIp1 can achieve the complete remission of arthritis signs even if the pVNPs are delivered after the onset of disease. CIA in DBA mice may use T helper cell ($T_H1$)-dependent model of chronic arthritis, because it is highly reproducible and allows the antibody-induced effector phase of arthritis to be studied in detail. Tolerance to citrullinated proteins has been shown in DBA mice, and the prophylactic administration of citrullinated filaggrin peptide protected these mice from arthritis. The administration of a multiepitope citrullinated peptide derived from major prevalent autoantigens immediately after the induction of disease significantly reduced the severity of symptoms in an adjuvant-induced rat arthritis model. These results and data support the hypothesis that antigen-specific tolerance can be achieved in RA by the repeated administration of peptides that cause the immunomodulation of T cell populations involved in the immune response (mainly $T_H1$, $T_H17$, and $T_{reg}$ cells) and the down-regulation of proinflammatory cytokines. Specifically, the depletion of TNFα, IL1β, IL17, and IFNγ may be observed in the serum, lymph nodes, and (to a lesser extent) the joints. These cytokines are the key mediators of the innate (TNFα), adaptive (IFNγ), and $T_H17$-mediated (IL17) immune responses in RA. The beneficial effect of the pVNPs was also associated with the secretion of anti-inflammatory cytokines such as IL10 for TBSV·pLIp1 and TBSV·pFADK2, and both TGFβ and IL10 for TBSV·pFADK2, as well as the accumulation of CD25$^{+}$ Foxp3$^{+}$ $T_{reg}$ cells, which suppress autoreactive lymphocytes either by direct contact or by promoting the secretion of TGFβ and IL10. The higher proportion of $T_{reg}$ cells in the lymph nodes of treated mice may support the role of this T cell subset in suppressing the immune-mediated inflammation that occurs during the pathogenesis of RA.

With continued reference to FIG. 1, the liprin family of multidomain proteins may be required for cell motility on the extracellular matrix and the efficient regulation of focal adhesion during cell migration. The liprin α1 dimer may be strongly expressed by lymphatic endothelial cells, where it may regulate lymphatic vessel integrity. The pFADK2 sequence may be derived from protein tyrosine kinase 2β (FAK2/PTK2B), which may control cell adhesion, migration, and invasion. In murine models of RA, FAK2/PTK2B may promote inflammatory angiogenesis, may induce synovial fibroblast invasion, and may trigger the formation of synovial pannus, suggesting a role in the onset and progression of synovial hyperplasia. The positive effect of pFADK2 administration in DBA mice may therefore partially reflect the inhibition of synovial hyperplasia, supporting the role of focal adhesion kinases in the pathogenesis of RA and the value of peptide-driven therapy using adjuvant viral scaffolds.

With continued reference to FIG. 1, although immunodominant peptides delivered by pVNPs offer a therapeutic benefit in models of both T1D and RA, the underlying mechanisms may be different, with the activation of $T_{reg}$ cells required only in the RA model. This may show that the peptides displayed by the pVNP may strongly influence the immunomodulatory mode of action. However, the virus scaffold may achieve an adjuvant effect in both cases, perhaps by stabilizing the peptide and concentrating multiple peptides in a small area. The combination of virus scaffold and immunodominant peptides may result in the secretion of IL10, which may be more abundant in the serum of both disease models after treatment with the pVNP. The requirement for both the scaffold and the peptides may be shown by the negligible increase in IL10 levels in response to either the wild-type virus or the synthetic peptide formulation.

Now referring to FIG. 2A, a flow diagram illustrating an exemplary embodiment of a method 200 of an engineered virus-based nanoparticle for the treatment of an autoimmune condition is shown. Engineered virus-based nanoparticle 100 may include, without limitation, any of the nanoparticles described herein with reference to FIG. 1 and FIGS. 3-13.

Figure 2A:
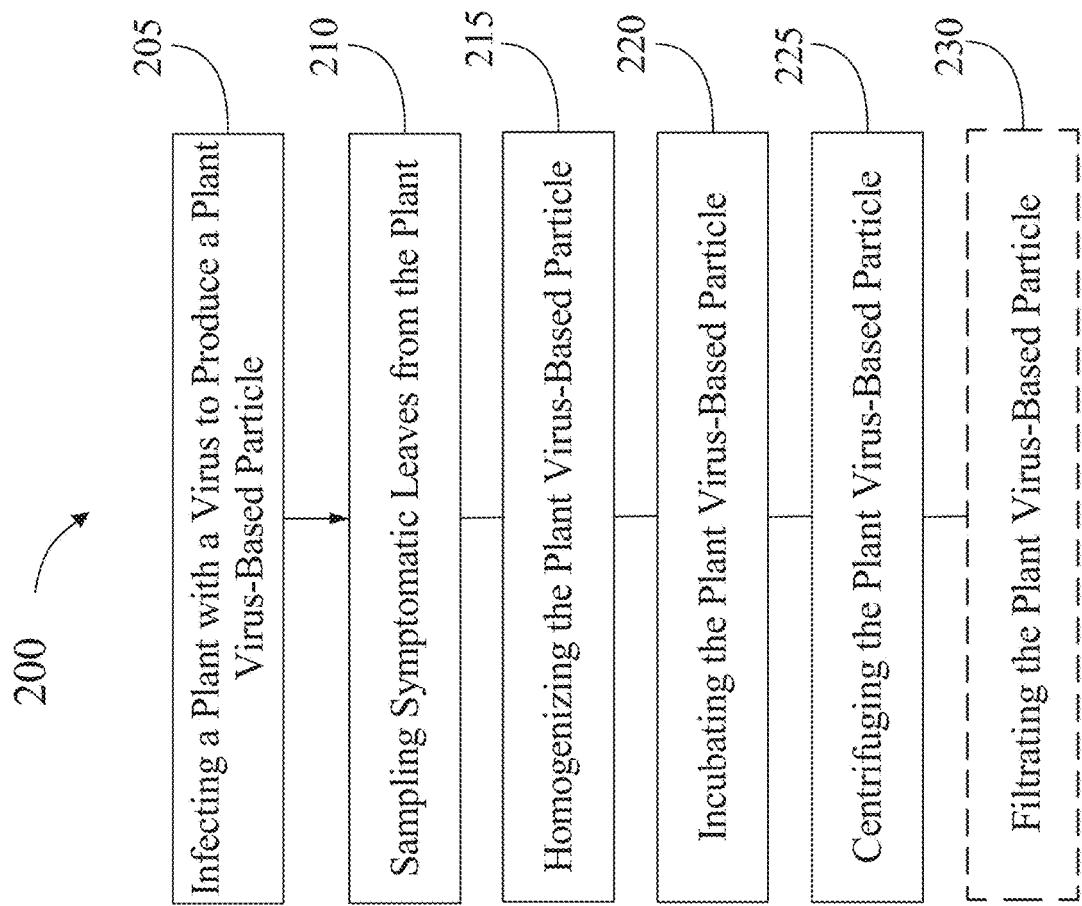
FIG. 2A is a flow diagram illustrating an exemplary embodiment of a method of obtaining an engineered virus-based nanoparticle for the treatment of an autoimmune condition.

With continued reference to FIG. 2A, at step 205, method 200 includes infecting a plant with a virus to produce a plant virus-based particle. In this disclosure, "infection" refers to the process of delivering infectious viral genes into plants; this is so the plant can produce the tomato bush stunt virus. Infection may allow the plant to begin to produce plant virus-based particle needed. In an embodiment, infection may be done by spontaneous infiltration. As a non-limiting example, spontaneous infiltration may include spraying infectious viral genes onto a plant, spraying viral solution obtained from previously infected leaves, and the like. As used in this disclosure, "infiltration" refers to the penetration of substances from the surface to deep inside plant tissues. In another embodiment, infection may be done by infiltration of viral genes into a plant. In another embodiment, infection may be done by infiltration of viral solution obtained from previously infected leaves. In some embodiments, infection may be done by forced infiltration. As a non-limiting example, forced infiltration may include syringe infiltration, vacuum infiltration, and the like. As a non-limiting example, vacuum infiltration may include vacuum infiltration using a vacuum pump, vacuum infiltration using a syringe, and the like. Any persons skilled in the art, upon reviewing the entirety of this disclosure, will be aware of various infiltration that may be applied to generate a plant virus-based particle as described in this disclosure.

With continued reference to FIG. 2A, at step 210, method 200 includes sampling symptomatic leaves from the plant. In this disclosure, "sampling" refers to action of taking samples from the leaves of the plants to see if they have produced the necessary plant virus-based particles. This can only happen after the infection process occurs since there must be time in between for the plant to produce the particles. Samples may be taken from leaves of the plant that are symptomatic. In the case of tomato bushy stunt virus, at least six days may be needed to pass until samples of tomato bush stunt virus are formed in a plant. Once plant virus-based particles are detected, then they can be extracted which is explained further below.

With continued reference to FIG. 2A, at step 215, method 200 includes homogenizing plant virus-based particle. In this disclosure, "homogenizing" is the process of blending elements into a mixture to become uniform. The homogenization process may include the use of an extraction buffer. An "extraction buffer" is an aqueous solution used for the purpose of breaking open cells and may contain salts to regulate the acidity of the buffer. In other words, the tissue of the plant containing plant virus-based particles is combined with the extraction buffer solution. In the case of the tomato bushy stunt virus, sodium acetate is used as the extraction buffer.

With continued reference to FIG. 2A, at step 220, method 200 includes incubating a plant virus-based particle. The homogenous mixture of the plant leaves and extraction buffer are incubated in ice for a period of time before the centrifuging begins, which is explained below. In this disclosure, "incubating" is the process of submerging something into a hot or cold temperature for a certain period of time. In this scenario, plant virus-based particles are exposed to ice for a certain period of time.

With continued reference to FIG. 2A, at step 225, method 200 includes centrifuging plant virus-based particle. In this disclosure, "centrifuging" means the process of using a centrifuge device that uses a centrifugal force to separate various components. Each virus particle has a specific amount of centrifuging time before in can be removed, and in the case of the tomato bushy stunt virus, centrifuging may occur twice or as many as three times.

With continued reference to FIG. 2A, at optional step 230, method 200 may include filtrating plant virus-based particle. In this disclosure, the filtration method used may be gel-filtration. In this disclosure, "gel-filtration" is molecular chromatography in the process, separation is based on the differing ability (due to differing molecular size) of molecules in the sample to enter the pores of the gel-filtration medium. It is also known as size-exclusion chromatography. The chromatography column is packed with fine, porous beads which are composed of dextran polymers, agarose, or polyacrylamide. The pore sizes of these beads are used to estimate the dimensions of macromolecules and separate them accordingly. The main application of gel-filtration chromatography is the fractionation of proteins and other water-soluble polymers, while gel permeation chromatography is used to analyze the molecular weight distribution of organic-soluble polymers.

Now referring to FIG. 2B, another flow diagram illustrating an exemplary embodiment of another possible method 200 of an engineered virus-based nanoparticle for the treatment of an autoimmune condition is shown. Engineered virus-based nanoparticle 100 may include, without limitation, any of the nanoparticles described herein with reference to FIG. 1.

With continued reference to FIG. 2B, at step 205, method 200 includes agroinfiltration of a plant with a virus to produce a plant virus-based particle. For the cowpea mosaic virus, the process of agroinfiltration may be used. In this disclosure, "agroinfiltration" is a method used in plant biology to induce transient expression of genes in a plant in order to produce a desired protein. In a process of agroinfiltration, *Agrobacterium tumefaciens* may be directly injected into a plant leaf or brought into association with plant cells immobilized on a porous support. Subsequently, bacteria may transfer the desired gene into plant cells via transfer of T-DNA. Agroinfiltration may be beneficial when compared to more traditional plant transformations due to its speed and convenience, although yields of the recombinant protein may generally also be higher and more consistent. Other production processes may also be used to produce any type of plant virus-based particle. Once the plants have undergone the production processes, they can now produce plant virus-based particles to be used in the composition. Plant virus-based particle may be any of plant virus-based particles mentioned herein. In the case of cowpea mosaic virus, at least six days may be needed to pass until samples of the cowpea mosaic virus are formed in a plant.

With continued reference to FIG. 2B, at step 210, method 200 includes sampling leaves of the plant. This step may be performed utilizing any process of sampling as explained above.

With continued reference to FIG. 2B, at step 215, method 200 includes homogenizing plant virus-based particle. This step may be performed utilizing any process of homogenization as explained above in the case of the cow pea mosaic virus, a sodium phosphate buffer may be used. Another buffer that may be used is a PBS buffer, which is explained above in reference to FIG. 1.

With continued reference to FIG. 2B, at step 220, method 200 includes centrifuging plant virus-based particle. This step may be performed utilizing any process of centrifugation as persons skilled in the art, upon reviewing the entirety of this disclosure, will be aware of various centrifugation that may be applied to centrifuge plant virus-based particle as described in this disclosure. Cowpea mosaic virus production may not need to involve incubation.

Figure 2B:
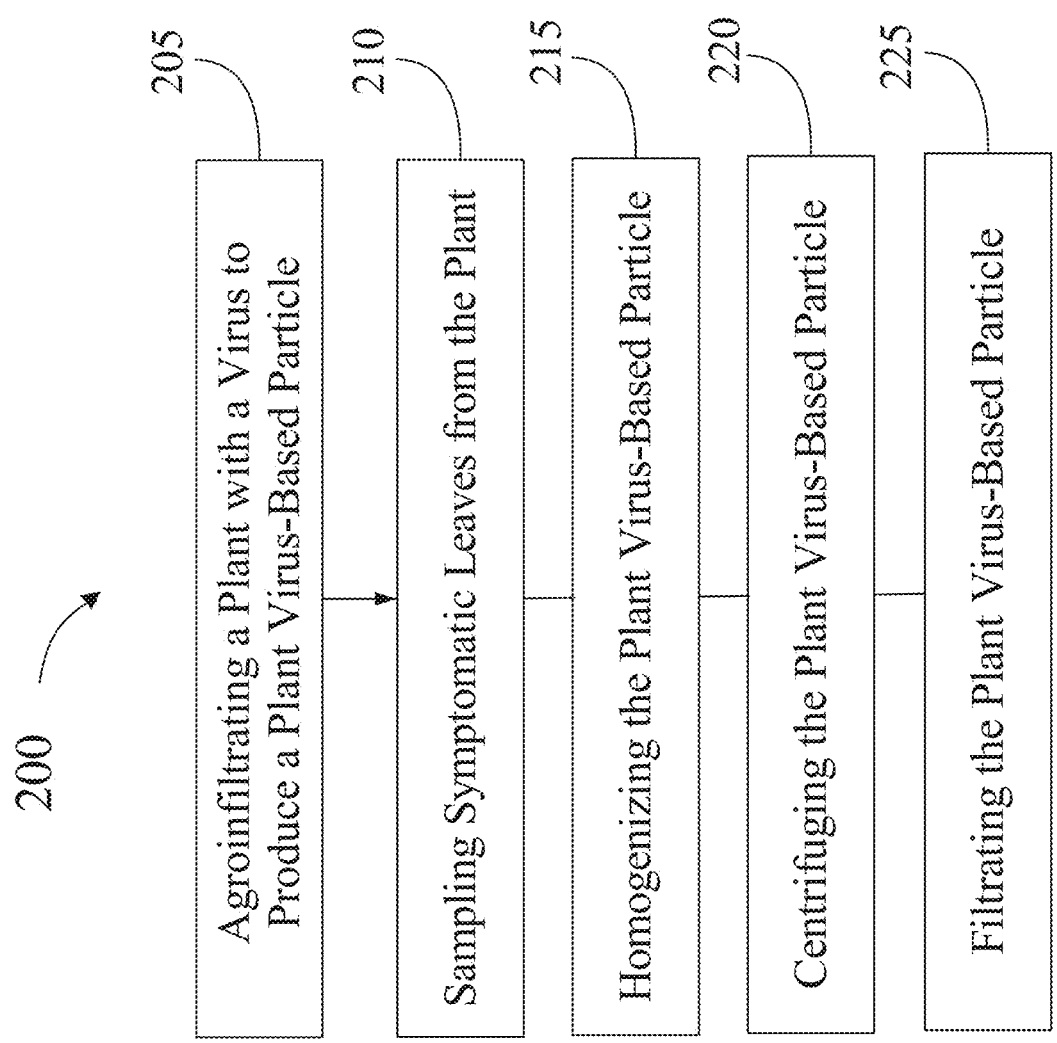
FIG. 2B is a flow diagram illustrating an exemplary embodiment of another method of obtaining an engineered virus-based nanoparticle for the treatment of an autoimmune condition.

With continued reference to FIG. 2B, at step 225, method 200 includes filtrating plant virus-based particle. This step may be performed utilizing any process of filtration as explained above. Additionally without limitation, once nanoparticles displaying immunodominant peptides are infected or other production processes into the plants, then the plants may start to produce genetically modified plant viruses. The plant may act as a bioreactor. After the plant-based virus particles are discovered, they may be homogenized with an extraction buffer as described herein with reference to FIGS. 2A and 2B. After homogenization, the particles may experience filtration followed by supernatant centrifugation. Once the centrifugation is complete, then the particle may be gel-filtrated and analyzed.

Figure 3:
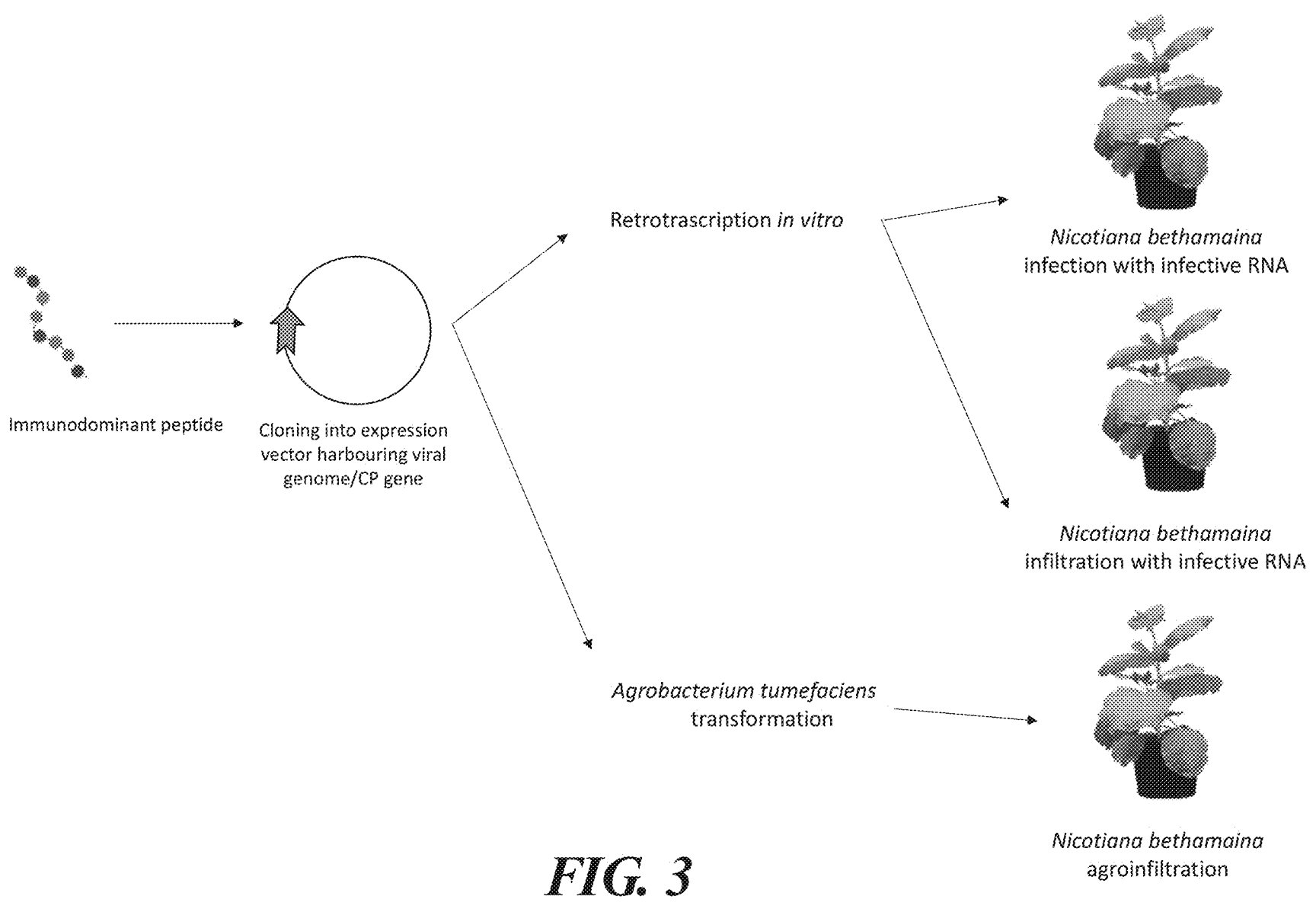

Now referring to FIG. 3, an exemplary embodiment of a method of manufacturing an engineered virus-based nanoparticle for the treatment of an autoimmune condition is illustrated. In the figure, an immunodominant peptide is cloning into an expression vector harboring a viral genome or coat protein (CP) gene. In this disclosure, an "expression vector," otherwise known as an "expression construct", is usually a plasmid or virus designed for gene expression in cells. Then the immunodominant peptide goes through either retro-transcription in vitro or an *Agrobacterium tumefaciens* transformation. In retro-transcription in vitro, the *Nicotiana bethamaina* plant may go through infection with the infective RNA. In retro-transcription in vitro, the *Nicotiana bethamaina* plant may go through infiltration with the infective RNA. Infiltration disclosed herein is further described in detail below. For the *Agrobacterium tumefaciens* transformation, the *Nicotiana benthamiana* plant may experience agroinfiltration as explained above. Though, in this embodiment, the *Nicotiana bethamaina* plant is used, any plant described herein may be used for the production of plant virus-based particles.

Referring now to FIGS. 4A-4E, FIGS. 4A-4E are illustrations that depict the characterization 400 of wt CPMV and CPMV·p524opt. Wild-type particles (wt CPM V) and particles displaying the p524opt peptide (CPMV p524opt) may be characterized and compared after purification from *N. benthamiana* leaves. For CPMV, 25 to 30 g of infiltrated leaf tissue may be extracted, and the green juice may be processed by anion-exchange chromatography (DEAE Sephadex A-50 resin) to remove impurities. The flow-through fraction may be collected and concentrated 30-fold using 100-kDa cutoff Centricon tubes. The pVNPs may be then isolated from the concentrate by size exclusion chromatography using a HiPrep 16/60 Sephacryl S-500 HR (AK-TAprime plus) column. For TBSV, 30 to 40 g of mixed symptomatic and locally infected leaves may be collected, and the green juice may be extracted as previously described. Briefly, after filtration, the extract may be incubated in ice for 1 hour and centrifuged at 8000 g for 15 min at 4° C. The supernatant may be collected and centrifuged at 90,000 g for 1 hour at 4° C. The pellet may be then resuspended in 50 mM sodium acetate (pH 5.3), and the resulting solution may be centrifuged at 8000 g for 15 min at 4° C. The supernatant may be collected and stored at −20° C. To confirm the presence, integrity, and structure of the pVNPs, total soluble protein may be extracted from infiltrated leaves and may be analyzed by SUS—polyacrylamide gel electrophoresis and silver staining, Western blot (CPMV only), DLS, and TEM. CPMV particles may be detected using primary polyclonal antibody G49 diluted to 1:2000.

Figure 7A:
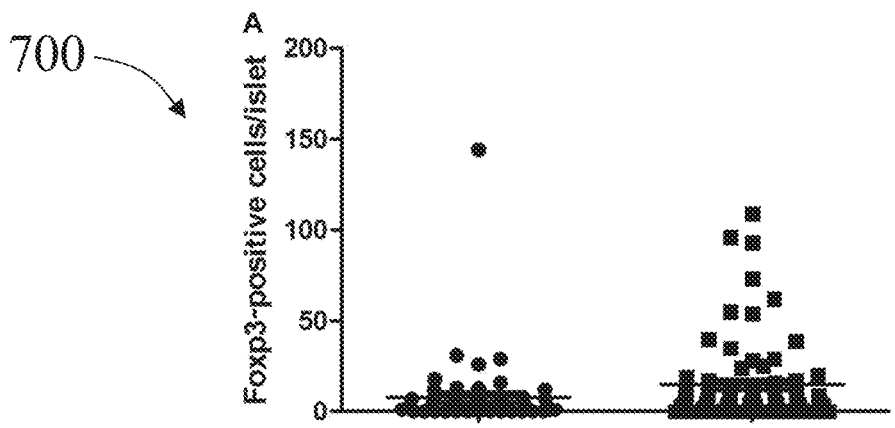
FIGS. 7A-7C are illustrations that depict cell numbers and global cytokine profiles in NOD mice treated with CPMV (Cow pea mosaic virus)-derived particles.
Figure 7B:
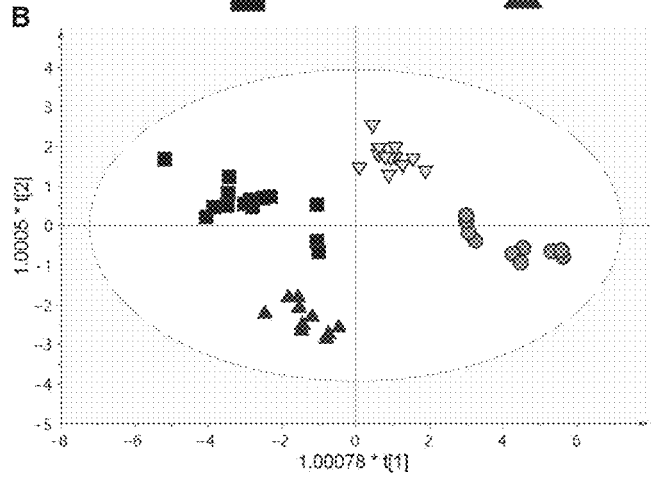
Figure 7C:
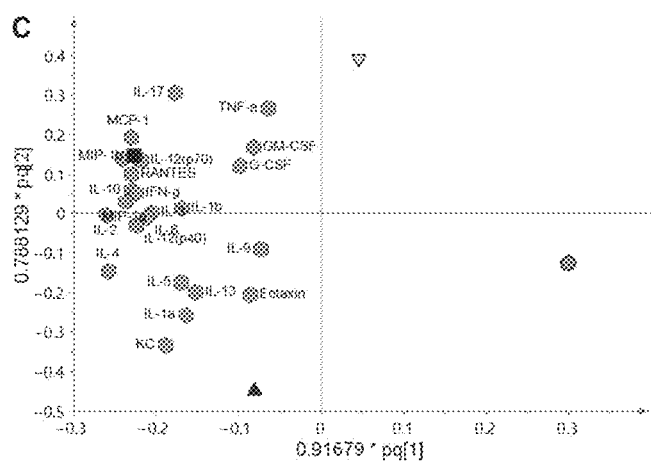

With continued reference to FIGS. 4A-4E, gel electrophoresis under denaturing conditions may be followed by silver staining (as shown in FIG. 4A) and Western blot analysis to assess the purity of the particles (as shown in FIG. 4B). As used in this disclosure, a "gel electrophoresis" is a technique used to separate DNA fragments according to their size. As used in this disclosure, a "denaturation" is a process in which proteins lose their structure, which is present in their native state, by application of some external stress or compound. As used in this disclosure, a "silver staining" is a technique to detect proteins on polyacrylamide gels with metallic silver ions. The small subunit (5) and large subunit (L) may be detected in both cases. The structural conformation of the purified particles may be confirmed by TEM (as shown in FIGS. 4C and 4D) and DLS analysis (as shown in FIG. 4E). In some embodiments, CPMV-based virus-like particles (VLPs) may be produced in the leaves of *Nicotiana benthamiana* plants by agroinfiltration. The sequence of the CPMV small coat protein subunit (VP60) may be engineered to display the GAD65 peptide p524 (SEQ ID No. 1) on the outer surface of the assembled particle. In some embodiments, the wild-type p524 sequence (SEQ ID NO. 1: SRLSKVAPVIKARMM) includes a suboptimal isoelectric point (pp for display, so the sequence may be adjusted (p524opt: SEO ID NO. 2: DSRLSKVAP-VIKARMM:ED) to achieve a pI of 8.59. The p524opt sequence (SEQ ID No. 2) may be inserted within the 13B-13C loop of the small coat protein subunit in pEAQ-HT-VP60 (SEQ ID No. 5) to produce vector pEAQHT-VP60·p524opt (SEQ ID No. 6). *N. benthamiana* leaves may be infiltrated with *Agrobacterium tumefaciens* carrying pEAQ-HT-VP60.p524opt (SEQ ID No. 6) or pEAQ-HT-VP60 (SEQ ID No. 5) as a control) together with another *A. tumefaciens* strain carrying pEAQ-HT-24K (SEQ ID No. 7), encoding the large coat protein subunit. Extracts of leaves infiltrated with pEAQ-HT-24K (SEQ ID No. 7) plus either pEAQ-HT-VP60·p524opt (SEQ ID No. 6) or pEAQ-HT-VP60 (SEQ ID No. 5) may be prepared 6 days post-infiltration (dpi) for analysis by Western blot using an anti-CPMV antiserum as shown in FIG. 4A. This may reveal the presence of the processed large and small coat proteins in both samples, with the small coat protein derived from pEAQ-HT-VP60.p524opt (SEQ ID No. 6) migrating more slowly than that from pEAQ-HT-VP60 (SEQ. ID NO. 5), consistent with the presence of the p524opt peptide (SEQ ID No. 2). The virus particles may be isolated from *N. benthamiana* leaf tissue, resulting in yields of 100 mg of purified CPMV per kilogram of leaf fresh weight (LFW) and 10 mg of purified CPMV·p524opt per kilogram of LFW as determined by a silver staining as shown in FIG. 4B, which may also indicate that the p524opt peptide (SEQ ID No. 2) was displayed on the surface of the particles. Transmission electron microscopy (TEM) may show no structural differences between CPMV and CPMV·p524opt, confirming that the peptide may have not interfered with self-assembly as shown in FIGS. 4C and 4D. As used in this disclosure, a "transmission electron microscopy" is a number-based technique that shows stronger emphasis of the smallest components in the size distribution. Likewise, dynamic light scattering (DLS) analysis may show that CPMV and CPMV·p524opt includes a similar hydrodynamic radius as shown in FIG. 4E. As used in this disclosure, a "dynamic light scattering" is an intensity-based technique that puts higher emphasis on the larger particle sizes. The sequence encoding the p524opt peptide (SEQ ID NO. 2: DSRLSKVAPVIKARIVLMED) may be codon-optimized for *N. benthamiana* and may be transferred to vector pEAQ-HT-VP60

(SEQ ID No. 5) as previously described to generate the recombinant plasmid pEAQ-HT-VP60·p524opt (SEQ ID No. 6). The sequences encoding the peptides pLIp1 (SEQ ID NO. 3: ASVLANVAQAFE) and pFADK2 (SEQ ID NO. 4: AKVLANLAHPPA) may be likewise codon-optimized and transferred to the 'TBSV expression plasmid as previously described. The transient expression of CPMV vectors may be achieved by introducing pEAQ-HT-VP60·p524opt (SEQ ID No. 6) (or pEAQ-HT-VP60 (SEQ ID No. 5) as a control) along with pEAQ-HT-24K (SEQ ID No. 7) into *A. tumefaciens* strain LBA4404. Four leaves may be manually infiltrated in 3 or 30 *N. benthamiana* plants depending on the scale of expression and isolated the pVNPs 6 dpi. The transient expression of TBSV vectors may be achieved by in vitro transcription to produce infectious RNAs, which may be used for the manual infection of two leaves in three *N. benthamiana* plants. Leaves displaying local and systemic infection symptoms may be pooled and checked for recombinant virus RNA by reverse transcription polymerase chain reaction (RT-PCR). Sap may be collected from the infected leaves 6 to 10 dpi (depending on the construct) and may be used for the secondary large-scale infection of 50 plants. The pVNPs may be isolated 6 to 10 days later, following the appearance of infection symptoms.

Now referring to FIGS. 5A 5E, FIGS. 5A 5E are illustrations that depict the characterization 500 of wt TBSV 504, TBSV·pFADK2 508 and TBSV·pLIpi 512. Wild-type particles (wt TBSV) 504 and particles displaying the pLIp1 and pFADK2 peptides (TBSV·pLIp1 512 and TBSV·pFADK2 508, respectively) may be analyzed after purification from infected *N. benthamiana* plants. Gel electrophoresis under denaturing conditions was followed by silver staining of the purified particles (as shown in FIG. 5A). The structural conformation of the purified wt TBSV 504 (as shown in FIG. 5B), TBSV·pLIp1 512 (as shown in FIG. 5C), and TBSV·pFADK2 508 (as shown in FIG. 5D) particles may be assessed by TEM and DLS analysis (as shown in FIG. 5E). TBSV-based pVNPs may be produced in *N. benthamiana* plants, following the engineering of the surface-exposed C terminus of the coat protein to display pLIp1 (SEQ ID NO. 3: ASVLANVAQAFE) or pFADK2 (SEQ ID NO. 4: AKVLANLAHPPA). In vitro transcribed genomic RNA encoding the wild-type IBM" 504 and modified TBSV·pLIp I 512 and TBSV·pFADK2 508 coat proteins may be used for the infection of *N. benthamiana* plants. Infected plant material may be collected when symptoms of virus disease appeared, and the pVNPs may be purified and analyzed by Western blot and silver staining as above (as shown in FIG. 5A). In a non-limiting example, yields of 65 mg/kg LFW for wild-type TBSV 504, 72 mg/kg for TBSV·pLIp1 512, and 114 mg/kg for TBSV·pFADK2 508 may be achieved. TEM (as shown in FIGS. 5B-5D) and DLS (as shown in FIG. SE) analysis may reveal that the modified particles assembled in the same manner as the wild-type virus.

Now referring to FIGS. 6A-6B, FIGS. 6A-6B are illustrations of diagrams 600 that depict partial protection from autoimmune diabetes in NOD mice treated with CPMV-derived particles displaying the p524opt peptide. NOD female mice before the onset of insulitis by intraperitoneal injection with synthetic peptides (p524 604 and p524opt 608), pVNPs (one dose of CPMV·p524opt 612 or two doses of CPMV·p524opt 616), or wild-type CPMV 620 as a control may be treated. Neither of the peptides may alter the disease course, but the two doses of CPMV·p524opt nanoparticles 616 may induce a protective effect compared to the other treatments (overall P=0.01, log-rank test).

With continued respect to FIG. 6A, the survival curves of groups treated with CPMV-derived particles may indicate partial protection from the onset of diabetes in mice treated twice with CPMV·p524opt 616 compared to all the other groups wt CPMV 620, p524opt synthetic peptide+IFA 608, and p524 synthetic peptide+IFA 604. The single administration of CPMV·p524opt 612 may not prevent the onset of diabetes. The r axis indicates the number of days after the first treatment. As shown in FIG. 6A. Kaplan-Meier analysis may show a significantly lower progression to diabetes for NOD mice treated with two doses of CPMV·p524opt 616 compared to wild-type CPMV 620 (P=0.04), p524opt 608 (P=0.008), or p524 604 (P=0.001). The untreated group may show a survival curve identical to the wild-type CPMV 620 group: first clinical symptoms at 71 days of age, 30% disease prevalence at 121 days, 50% at 142 days, and 80% at 168 days. Comprehensive statistical comparisons among treatments are provided with respect to Table 5.

With continued respect to FIG. 6B, the histopathology of pancreatic islet cells may be determined in subsets of the treated mice by counting infiltrated cells. After 5 and 10 weeks of treatment (5 w and 10 w) and at the end of the treatment, some animals may be euthanized to characterize the progression of the disease; CPMV·p524opt 616 in FIG. 6B may include the animal group that received double treatment. Nondiabetic NOD female mice may be examined for islet infiltration at different time points (5, 10, and 27 weeks after the treatment). Histological analysis of pancreas samples may show a significant overall difference in insulitis score among the different treatment groups (Kruskal-Wallis test. P<0.0001). As shown in FIG. 6B, a significant difference may be observed at all three time points between animals treated with CPMV·p524opt 616 and those treated with the wild-type virus 620 (P<0.0001), as well as at 10 and 27 weeks between animals treated with CPMV·p524opt 616 and those treated with p524 608 (P<0.0001).

Referring now to FIGS. 7A-7C, FIGS. 7A-7C are illustrations 700 that depict $T_{reg}$ cell numbers and global cytokine profiles in NOD mice treated with CPMV-derived particles. As Foxp3+ regulatory T (Treg) cells may play a key role in self-tolerance, whether CPMV·p524opt increased the number of Foxp3+ cells in the treated mice is investigated. Immunofluorescence analysis of pancreatic sections may reveal a significantly lower (P=0.034) number of Foxp3+ cells within and around islets in mice treated with CPMV·p524opt compared to those treated with wild-type CPMV as shown in FIG. 7A. Mice treated with two doses of CPMV·p524opt and mice treated with the wt CPMV particles may show no significant difference in the number of $Foxp3^+$ T cells as shown in FIG. 7A. OPLS-DA score scatter plot (as shown in FIG. 7B) and loading scatter plot (as shown in FIG. 7C) of the preclinical study model (explained variance=44.7%) with two doses (square) or one dose (circle) of CPMV·p524opt, with the wt CPMV (triangle pointing up) and with p524 synthetic peptide (triangle pointing down) are shown. The PLS-DA model may include 3 latent variables for X (predictor variables), 6 latent variables for Y (response variables), and 0 orthogonal components. The cumulative R2X (cumulative explained variance in X) may include 0.919, indicating that the model accounts for 91.9% of the variation in the predictor variables. The cumulative R2Y (cumulative explained variance in Y) may include 0.878, indicating that the model explains 87.8% of the variation in the response variables. The cumulative Q2 (cumulative predictive ability) may include 0.764, suggesting that the model has good predictive performance. (OPLS-DA model 3+6+0, R2X(cum)=0.919, R2Y(cum)=0.878, Q2(cum)=0.7641. In the loading scatter plot as shown in FIG. 7C, the hexagons may show the contribution of each cytokine to the statistical classes. The global cytokine profile may show the activation of different cytokines in mice treated twice with wt CPMV (triangle pointing up) and CPMV·p524opt (square). Mice treated twice with the synthetic p524opt peptide (triangle pointing down) or once with CPMV·p524opt (circle) may not show specific activation profiles compared to the other treatment groups. Serum from all treatment groups may be analyzed to identify soluble mediators, and the distribution among groups may be determined by two-way orthogonal partial least squares discriminant analysis (OPLS-DA), indicating four distinct groups matching the different treatments (in FIG. 4B). The corresponding scatter plot (in FIG. 4C) may reveal two principal components. The first (P1; horizontal axis) may explain 34.5% of the variability and may separate CPMV·p542opt 2 treatments+wt CPMV from CPMV·p524opt single treatment+p524. This may reflect the activation of soluble mediators with different profiles depending on the treatment: mainly KC (keratinocyte chemoattractant), IL1a (interleukin-1a), IL13, eotaxin, and IL9 for wt CPMV but mainly MCP1 (monocyte chemoattractant protein 1), MIP1B (macrophage inflammatory protein 1B)/1A, IL12, IL10, RANTES, IFNγ (interferon-γ), and IL2 for CPMV·p524opt 2 treatments; the CPMV·p542opt 1 treatment may show the non-activation of the aforementioned cytokine profile rather than a specific signature. The second (P2; vertical axis) may explain 10.2% of the variability and seems to correlate with the concentration of p524.

Figures 8A, 8B, 8C:
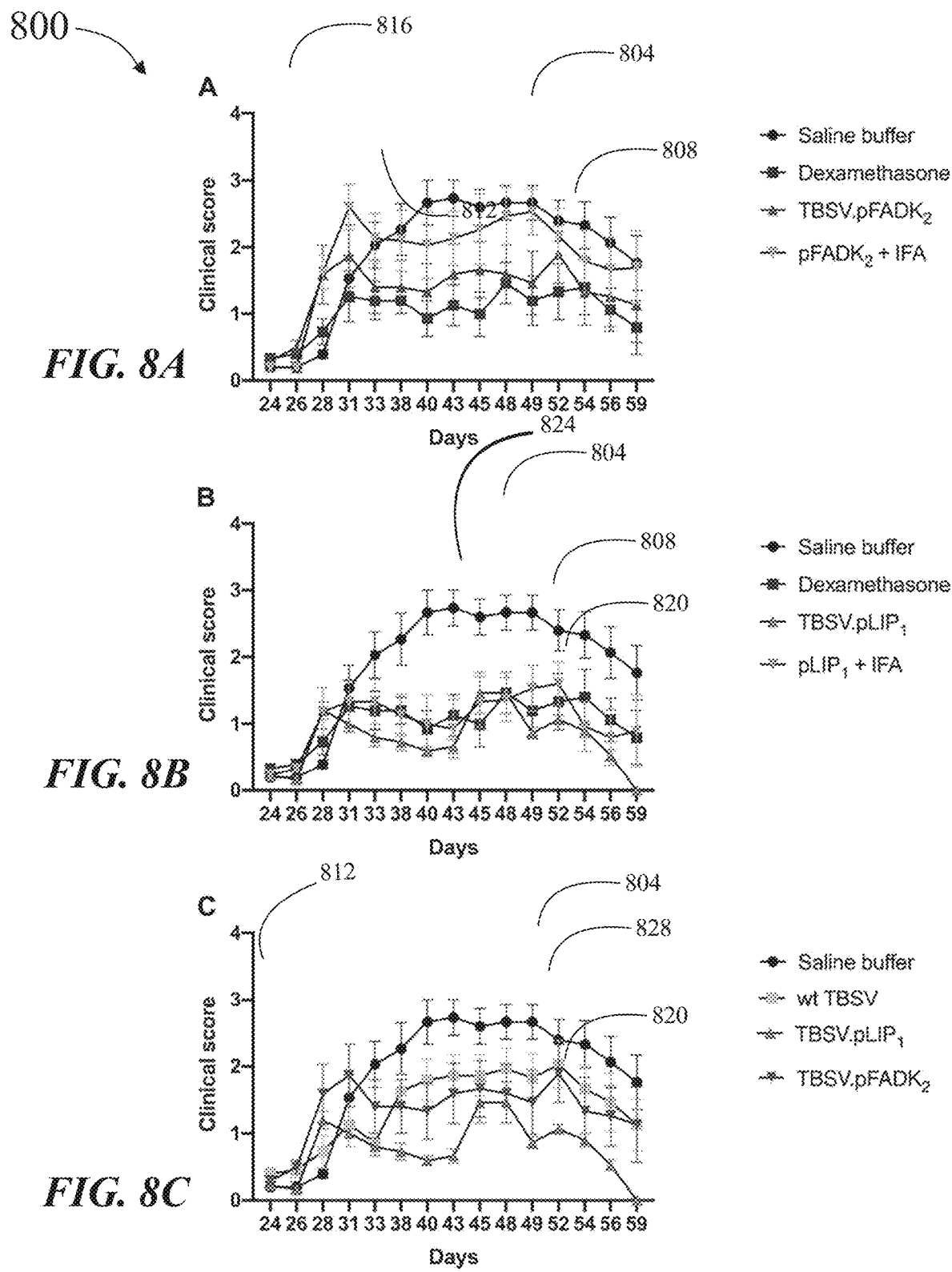
FIGS. 8A-8C are illustrations that depict an effect of TBSV (tomato bush stunt virus)-derived particles on the severity of CIA.

Referring now to FIGS. 8A-8C, FIGS. 8A-8C are illustrations 800 that depict an effect of TBSV-derived particles on the severity of CIA. The first signs of arthritis in DBA mice may appear 28 days after collagen injection, and 100% of the immunized mice may exhibit arthritis after 33 days. FIGS. 8A-8C show the effect of pVNPs and synthetic peptides administered starting 28 days after immunization compared to a negative control group treated with saline. Arthritic scores in each group may be assessed every 2 to 3 days starting from days 24 to 59 after immunization FIG. 8A depicts comparison of saline-treated CIA mice 804 (control) to CIA mice treated with dexamethasone 808, TBSV pFADK2 812, or pFADK2+IFA 816. FIG. 8B depicts comparison of saline-treated CIA mice 804 (control) to CIA mice treated with dexamethasone 808, TBSV·pLIp1 820, or pLIp1+IFA 824. FIG. 8C depicts comparison of saline-treated CIA mice 804 (control) to CIA mice treated with wt TBSV 828, TBSV pLIp1 820, or TBSV·pFADK2 812. Each time point represents the mean arthritic score±SEM (n=5). Statistical significance may be determined by applying the Kruskal-Wallis test followed by Dunn's multiple comparison test. Values of P<0.05 may be considered significant. Significance may be established for CIA mice treated with dexamethasone versus saline-treated CIA mice 804 and for CIA mice treated with TBSV·pLIp1 820 versus saline-treated CIA mice 804. As shown in FIG. 8A, the group treated with TBSV·pFADK2 812 may demonstrate a lower clinical score (days 31 to 60 after immunization) compared to mice treated with pFADK2 plus incomplete Freund's adjuvant (IFA) 816, which is a remarkable improvement given the comparable disease symptoms on day 28. The effect on mice treated with TBSV pFADK2 812 may be similar to that of the positive control group injected with dexamethasone 808. However, at the end of the immunization period (day 28), TBSV·pFADK2 812 may be administered only to those mice whose disease severity was higher than that of control group mice, thus supporting the greater efficacy of TBSV·pFADK2 812. As shown in FIG. 8B, the group treated with TBSV·pLIp1 820 receiving the TBSV·pLIp1 820 and pLIp1+IFA 824 formulations may include the same clinical arthritis score 28 days after immunization. However, the administration of TBSV·pLIp1 820 may completely abolish all clinical signs of arthritis at the end of treatment, whereas mice treated with pLIp1+IFA 824 includes similar arthritis scores on day 60 to mice treated with dexamethasone 808, although the former group was characterized by more severe arthritis at the beginning of treatment. Lastly, as shown in FIG. 8C, the comparison of TBSV·pFADK2 812, TBSV·pLIp1 820, and wild-type TBSV 828 may reveal that even wild-type TBSV induced partial protection, as also seen for the wild-type CPMV particles in the T1D model in FIG. 6A. Treatment with TBSV·pLIp1 820 may be the most effective, eliminating all signs of arthritis by the end of the treatment period (as shown in FIG. 8B). The efficacy of TBSV·pFADK2 812 may appear similar to the wild-type TBSV 828, but it may be important to consider that, by day 28, the group treated with TBSV·pFADK2 812 had a higher clinical score than the group treated with wild-type TBSV 828. These data may support the hypothesis that intrinsic virus structures boost the regulatory activity of immunodominant peptides and work as an adjuvant.

Figure 9B:
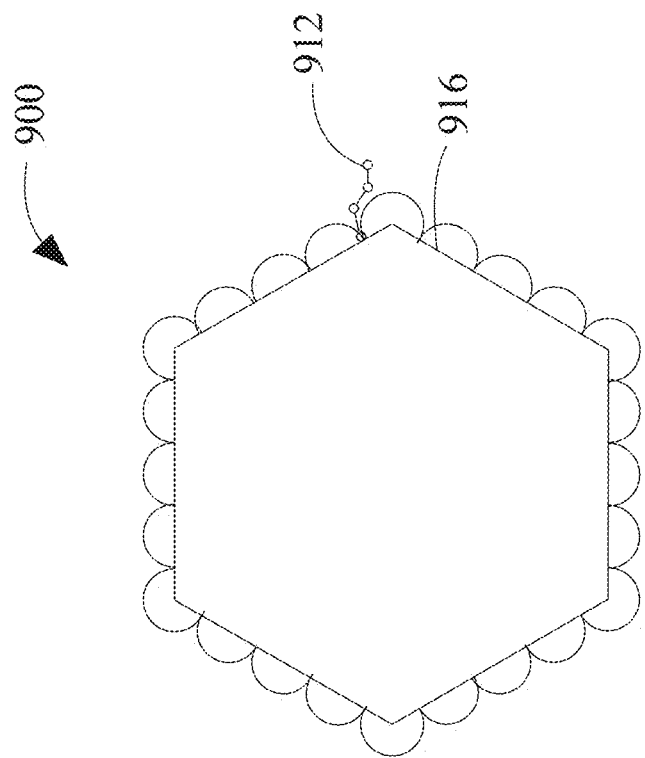
FIGS. 9A-9B illustrate exemplary embodiments of a composition of an engineered virus-based nanoparticle for a treatment of an autoimmune condition.
Figure 9A:
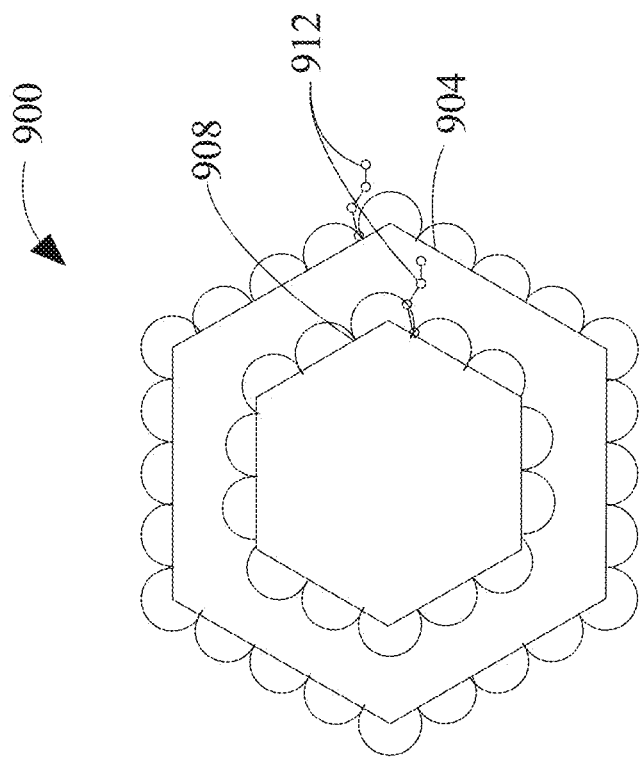

Referring now to FIG. 9A, an exemplary embodiment of a composition 900 of an engineered virus-based nanoparticle for a treatment of an autoimmune condition is illustrated. In some embodiments, the engineered virus-based nanoparticle may include cowpea mosaic virus, wherein the cowpea mosaic virus is further described above. In some embodiments, composition 900 may include large coat protein subunit 904. As a non-limiting example, composition 900 may include 60 copies of large coat protein subunit 904. In some embodiments, composition 900 may include small coat protein subunit 908. As a non-limiting example, composition 900 may include 60 copies of small coat protein subunit 908. In some embodiments, composition 900 may include at least a peptide. In some embodiments, at least a peptide may include immunodominant peptide 912. In some embodiments, immunodominant peptide 912 may be embedded in coat protein. In some embodiments, immunodominant peptide 912 may be located outside of coat protein. In some embodiments, immunodominant peptide 912 may be exposed on the surface of large coat protein subunit 904. In some embodiments, immunodominant peptide 912 may be located inside of a particle. In some embodiments, immunodominant peptide 912 may be placed inside of coat protein. In some embodiments, composition 900 may include icosahedral structure. In some embodiments, composition 900 may include filamentous structure. In some embodiments, composition 900 may include rod-shaped structure. In some embodiments, composition 900 may include helical capsid structure. In some embodiments, composition 900 may include a spherical structure. Additionally without limitation, composition 900 may include any structure thereof. In some embodiments, composition 900 may be homogeneous in size. In some embodiments, composition 900 may be homogeneous in shape.

Referring now to FIG. 9B, an exemplary embodiment of a composition 900 of an engineered virus-based nanoparticle for a treatment of an autoimmune condition is illustrated. Composition 900 disclosed herein may be consistent with a composition described with respect to FIG. 9A. In some embodiments, the engineered virus-based nanoparticle may include tomato bushy stunt virus, wherein the tomato busy stunt virus is further described above. In some embodiments, composition 900 may include a single protein subunit 916 as shown in FIG. 9B. As a non-limiting example, composition 900 may include 90 copies of a single protein subunit 916. In some embodiments, composition 900 may include at least a peptide. In some embodiments at least a peptide may include immunodominant peptide 912. In some embodiments, immunodominant peptide 912 may be exposed on the surface of a single protein subunit 916.

Figure 10A:
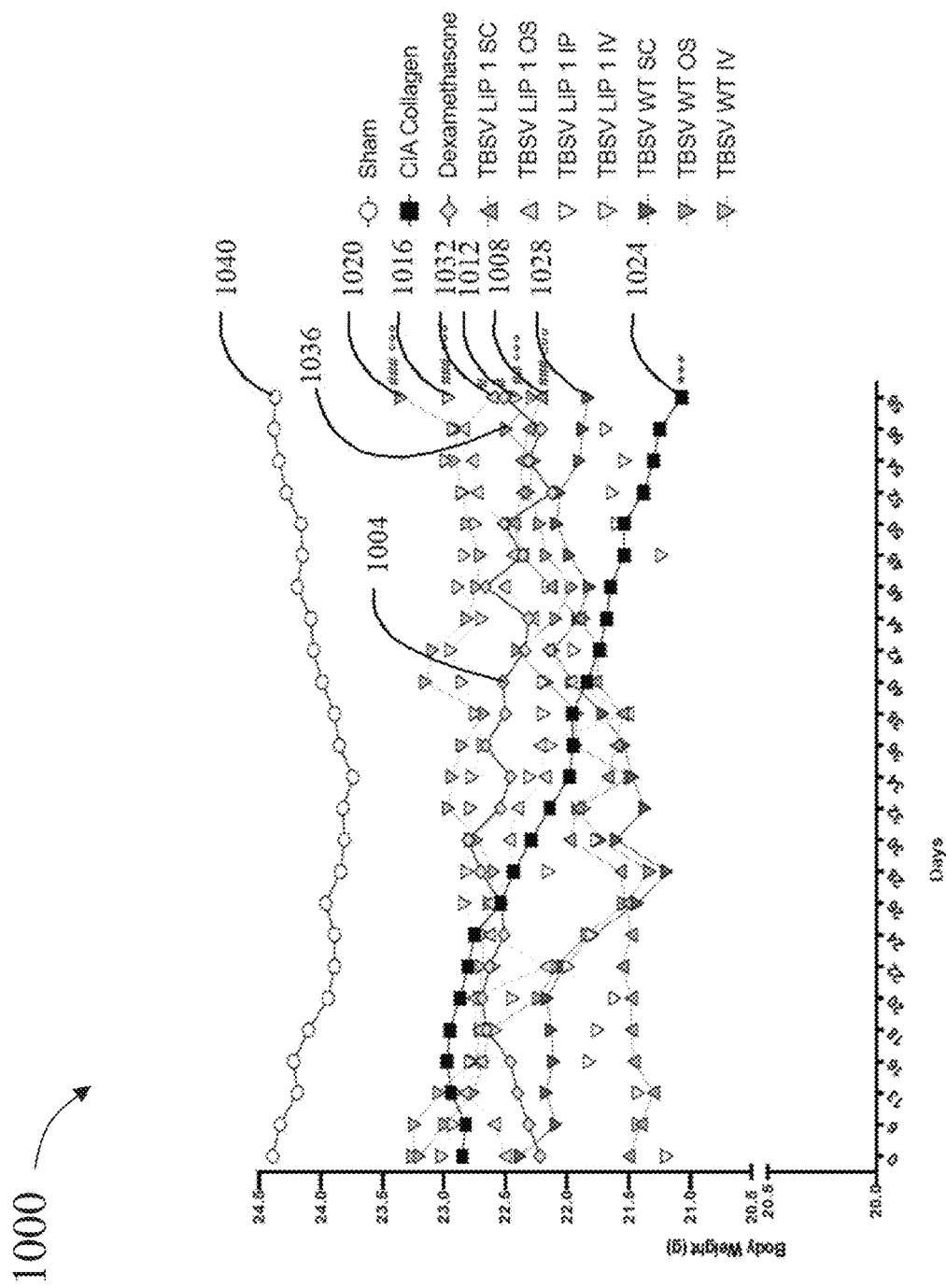
FIG. 10A illustrates a body weight evaluation of the effect of TBSV (tomato bush stunt virus)·pLIp1 (*Liprin alpha* 1)

Referring now to FIG. 10A, FIG. 10A illustrates a body weight evaluation 1000 of the effect of TBSV·pLIp1. Treatments with Dexamethasone 1004, TBSV·pLIp1, administered as SC 1008, IP 1012 and IV 1016, and TBSV WT administered as IP and IV 1020 (as shown in Table 1) may significantly reduce weight loss induced by CIA 1024. Treatment with TBSV WT SC 1028 may not show any notable protective effect on weight loss. Moreover, TBSV·pLIp1 IV 1016, TBSV pLIp1 SC 1008, TBSV WT IP and TBSV WT IV 1020 treatments may have been reported to be more efficient when compared to TBSV·pLIp1 administered as IP route 1012 on body weight (as shown in FIG. 10A and Table 10). Table 10 shows percentage of reduction of body weight of TBSV·pLIp1 and TBSV WT treatments vs CIA Collagen (100%). Body weight may be recorded on days 0, 6, 13, 16, 18, 20, 22, 24, 26, 28, 30, 32, 34, 36, 38, 40, 42, 44, 46, 50, 52, 54, 56 and 58. Treatments with Dexamethasone 1004, TBSV·pLIp1 administered as IV 1016, IP 1012, OS 1032 and SC 1008 routes (Dexamethasone group, TBSV·pLIp1 IV group, TBSV·pLIp1 IP group, TBSV·pLIp1 OS group, TBSV·pLIp1 SC group) may significantly increase the loss of body weight when compared to CIA Collagen 1024 group. Also, TBSV WT administrated as IV 1020, SC 1028 and OS 1036 (TBSV WT IV group, TBSV WT SC group, TBSV WT OS group) may significantly increase body weight loss when compared to CIA Collagen 1024 mice (CAI Collagen group). Moreover, TBSV·pLIp1 OS 1032, IV 1016 and TBSV WT IV 1020 (TBSV·pLIp1 OS group, TBSV·pLIp1 IV group, TBSV WT IV group) may show significantly increase in body weight loss when compared to TBSV·pLIp1 administered as IP 1012 route (TBSV·pLIp1 IP group). ***p<0.001 vs Sham 1040; ##p<0.01 (CIA 1024 vs TBSV·pLIp1 SC 1008); ###p<0.001 (CIA 1024 vs Dexamethasone 1004, TBSV·pLIp1 IP 1012, IV 1016, TBSV WT SC 1028, TBSV WT IV 1020); °°°p<0.001 vs TBSV·pLIp1 IP 1012.

TABLE 10

| TREATAMENTS | % of reduction vs CIA Collagen |
|---|---|
| Dexamethasone | 1.56% |
| TBSV.pLIp1 SC | 1.49% |
| TBSV.pLIp1 OS | 1.50% |
| TBSV.pLIp1 IP | 1.49% |
| TBSV.pLIp1 IV | 3.03% |
| TBSV WT SC | 1.22% |
| TBSV WT OS | 0.24% |
| TBSV WT IV | 3.33% |

Figure 10B:
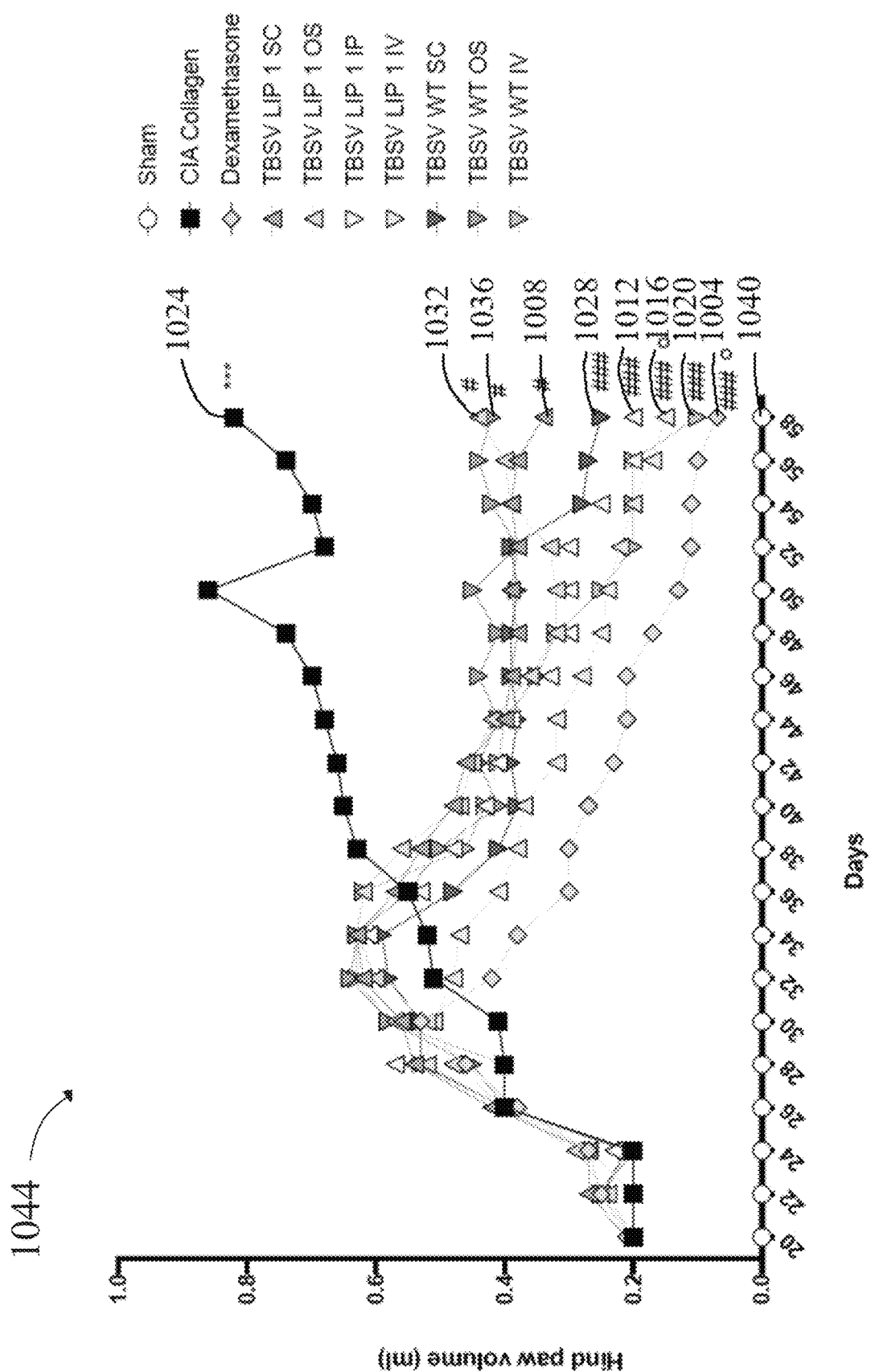
FIG. 10B illustrates paw volume measurement evaluation of the effect of TBSV (tomato bush stunt virus)·pLIp1 (*Liprin alpha* 1)

Referring now to FIG. 10B. FIG. 10B illustrates a paw volume measurement evaluation 1044 of the effect of TBSV·pLIp1. Plethysmometer measurement may demonstrate a time-dependent increase in hind paw volume (mL) starting on day 26 in all groups induced by CIA collagen 1024 compared to Sham 1040 group. Treatments with Dexamethasone 1004, TBSV·pLIp1 IP 1012, TBSV·pLIp1 IV 1016, TBSV·pLIp1 SC 1008 may significantly reduce hind paw volume compared to the CIA Collagen 1024 group. Also, treatments with TBSV WT IV 1020, TBSV WT IP and TBSV WT SC 1028 may show a significant reduction in paw volume after CIA induction. Moreover, a significant difference may be observed between TBSV·pLIp1 IV 1016 groups versus TBSV·pLIp1 IP 1012 group showing that TBSV·pLIp1 may be more efficient when administrated as IV 1016 (as shown in FIG. 10B and Table 11). Table 11 shows percentage of reduction in clinical score of TBSV·pLIp1 and TBSV WT treatments versus CIA Collagen 1024 (100%). The hind paw volume analysis may be performed to measure the reduction of edema in ankle-joints. Treatments with Dexamethasone 1004, TBSV pLIp1 IP 1012, TBSV·pLIp1 IV 1016, TBSV·pLIp1 OS 1032 and TBSV·pLIp1 SC 1008 (Dexamethasone group, TBSV·pLIp1 IP group, TBSV·pLIp1 IV group, TBSV·pLIp1 OS group, TBSV·pLIp1 SC group) may significantly reduce the paw volume compared to CIA Collagen 1024 mice (CIA Collagen group). Also, TBSV WT administered as SC 1028, OS 1036 and IV 1020 (TBSV WT SC group, TBSV WT OS group, TBSV WT IV group) may significantly reduce paw volume compared to CIA Collagen 1024 group. Moreover, Dexamethasone 1004, TBSV WT IV 1020 and TBSV·pLIp1 IV 1016 treatments (Dexamethasone group, TBSV WT IV group, TBSV·pLIp1 IV group) may show a significant reduction of paw volume compared to TBSV pLIp1 IP 1012 treatment (TBSV·pLIp1 IP group). ***p<0.001 vs Sham 1040; #p<0.05 (CIA 1024 vs TBSV·pLIp1 SC 1008); ##p<0.01 (CIA 1024 vs TBSV·pLIp1 SC 1008); ###p<0.001 vs CIA Collagen 1024 (CIA 1024 vs Dexamethasone 1004, TBSV·pLIp1 IP 1012, TBSV·pLIp1 IV 1016, TBSV WT SC 1028, TBSV WT IV 1016; *p<0.05 vs TBSV·pLIp1 IP 1012.

TABLE 11

| TREATAMENTS | % of reduction vs CIA Collagen |
|---|---|
| Dexamethasone | 44.64% |
| TBSV.pLIp1 SC | 76.78% |
| TBSV.pLIp1 OS | 75% |
| TBSV.pLIp1 IP | 66.07% |
| TBSV.pLIp1 IV | 55.35% |
| TBSV WT SC | 67.85% |
| TBSV WT OS | 76.78% |
| TBSV WT IV | 62.5% |

Figure 10C:
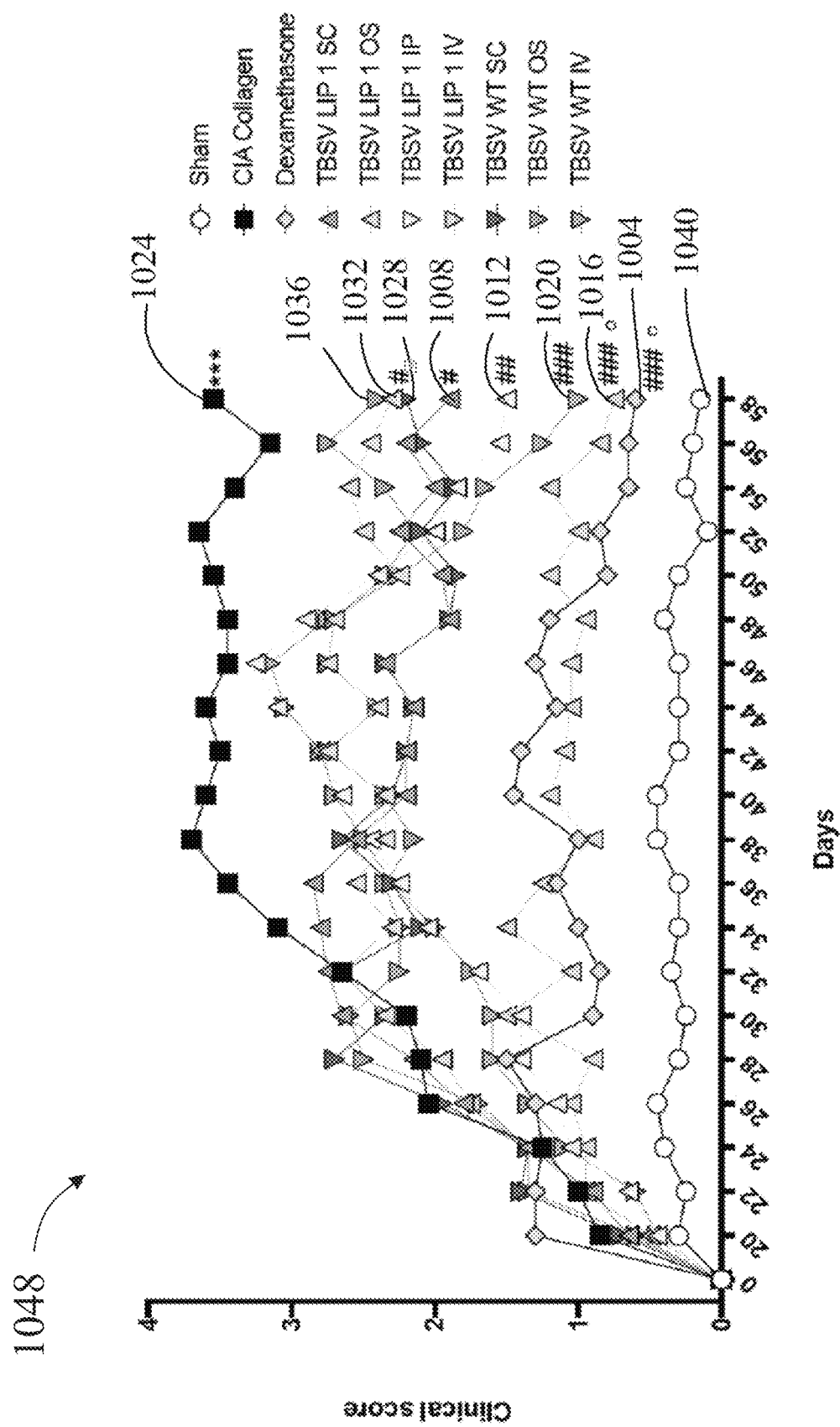
FIG. 10C illustrates a clinal score evaluation using macroscoptic observations.

Referring now to FIG. 10C, FIG. 10C illustrates a clinal score evaluation 1048 using macroscoptic observations. Macroscopic signs of CIA 1024, as periarticular erythema and swelling, may increase in frequency and severity in a time-dependent manner, with maximal arthritis indices between days 30 and 38 compared to the Sham 1040 group. Treatments with Dexamethasone 1004, TBSV·pLIp1 IP 1012, TBSV·pLIp1 IV 1016 and TBSV WT IV 1020 may significantly reduce the clinical score compared to the CIA Collagen 1024 group. However, no significance in clinical signs has been reported after treatments with TBSV·pLIp1 SC 1008, TBSV WT IP, and TBSV WT SC 1028. Moreover, TBSV·pLIp1 IV 1016 may result more efficient than IP 1012 route (as shown in FIG. 10C and Table 12). Table 12 shows percentage of reduction in clinical score of TBSV·pLIp1 and TBSV WT treatments versus CIA Collagen (100%). Clinical parameters such as slight edema and erythema limited to ankle, slight edema and erythema from the ankle to the tarsal bone, moderate edema and erythema the ankle to the tarsal bone, edema and erythema from the ankle to the entire leg may be considered for clinal score A significant amelioration in clinical signs was reported after Dexamethasone 1004, TBSV·pLIp1 IP 1012, TBSV·pLIp1 IV 1016 and TBSV WT IV 1020 treatments (TBSV·pLIp1 IP group, TBSV·pLIp1 IV group, TBSV WT IV group) compared to CIA Collagen 1024 group. No significant changes may be reported after TBSV·pLIp1 SC 1008, TBSV WT IP, and TBSV WT SC 1028 treatments (TBSV·pLIp1 SC group, TBSV WT IP group, TBSV WT SC group). Also, a significance may be reported in TBSV·pLIp1 IV 1016 group compared to TBSV·pLIp1 IP 1012 group. *p<0.001 vs Sham 1040, #p<0.05 (CIA 1024 vs TBSV·pLIp1 SC 1008, TBSV WT SC 1028), ##p<0.01 (CIA 1024 vs TBSV·pLIp1 IP 1012, TBSV WT IV 1020), ###p<0.001 (CIA 1024 vs Dexamethasone 1004, TBSV·pLIp1 IV 1016); p<0.05 vs TBSV·pLIp1 IP 1012**.

TABLE 12

| TREATAMENTS | % of reduction vs CIA Collagen |
| --- | --- |
| Dexamethasone | 37.5% |
| TBSV.pLIp1 SC | 72.42% |
| TBSV.pLIp1 OS | 76.83% |
| TBSV.pLIp1 IP | 67.27% |
| TBSV.pLIp1 IV | 36.39% |
| TBSV WT SC | 71.69% |
| TBSV WT OS | 76.83% |
| TBSV WT IV | 65.80% |

Figure 10D:
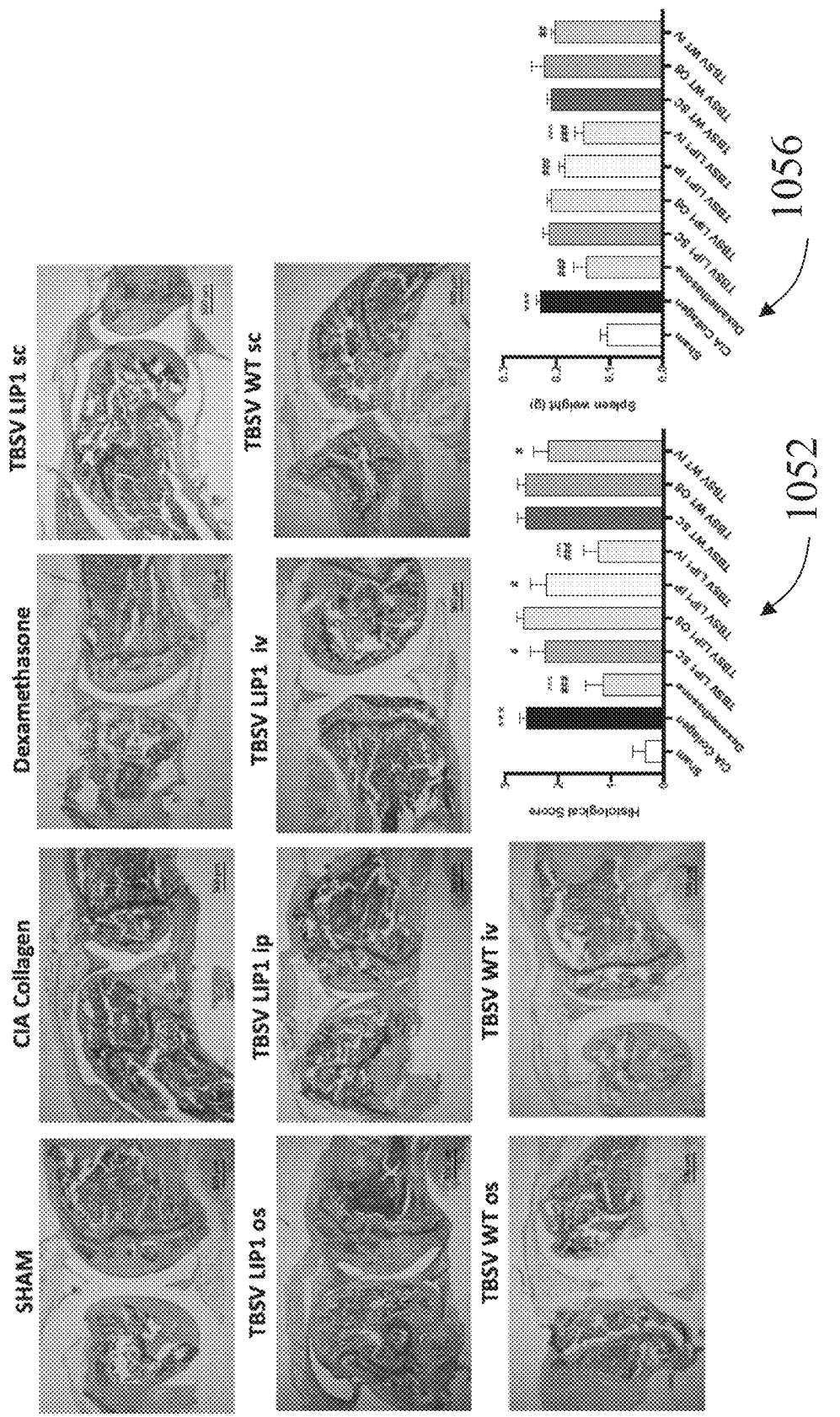
FIG. 10D illustrates a histological evaluation of ankle-joints of CIA Collagen-induced mice and spleen weight evaluation.
Figure 10E:
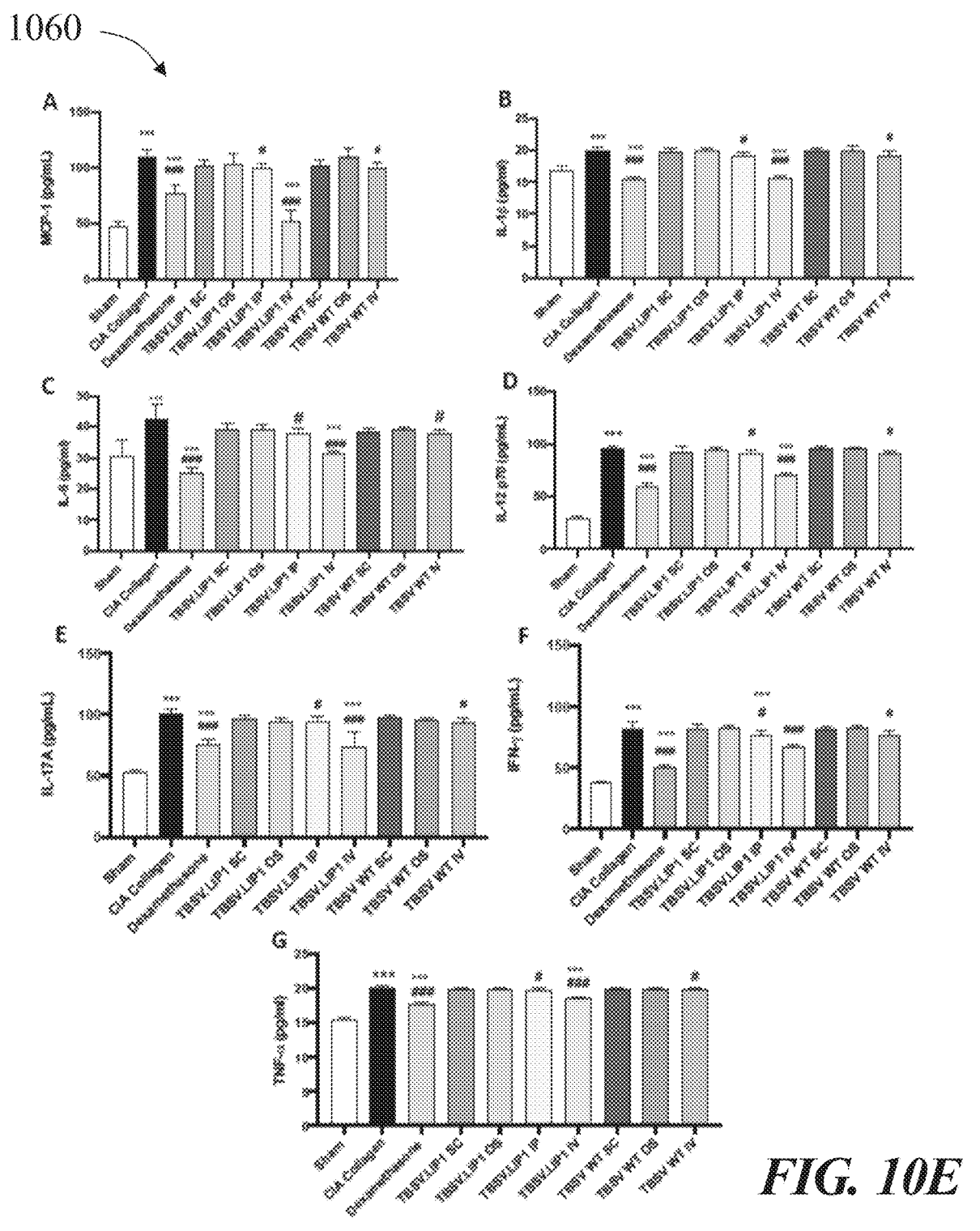
Figure 10F:
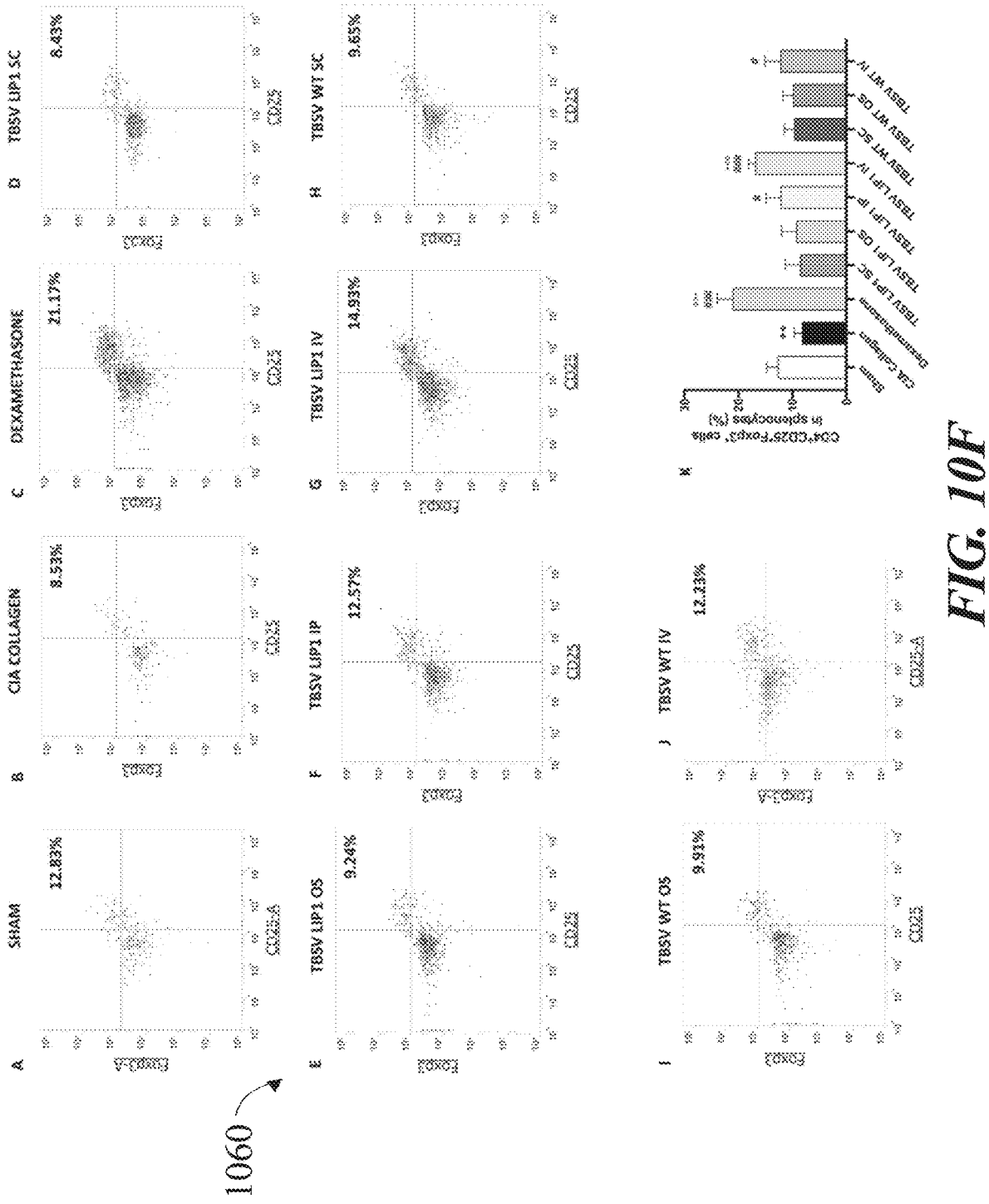
FIG. 10F illustrates spienic regulatory T cells evaluations of the effect of TBSV (tomato bush stunt virus)·pLIp1 (*Liprin alpha* 1) following CIA Collagen-induced arthritis.

Referring now to FIG. 10D, FIG. 10D illustrates a histological evaluation 1052 of ankle-joints of CIA Collagen-induced mice and spleen weight evaluation 1056. After 58 days, ankle-joints may be evaluated by addressing the following clinical score from 1 to 4: (1) slight edema and erythema limited to ankle; (2) slight edema and erythema from the ankle to the tarsal bone; (3) moderate edema and erythema the ankle to the tarsal bone; (4): edema and erythema from the ankle to the entire leg). It may be given for each limb for up to 50 days. A significant increase in synovial hyperplasia, pannus formation, cellular infiltration and cartilage erosion may be observed in CIA Collagen 1024 group compared to the Sham 1040 group. Treatments with Dexamethasone 1004, TBSV·pLIp1 SC 1008, TBSV·pLIp1 IP 1012, TBSV·pLIp1 IV 1016, and TBSV WT IV 1020 may significantly reduce the ankle-joint lesion scores compared with the CIA collagen 1024 group. Treatment with TBSV WT IV 1020 may be comparable to treatment with TBSV·pLIp1 IP 1024. Between of all routes of administration, TBSV·pLIp1 IV 1016 may appear to be the most effective in the reduction of synovial membrane inflammation, cartilage and bone erosions in CIA Collagen 1024 animals. However, no significant ameliorations in ankle-joints tissue may have been reported after treatments with TBSV·pLIp1 OS 1032, TBSV WT SC 1028 and TBSV WT OS 1036. Moreover, TBSV·pLIp1 administered as OS route 1032 may have been reported significative and more efficient when compared to TBSV·pLIp1 administered as IP route 1012 (as shown in FIG. 10D of histological evaluation 1052 and Table 13). Table 13 shows percentage of reduction in histological score of TBSV·pLIp1 and TBSV WT treatments versus CIA Collagen 1024 (100%). Also, by evaluating spleen weight, a significant increase in CIA Collagen 1024 mice may be found compared to control mice, while treatments with Dexamethasone 1004, TBSV·pLIp1 IP 1012, TBSV·pLIp1 IV 1016, and TBSV WT IV 1020 may significantly reduce the weight spleen compared to the CIA collagen 1024 group. No significant changes may be reported after treatments with TBSV·pLIp1 SC 1008, TBSV·pLIp1 OS 1032, TBSV WT SC 1028 and TBSV WT OS 1036. Particularly, TBSV·pLIp1 administered as IV route 1016 may appear to be most effective than TBSV·pLIp1 treatments (as shown in FIG. 10D of spleen weight evaluation 1056 and Table 14). Table 14 shows percentage of reduction in spleen weight of TBSV·pLIp1 and TBSV WT treatments versus CIA Collagen 1024 (100%). No histological variations may have been found in ankle-joints of control mice (Sham 1040 group). An extensive synovial membrane inflammation, cartilage and bone erosions may be observed in CIA Collagen 1024 mice (CIA Collagen group). Dexamethasone 1004 treatment may significantly reduce CIA Collagen 1024-induced lesions (Dexamethasone group). TBSV·pLIp1 SC 1008 may not show significant amelioration compared to CIA Collagen 1024 mice (TBSV·pLIp1 SC 1008 group). TBSV·pLIp1 IP 1012 and TBSV·pLIp1 IV 1016 treatments may significantly reduce tissue damage in ankle-joints (TBSV·pLIp1 IP 1012 and TBSV pLIp1 IV 1016 groups). TBSV WT administered as SC 1028 and OS 1036 routes may not show significant reduction in ankle-joints lesions (TBSV WT SC and TBSV WT OS groups). TBSV WT as IV 1020 route may reduce tissue damage in ankle-joints (TBSV WT IV group). Spleen weight may significantly increase in CIA. Collagen 1024 mice (CIA Collagen group) compared to control mice (Sham 1040 group). Dexamethasone 1004, TBSV·pLIp1 IP 1012, TBSV·pLIp1 IV 1016 and TBSV WT IV 1020 treatments (Dexamethasone group, TBSV·pLIp1 IP group, TBSV·pLIp1 IV group, TBSV WT IV group) may significantly decrease spleen weight compared to control mice Sham group). No significant changes may be reported after TBSV pLIp1 SC 1008, TBSV·pLIp1 OS 1032, TBSV WT SC 1028 and TBSV WT OS 1036 treatments (TBSV·pLIp1 OS group, TBSV·pLIp1 SC group, TBSV WT SC group, TBSV WT OS group). *p<0.001 vs Sham 1040, #p<0.05; ##p<0.01 vs CIA Collagen 1024, ###p<0.001 vs CIA Collagen 1024; °°°p<0.001 vs TBSV·pLIp1 IP 1012**.

TABLE 13

| TREATAMENTS | % of reduction vs CIA Collagen |
| --- | --- |
| Dexamethasone | 55.76% |
| TBSV.pLIp1 SC | 13.46% |
| TBSV.pLIp1 OS | +1.92% |
| TBSV.pLIp1 IP | 14.42% |
| TBSV.pLIp1 IV | 51.92% |
| TBSV WT SC | 0.96% |
| TBSV WT OS | 0.96% |
| TBSV WT IV | 15.38% |

TABLE 14

| TREATAMENTS | % of reduction vs CIA Collagen |
| --- | --- |
| Dexamethasone | 39.13% |
| TBSV.pLIp1 SC | 6.52% |
| TBSV.pLIp1 OS | 8.7% |
| TBSV.pLIp1 IP | 20% |
| TBSV.pLIp1 IV | 35.21% |
| TBSV WT SC | 13.04% |
| TBSV WT OS | 4.34% |
| TBSV WT IV | 11.73% |

Referring now to FIG. 10E, FIG. 10E illustrates pro-inflammatory cytokines evaluations 1060 in sera of CIA Collagen mice. Immunoenzimatic assay ELISA kit may have been carried out on the sera from mice at the day 58. A significant increase may be observed in MCP-1, IL-1b, IL-6, IL-12 p70 levels in CIA Collagen 1024 group compared to the Sham 1040 group. Treatments with TBSV·pLIp1 IP 1012, TBSV·pLIp1 IV 1016, and TBSV WT IV 1020 may significantly reduce pro-inflammatory cytokines levels compared with CIA collagen 1024 group (as shown in illustrations A, B, C and D of FIG. 10E and respective Tables 15-21). Tables 15-21 show percentage of reduction of MCP-1, IL-1β, IL-6, IL-12 p70, IL-17A, IFN-γ and TNF-α of TBSV·pLIp1 and TBSV WT vs CIA Collagen 1024 (100%). Between of all routes of administration, TBSV·pLIp1 IV 1016 may appear to be the most effective in the treatment of the inflammatory process following CIA induction compared to TBSV·pLIp1 IP 1012. Moreover, it may be observed a significant increase in IL-17A, IFN-γ and TNF-α levels in CIA Collagen 1024 group compared to the Sham 1040 group. However, treatments with TBSV·pLIp1 IP 1012, TBSV WT IV 1020 and TBSV pLIp1 IV 1016 may significantly reduce pro-inflammatory cytokines levels compared with the CIA collagen 1024 group. TBSV·pLIp1 IV 1016 may appear to be the most effective in the modify of the inflammatory cytokines following CIA induction compared to TBSV pLIp1 IP 1012 administration (illustrations E, F and G of FIG. 10E, and respective Tables 15-21). The levels of MCP-1 (A), IL-1β, IL-6 (C), and IL-12 p70 (D) may be significantly increased in CIA Collagen 1024 mice (CIA Collagen group) compared to control mice (Sham 1040 group). The increase of these markers may be significantly decreased in mice receiving Dexamethasone 1040, TBSV·pLIp1 IP 1012, TBSV·pLIp1 IV 1016 and TBSV WT IV 1020 (Dexamethasone group, TBSV·pLIp1 IP group, TBSV·pLIp1 IV group, TBSV WT group) (as shown in illustrations A, B, C and D of FIG. 10E respectively). The levels of IL-17A (E), IFN-γ (F) and TNF-α (G) may be found increased in CIA Collagen 1024 mice (CIA Collagen group) compared to the control mice (Sham 1040 group). The increase of these markers may be significantly decreased in mice receiving Dexamethasone 1040, TBSV·pLIp1 IP 1012, TBSV·pLIp1 IV 1016 and TBSV WT IV 1020 (Dexamethasone group, TBSV pLIp1 IP group, TBSV·pLIp1 IV group, TBSV WT IV group) (as shown in illustrations E, F, C and G of FIG. 10E respectively). *p<0.001 vs Sham 1040; #p<0.05 vs CIA Collagen 1024, ##p<0.001 vs CIA Collagen 1024; °°°p<0.001 vs TBSV·pLIp1 IP 1012**.

TABLE 15

| MCP-1 | % of reduction vs CIA Collagen |
|---|---|
| Dexamethasone | 30.57% |
| TBSV.pLIp1 SC | 7.84% |
| TBSV.pLIp1 OS | 6.77% |
| TBSV.pLIp1 IP | 9.59% |
| TBSV.pLIp1 IV | 52.56% |
| TBSV WT SC | 6.89% |
| TBSV WT OS | 0.07% |
| TBSV WT IV | 9.51% |

TABLE 16

| IL-1β | % of reduction vs CIA Collagen |
|---|---|
| Dexamethasone | 22.74% |
| TBSV.pLIp1 SC | 0.75% |
| TBSV.pLIp1 OS | 0.35% |
| TBSV.pLIp1 IP | 3.85% |
| TBSV.pLIp1 IV | 22.04% |
| TBSV WT SC | 0.15% |
| TBSV WT OS | 0.25% |
| TBSV WT IV | 3.95% |

TABLE 17

| IL-6 | % of reduction vs CIA Collagen |
|---|---|
| Dexamethasone | 40.13% |
| TBSV.pLIp1 SC | 7.16% |
| TBSV.pLIp1 OS | 7.56% |
| TBSV.pLIp1 IP | 10.09% |
| TBSV.pLIp1 IV | 25.36% |
| TBSV WT SC | 9.05% |
| TBSV WT OS | 7.54% |
| TBSV WT IV | 9.95% |

TABLE 18

| IL-12p70 | % of reduction vs CIA Collagen |
|---|---|
| Dexamethasone | 37.95% |
| TBSV.pLIp1 SC | 3.23% |
| TBSV.pLIp1 OS | 1.04% |
| TBSV.pLIp1 IP | 4.58% |
| TBSV.pLIp1 IV | 26.9% |
| TBSV WT SC | 0.05% |
| TBSV WT OS | 0.31% |
| TBSV WT IV | 4.61% |

TABLE 19

| IL-17A | % of reduction vs CIA Collagen |
|---|---|
| Dexamethasone | 25.07% |
| TBSV.pLIp1 SC | 4.55% |
| TBSV.pLIp1 OS | 6.62% |
| TBSV.pLIp1 IP | 7.07% |
| TBSV.pLIp1 IV | 26.71% |
| TBSV WT SC | 3.61% |
| TBSV WT OS | 6.04% |
| TBSV WT IV | 7.18% |

TABLE 20

| IFN-γ | % of reduction vs CIA Collagen |
|---|---|
| Dexamethasone | 37.39% |
| TBSV.pLIp1 SC | 0.51% |
| TBSV.pLIp1 OS | +1% |
| TBSV.pLIp1 IP | 6.17% |
| TBSV.pLIp1 IV | 17.78% |
| TBSV WT SC | 0.07% |
| TBSV WT OS | +2% |
| TBSV WT IV | 6.25% |

TABLE 21

| TNF-α | % of reduction vs CIA Collagen |
|---|---|
| Dexamethasone | 12.02% |
| TBSV.pLIp1 SC | 1.43% |
| TBSV.pLIp1 OS | 1.28% |
| TBSV.pLIp1 IP | 1.68% |
| TBSV.pLIp1 IV | 22.04% |
| TBSV WT SC | 1.23% |
| TBSV WT OS | 1.28% |
| TBSV WT IV | 1.53% |

Referring now to FIG. 10F, FIG. 10F illustrates splenic regulatory T cells evaluations 1064 of the effect of TBSV·pLIp1 following CIA Collagen-induced arthritis CD4+CD25+Foxp3+ Treg cells play a crucial role in preventing chronic inflammatory and autoimmune diseases by suppressing autoreactive T cells. In splenocytes from CIA Collagen mice (CIA Collagen group) a considerable reduction in CD4+CD25+Foxp3+ may be detected (as shown in illustration B of FIG. 10F, score 6K) compared to the control mice (Sham group) (as shown in illustration A of FIG. 10F, score 6K). However, Treg cells population may be significantly elevated in splenocytes isolated from Dexamethasone-treated CIA mice (Dexamethasone group)(FIG. 6C, score 6K) and mice treated with TBSV·pLIp1 IV (TBSV·pLIp1 IV group)(as shown in illustration G of FIG. 10F, score 6K) compared to CIA Collagen mice (CIA Collagen group), A slight upregulation of Treg cells may be observed following treatments with TBSV pLIp1 administered as IP route (TBSV·pLIp1 IP group) (as shown in illustration F of FIG. 10F, score 6K) as well as with TBSV WT IV (TBSV WT IV group) (as shown in illustration J of FIG. 10F, score 6K). Moreover, Dexamethasone and TBSV·pLIp1 IV treatments may be significantly efficient in decreasing CD4+CD25+Foxp3+ Treg cells population in comparison with TBSV·pLIp1 IP treatment. No significant improvement may be evident after treatments with TBSV·pLIp1 SC (TBSV·pLIp1 1 SC group), TBSV·pLIp1 OS (TBSV·pLIp1 1 OS group), TBSV WT SC (TBSV WT SC group) and TBSV WT OS (TBSV WT OS group) (as shown in illustrations D, E, H and I of FIG. 10F respectively, score 6K). The percentage of CD25+Foxp3+ cells among CD4+ cells may be considerably decreased in CIA Collagen mice (as shown in illustrations B and K of FIG. 10F) compared to the Sham group (as shown in illustrations A and K of FIG. 10F). Dexamethasone. TBSV·pLIp1 IV, TBSV·pLIp1 IP and TBSV WT IV may statistically increase Treg cells compared to vehicle animals (as shown in illustrations C, F, G, J, K of FIG. 10F). No significant ameliorations may be detected after TBSV·pLIp1 SC, TBSV·pLIp1 OS, TBSV WT SC and TBSV WT OS treatments (as shown in illustrations C, D, E, H, I, K of FIG. 10F). $**p<0.01$ vs Sham; $\#\#\#p<0.001$ vs CIA Collagen; $\#p<0.05$ vs CIA Collagen; $°°°p<0.001$ vs TBSV·pLIp1 IP With continued reference to FIGS. 10A-10F, data may show that 58 days after collagen-induced arthritis TBSV·pLIp1 administration as IV route may be efficient in reducing CIA features as body weight loss, alteration of paw volume, histological modification and cytokines releasing as well as T cell production. Moreover, in some analysis, TBSV·pLIp1 administered as IV route and Dexamethasone may be even more efficient than TBSV·pLIp1 administered as IP route in decreasing cytokines production, lesions in ankle-joints, spleen weight, CD4+CD25+Foxp3+ Treg cells population, paw volume and clinical signs markedly altered in CIA Collagen mice. In addition, TBSV·pLIp1 administered as SC route may be found to be a good route of administrations for some parameters as body weight, paw volume, histological changes and spleen weight despite no significance reported for TBSV·pLIp1 administered as OS. Moreover, TBSV WT administered as IV route may be efficient in modulating cytokines production, histological lesions in ankle-joints, CD4+CD25+Foxp3+ Treg cells population and macroscopic and clinical signs despite no significance was reported in TBSV WT treatments administrated as OS and SC routes.

Figure 11:
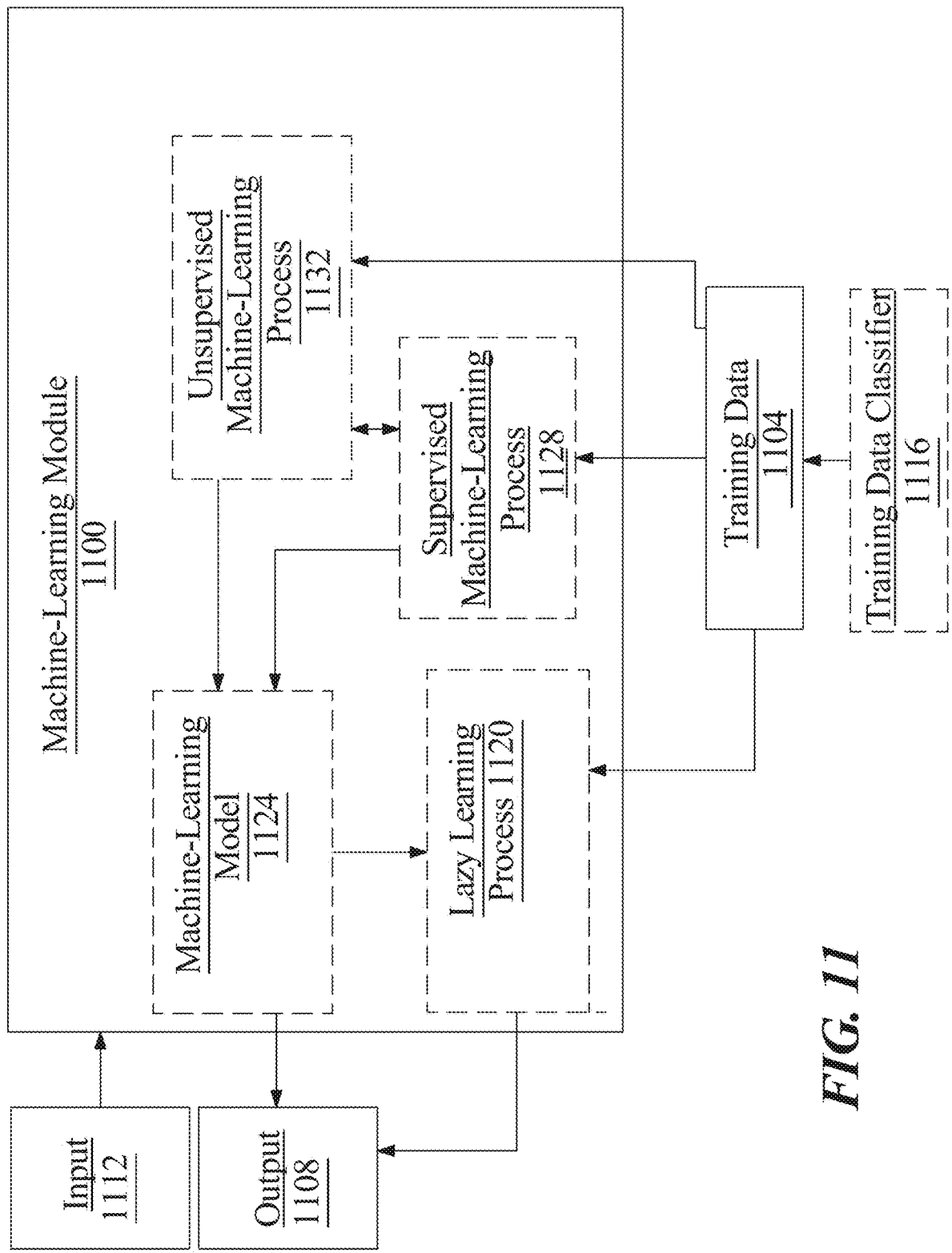
FIG. 11 is a block diagram of an exemplary embodiment of a machine-learning module.

Referring now to FIG. 11, an exemplary embodiment of a machine-learning module 1100 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 1104 to generate an algorithm that will be performed by an apparatus 140/module to produce outputs 1108 given data provided as inputs 1112, this is in contrast to a non-machine learning software program where the commands to be executed are determined in advance by a user and written in a programming language.

Still referring to FIG. 11, "training data," as used herein, is data containing correlations that a machine-learning process may use to model relationships between two or more categories of data elements. For instance, and without limitation, training data 1104 may include a plurality of data entries, each entry representing a set of data elements that were recorded, received, and/or generated together; data elements may be correlated by shared existence in a given data entry, by proximity in a given data entry, or the like. Multiple data entries in training data 1104 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 1104 according to various correlations; correlations may indicate causative and/or predictive links between categories of data elements, which may be modeled as relationships such as mathematical relationships by machine-learning processes as described in further detail below. Training data 1104 may be formatted and/or organized by categories of data elements, for instance by associating data elements with one or more descriptors corresponding to categories of data elements. As a non-limiting example, training data 1104 may include data entered in standardized forms by persons or processes, such that entry of a given data element in a given field in a form may be mapped to one or more descriptors of categories. Elements in training data 1104 may be linked to descriptors of categories by tags, tokens, or other data elements; for instance, and without limitation, training data 1104 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 11, training data 1104 may include one or more elements that are not categorized; that is, training data 1104 may not be formatted or contain descriptors for some elements of data. Machine-learning algorithms and/or other processes may sort training data 1104 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order, such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 1104 to be made applicable for two or more distinct machine-learning algorithms as described in further detail below. Training data 1104 used by machine-learning module 1100 may correlate any input data as described in this disclosure to any output data as described in this disclosure.

Further referring to FIG. 11, training data may be filtered, sorted, and/or selected using one or more supervised and/or unsupervised machine-learning processes and/or models as described in further detail below; such models may include without limitation a training data classifier 1118. Training data classifier 1118 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close wider a distance metric as described below, or the like. Machine-learning module 1100 may generate a classifier using a classification algorithm, defined as processes whereby an apparatus 140 and/or any module and/or component operating thereon derives a classifier from training data 1104. Classification may be performed using, without limitation, linear classifiers such as without limitation logistic regression and/or naïve Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers.

Still referring to FIG. 11, machine-learning module 1100 may be configured to perform a lazy-learning process 1120 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 1104. Heuristic may include selecting some number of highest-ranking associations and/or training data 1104 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 11, machine-learning processes as described in this disclosure may be used to generate machine-learning models 224. A "machine-learning model," as used in this disclosure, is a mathematical and/or algorithmic representation of a relationship between inputs and outputs, as generated using any machine-learning process including without limitation any process as described above and stored in memory 148; an input is submitted to a machine-learning model 1124 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 1124 may be generated by creating an artificial neural network, such as a convolutional neural network comprising an input layer of nodes, one or more intermediate layers, and an output layer of nodes. Connections between nodes may be created via the process of "training" the network, in which elements from a training data 1104 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 11, machine-learning algorithms may include at least a supervised machine-learning process 1128. At least a supervised machine-learning process 1128, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include inputs and outputs, as described above, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 1104. Persons skilled in the art, upon reviewing the entirety of this disclosure, will be aware of various possible variations of at least a supervised machine-learning process 1128 that may be used to determine relation between inputs and outputs. Supervised machine-learning processes may include classification algorithms as defined above.

Further referring to FIG. 11, machine learning processes may include at least an unsupervised machine-leaning processes 1132. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 11, machine-learning module 1100 may be designed and configured to create a machine-learning model 1124 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the LASSO model is the Frobenius norm amounting to the square root of the sum of squares of all terms. Linear regression models may include the elastic net model, a multi-task elastic net model, a least angle regression model, a LARS LASSO model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 11, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Figure 12:
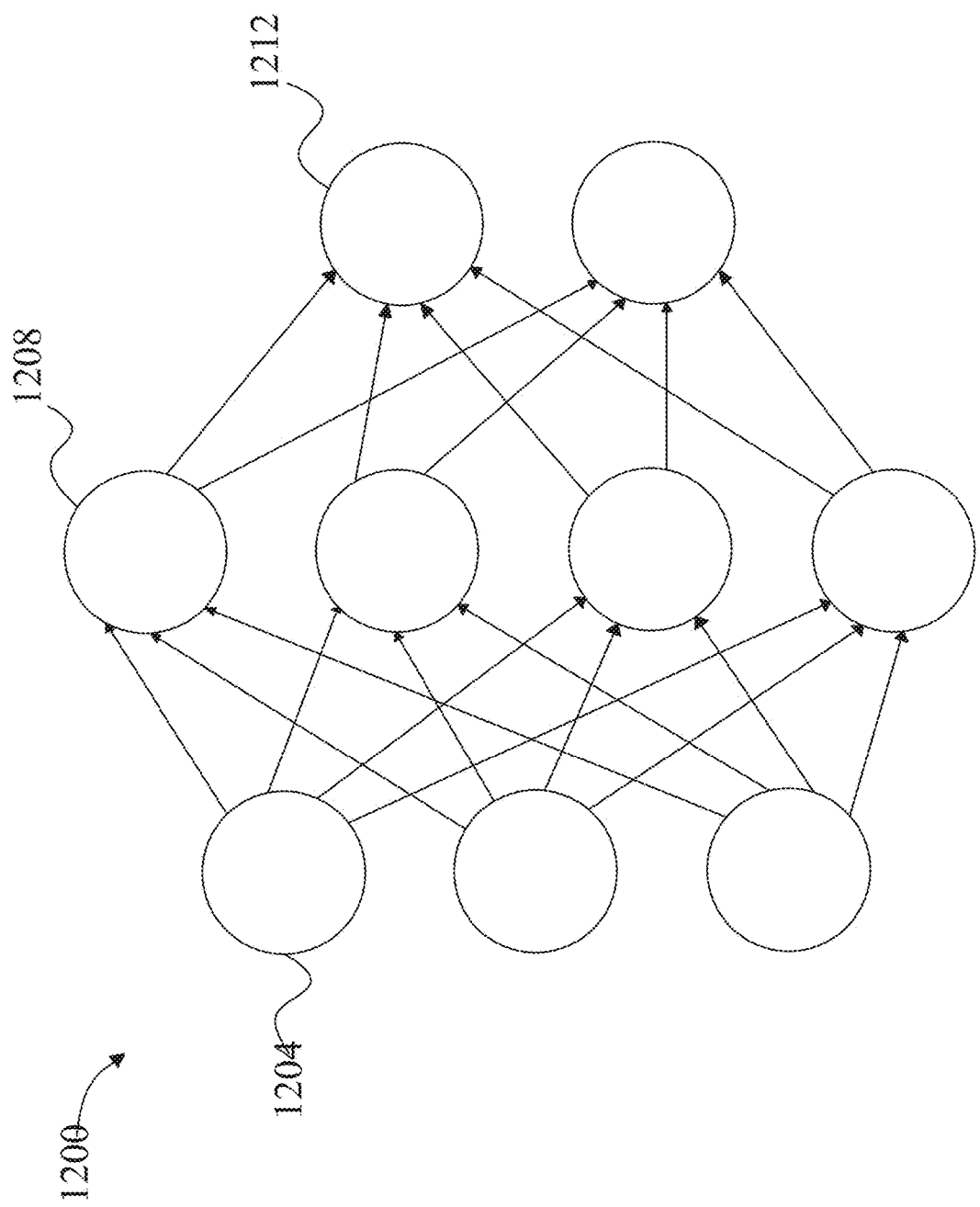
FIG. 12 is a diagram of an exemplary embodiment of neural network.

Referring now to FIG. 12, an exemplary embodiment of neural network 1200 is illustrated. A neural network 1200 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 1204, one or more intermediate layers 1208, and an output layer of nodes 1212. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network or may feed outputs of one layer back to inputs of the same or a different layer in a "recurrent network." As a further non-limiting example, a neural network may include a convolutional neural network comprising an input layer of nodes, one or more intermediate layers, and an output layer of nodes A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 13:
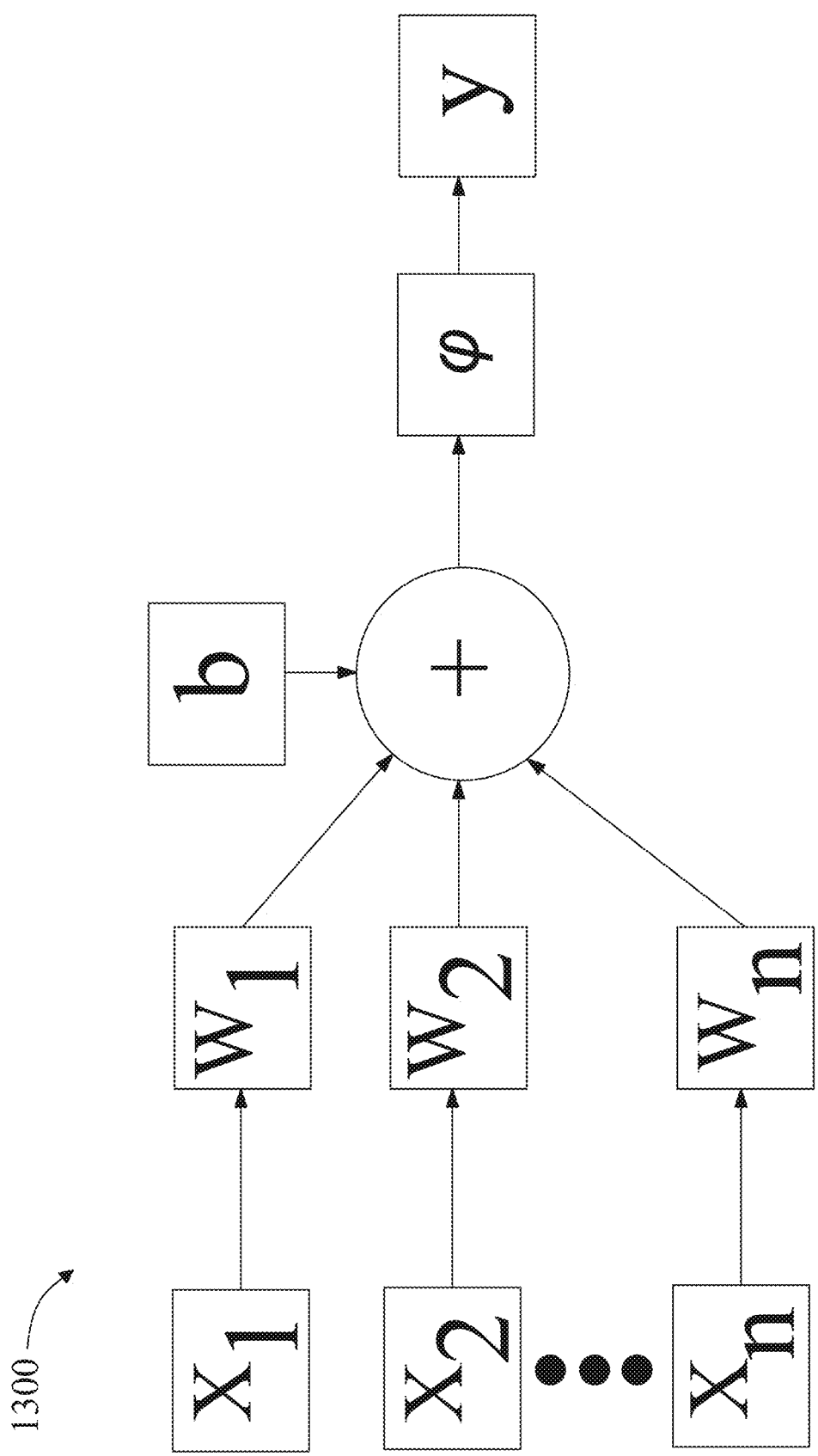
FIG. 13 is a diagram of an exemplary embodiment of a node of a neural network.

Referring now to FIG. 13, an exemplary embodiment of a node of a neural network is illustrated. A node may include, without limitation, a plurality of inputs xi that may receive numerical values from inputs to a neural network containing the node and/or from other nodes. Node may perform a weighted sum of inputs using weights wi that are multiplied by respective inputs xi. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight wi applied to an input xi may indicate whether the input is "excitatory." indicating that it has strong influence on the one or more outputs y, for instance by the corresponding weight having a large numerical value, and/or a "inhibitory," indicating it has a weak effect influence on the one more inputs y, for instance by the corresponding weight.

Figure 14:
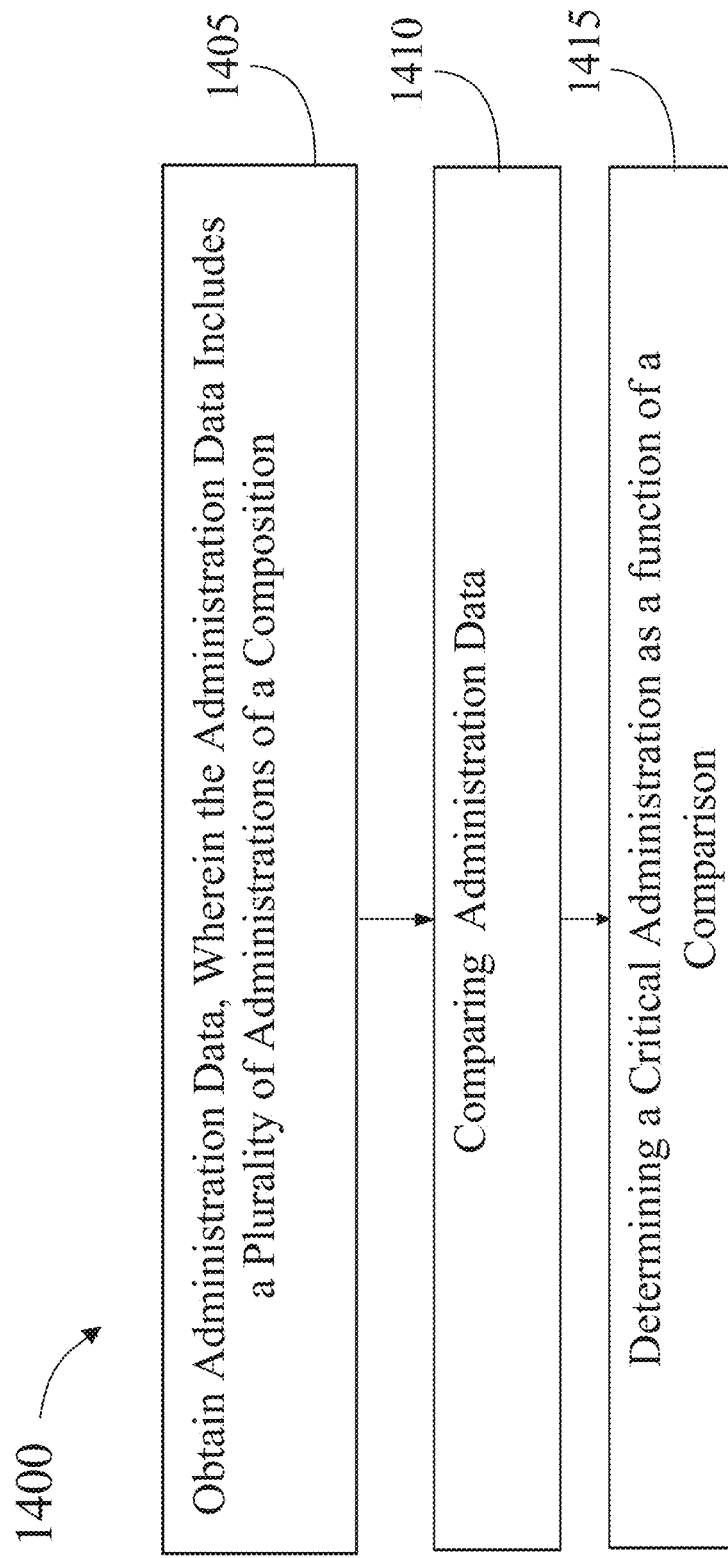
FIG. 14 illustrates a flow diagram of an exemplary method for determining administration form of a composition of an engineered virus-based nanoparticle for a treatment of an autoimmune condition.

Referring now to FIG. 14, a flow diagram of an exemplary method 1400 for determining administration form of a composition of an engineered virus-based nanoparticle for a treatment of an autoimmune condition. Method 1400 includes a step 1405 of obtaining, using at least a processor, administration data, wherein the administration data includes a plurality of administrations of a composition of an engineered virus-based nanoparticle for a treatment of an autoimmune condition. In some embodiments, the composition may include a plant virus-based particle engineered to express at least a peptide associated with the autoimmune condition and a buffer. In some embodiments, the at least a peptide may include an immunodominant peptide, wherein the at least an immunodominant peptide may include pLIp1. In some embodiments, the at least a peptide may be engineered using a tomato bushy stunt virus (TBSV). In some embodiments, the plurality of administrations may include a subcutaneous injection. In some embodiments, the plurality of administrations may include an intraperitoneal injection. In some embodiments, the administration of the composition may be configured for an early treatment of the autoimmune condition. In some embodiments, method 1400 may include classifying, using at least a processor, administration data into one or more administration groups as a function of a plurality of administrations. These may be implemented as disclosed with respect to FIGS. 1-13.

With continued reference to FIG. 14, method 1400 includes a step 1410 of comparing administration data. In some embodiments, method 1400 may include generating, using at least a processor, an autoimmune score of one or more administration groups as a function of a plurality of administration results. In some embodiments, the autoimmune score may include an arthritis score. These may be implemented as disclosed with respect to FIGS. 1-13.

With continued reference to FIG. 14, method 1400 includes a step 1415 of determining, using at least a processor, a critical administration as a function of comparison. In some embodiments, method 1400 may include determining, using at least a processor, a critical administration as a function of an autoimmune score. In some embodiments, method 1400 may further include determining, using the at least a processor, the critical administration 134 as a function of a result weight of the administration result of the administration data. In some embodiments, method 1400 may further include determining, using the at least a processor, the critical administration using a critical machine learning model, wherein the critical machine learning model is trained using critical training data that correlates an administration data set and an autoimmune score data set and outputs critical administrations. These may be implemented as disclosed with respect to FIGS. 1-13.

It is to be noted that any one or more of the aspects and embodiments described herein may be conveniently implemented using digital electronic circuitry, integrated circuitry, specially designed application specific integrated circuits (ASICs), field programmable gate arrays (FPGAs) computer hardware, firmware, software, and/or combinations thereof, as realized and/or implemented in one or more machines (e.g., one or more computing devices that are utilized as a user computing device for an electronic document, one or more server devices, such as a document server, etc.) programmed according to the teachings of the present specification, as will be apparent to those of ordinary skill in the computer art. These various aspects or features may include implementation in one or more computer programs and/or software that are executable and/or interpretable on a programmable system including at least one programmable processor, which may be special or general purpose, coupled to receive data and instructions from, and to transmit data and instructions to, a storage system, at least one input device, and at least one output device. Appropriate software coding may readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, Programmable Logic Devices (PLDs), and/or any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 15:
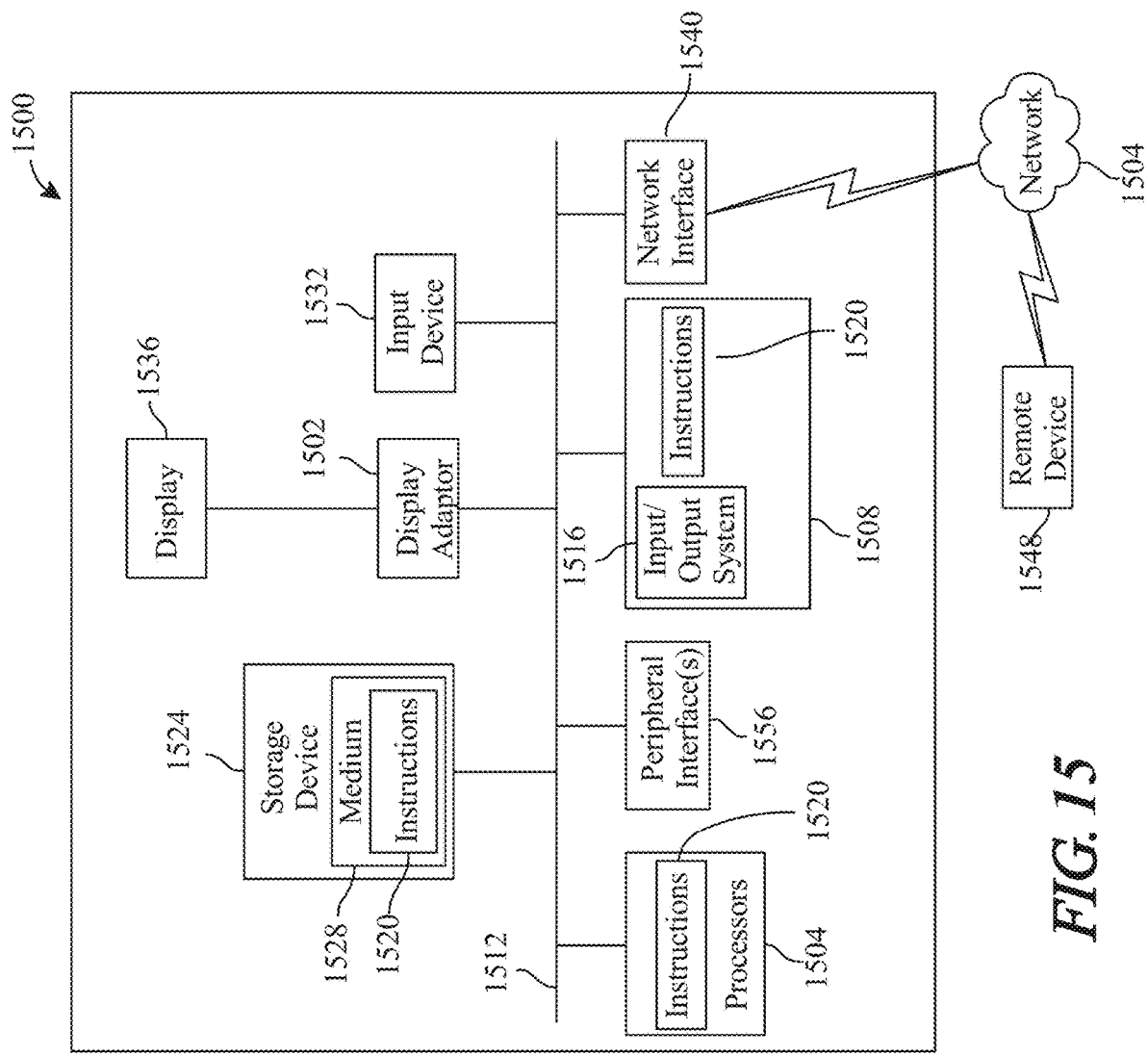
FIG. 15 illustrates a block diagram of a computing system that can be used to implement any one or more of the methodologies disclosed herein and any one or more portions thereof. The drawings are not necessarily to scale and may be illustrated by phantom lines, diagrammatic representations and fragmentary views. In certain instances, details that are not necessary for an understanding of the embodiments or that render other details difficult to perceive may have been omitted.

FIG. 15 shows a diagrammatic representation of one embodiment of a computing device in the exemplary form of a computer system 1500 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 1500 includes a processor 1504 and a memory 1508 that communicate with each other, and with other components, via a bus 1512. Bus 1512 may include any of several types of bus structures including, but not limited to, a memory bus, a memory controller, a peripheral bus, a local bus, and any combinations thereof, using any of a variety of bus architectures.

Memory 1508 may include various components (e.g., machine-readable media) including, but not limited to, a random-access memory component, a read only component, and any combinations thereof. In one example, a basic input/output system 1516 (BIOS), including basic routines that help to transfer information between elements within computer system 1500, such as during start-up, may be stored in memory 1508. Memory 1508 may also include (e.g., stored on one or more machine-readable media) instructions (e.g., software) 1520 embodying any one or more of the aspects and/or methodologies of the present disclosure. In another example, memory 1508 may further include any number of program modules including, but not limited to, an operating system, one or more application programs, other program modules, program data, and any combinations thereof.

Computer system 1500 may also include a storage device 1524. Examples of a storage device (e.g., storage device 1524) include, but are not limited to, a hard disk drive, a magnetic disk drive, an optical disc drive in combination with an optical medium, a solid-state memory device, and any combinations thereof. Storage device 1524 may be connected to bus 1512 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 1524 (or one or more components thereof) may be removably interfaced with computer system 1500 (e.g., via an external port connector (not shown)). Particularly, storage device 1524 and an associated machine-readable medium 1528 may provide nonvolatile and/or volatile storage of machine-readable instructions, data structures, program modules, and/or other data for computer system 1500. In one example, software 1520 may reside, completely or partially, within machine-readable medium 1528. In another example, software 1520 may reside, completely or partially, within processor 1504.

Computer system 1500 may also include an input device 1532. In one example, a user of computer system 1500 may enter commands and/or other information into computer system 1500 via input device 1532. Examples of an input device 1532 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 1532 may be interfaced to bus 1512 via any of a variety of interfaces (not shown) including, but not limited to, a serial interface, a parallel interface, a game port, a USB interface, a FIREWIRE interface, a direct interface to bus 1512, and any combinations thereof. Input device 1532 may include a touch screen interface that may be a part of or separate from display 1536, discussed further below. Input device 1532 may be utilized as a user selection device for selecting one or more graphical representations in a graphical interface as described above.

A user may also input commands and/or other information to computer system 1500 via storage device 1524 (e.g., a removable disk drive, a flash drive, etc.) and/or network interface device 1540. A network interface device, such as network interface device 1540, may be utilized for connecting computer system 1500 to one or more of a variety of networks, such as network 1504, and one or more remote devices 1548 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 1504, may employ a wired and/or a wireless mode of communication. In general, any network topology may be used. Information (e.g., data, software 1520, etc.) may be communicated to and/or from computer system 1500 via network interface device 1540.

Computer system 1500 may further include a video display adapter 1552 for communicating a displayable image to a display device, such as display device 1536. Examples of a display device include, but are not limited to, a liquid crystal display (LCD), a cathode ray tube (CRT), a plasma display, a light emitting diode (LED) display, and any combinations thereof. Display adapter 1552 and display device 1536 may be utilized in combination with processor 1504 to provide graphical representations of aspects of the present disclosure. In addition to a display device, computer system 1500 may include one or more other peripheral output devices including, but not limited to, an audio speaker, a printer, and any combinations thereof. Such peripheral output devices may be connected to bus 1512 via a peripheral interface 1556. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A composition of an engineered virus-based nanoparticle for a treatment of an autoimmune condition, the virus-based nanoparticle comprising:
a plant virus-based particle expressed by at least a *Cycorium intybus* plant engineered to express a peptide, wherein the peptide comprises *Liprin alpha,* 1 (pLip1);
at least an anti-rheumatic agent
comprising a glucocorticosteroid;
and a buffer.

2. The composition of claim 1, wherein the peptide further comprises focal adhesion kinase 2 (pFADK2).

3. The composition of claim 1, wherein the at least a peptide is engineered using a tomato bushy stunt virus (TBSV).

4. The composition of claim 1, wherein the plant virus-based particle is sourced from a *Nicotiana benthamiana* plant.

5. The composition of claim 1, comprising an oral dosage administration, wherein the oral dosage is administered using at least a pill.

6. The composition of claim 1, wherein administering the composition comprises a subcutaneous injection.

7. The composition of claim 4, wherein the plant virus-based particle further comprises a combination of tomato bush stunt virus (TBSV) and cowpea mosaic virus (CPMV).

8. The composition of claim 1, further comprising at least an immunodominant peptide further comprising a combination of *Liprin alpha* 1 (pLip1) and focal adhesion kinase 2 (pFADK2).

9. The composition of claim 1, wherein tomato bush stunt virus (TBSV) is fused to *Liprin alpha* 1 (pLip1).

10. The composition of claim 1, wherein tomato bush stunt virus (TBSV) is fused to focal adhesion kinase 2 (pFADK2).

11. The composition of claim 1, wherein cowpea mosaic virus (CPMV) is fused to *Liprin alpha* 1 (pLip1).

12. The composition of claim 1, wherein cowpea mosaic virus (CPMV) is fused to focal adhesion kinase 2 (pFADK2).

13. The composition of claim 1, wherein the autoimmune condition further comprises rheumatoid arthritis.

14. The composition of claim 1, wherein the composition further comprises sodium acetate.

15. The composition of claim 1, wherein the composition further comprises phosphate-buffered saline.

16. The composition of claim 1, wherein the composition further comprises phosphate-buffered saline with incomplete Freund's adjuvant.

17. The composition of claim 1, wherein the peptide is embedded in a coat protein.

18. The composition of claim 1, wherein the peptide is embedded outside of a coat protein.

19. The composition of claim 1, wherein plant-based virus nanoparticle (pNVP) composition comprises an icosahedral structure.

* * * * *

SEQUENCE LISTING

```
Sequence total quantity: 7
SEQ ID NO: 1                moltype = AA   length = 15
FEATURE                     Location/Qualifiers
source                      1..15
                            mol_type = protein
                            organism = synthetic construct
SEQUENCE: 1
SRLSKVAPVI KARMM                                                           15

SEQ ID NO: 2                moltype = AA   length = 18
FEATURE                     Location/Qualifiers
source                      1..18
                            mol_type = protein
                            organism = synthetic construct
SEQUENCE: 2
DSRLSKVAPV IKARMMED                                                        18

SEQ ID NO: 3                moltype = AA   length = 12
FEATURE                     Location/Qualifiers
source                      1..12
                            mol_type = protein
                            organism = synthetic construct
SEQUENCE: 3
ASVLANVAQA FE                                                              12

SEQ ID NO: 4                moltype = AA   length = 12
FEATURE                     Location/Qualifiers
source                      1..12
                            mol_type = protein
                            organism = synthetic construct
SEQUENCE: 4
AKVLANLAHP PA                                                              12

SEQ ID NO: 5                moltype = DNA   length = 11712
FEATURE                     Location/Qualifiers
source                      1..11712
                            mol_type = other DNA
                            organism = synthetic construct
SEQUENCE: 5
cctgtggttg gcatgcacat acaaatggac gaacggataa acctttcac gccctttaa           60
atatccgatt attctaataa acgctctttt ctcttaggtt tacccgccaa tatatcctgt         120
caaacactga tagtttgtga accatcaccc aaatcaagtt ttttgggtc gaggtgccgt          180
aaagcactaa atcggaaccc taagggagc ccccgattta gagcttgacg gggaaagccg          240
gcgaacgtgg cgagaaagga agggaagaaa gcgaaaggag cgggcgccat tcaggctgcg         300
caactgttgg gaagggcgat cggtgcgggc ctcttcgcta ttacgccagc tggcgaaagg         360
gggatgtgct gcaaggcgat taagtttgggt aacgccaggg ttttcccagt cacgacgttg        420
taaaacgacg gccagtgaat tgttaattaa gaattcgagc tccaccgcgg aaacctcctc         480
ggattccatt gcccagctat ctgtcacttt attgagaaga tagtggaaaa ggaaggtgg          540
tcctacaaat gccatcattg cgataaagga aaggccatcg ttgaagatgc ctctgccgac         600
agtggtccca aagatggacc cccacccacg aggagcatcg tggaaaaaga agacgttcca         660
accacgtctt caaagcaagt ggattgatgt gatatctcca ctgacgtaag ggatgacgca         720
caatcccact atccttcgca agaccctcc tctatataag gaagttcatt tcattggag           780
aggtattaaa atcttaatag gttttgataa aagcgaacgt ggggaaaccc gaaccaaacc         840
ttcttctaaa ctctctctca tctctcttaa agcaaacttc tctcttgtct ttcttgcgtg         900
agcgatcttc aacgttgtca gatcgtgctt cggcaccagt acaacgtttt ctttcactga        960
agcgaaatca aagatctctt tgtggacacg tagtgcggcg ccattaaata acgtgtactt        1020
gtcctattct tgtcggtgtg gtcttggaaa aagaaagctt gctggaggct gctgttcagc        1080
cccatacatt acttgttacg attctgctga ctttcggcgg gtgcaatatc tcacttctg         1140
cttgacgagg tattgttgcc tgtacttctt tcttcttctt cttgctgatt ggttctataa        1200
gaaatcagt atttttcttg aaacagagtt ttccccgtggt tttcgaactt ggagaaagat        1260
tgttaagctt ctgtatattc tgcccaaatt cgcgatgaag caaaacttgt ttgccccttc        1320
tttggatgat acaagctcag ttcgtggttc tttgcttgac acaaaattcg cacaaactcg        1380
agtttgttg tccaaggcta tggctggtgg tgatgtgtta ttggatgagt atctctatga        1440
tgtggtcaat ggacaagatt ttagagctac tgtcgctttt ttgcgcaccc atgttataac        1500
aggcaaaata aaggtgacag taccaccaa catttctgaa aactcgggtt gttgtttgat         1560
gttggccata aatagtggtg tgaggggtaa gtatagtact gatgtttata ctatctgctc        1620
tcaagactcc atgacgtgga acccagggtg caaaagaac ttctcgttca ctttatcc          1680
aaaccccttgt ggggattctt ggtctgctga atgataagt cgaagcagag ttaggatgac       1740
agttatttgt gtttcgggat ggaccttatc tcctaccaca gatgtgattg ccaagctaga        1800
ctggtcaatt gtcaatgaga aatgtgagc caccatttac cacttggctg attgtcagaa        1860
ttggttaccc cttaatcgtt ggatgggaaa attgactttt ccccaggggtg tgacaagtga      1920
ggttcgaagg atgcctcttt ctataggagg cggtgctggt gcgactcaag ctttctttggc      1980
caatatgccc aattcatgga tatcaatgtg gatgttttt agaggtgaac ttcacttgga        2040
agttactaaa atgagctctc catatattaa agccactgtt acatttctca tagctttgt         2100
taatcttagt gatgccttg gttttttatga gagtttcct catagaattg ttcaatttgc         2160
tgaggttgag gaaaaatgta ctttggtttt ctcccaacaa gagtttgtca ctgcttggtc       2220
aacacaagta aaccccagaa ccacacttga agcagatggt tgtccctacc tatatgcaat      2280
tattcatgat agtacaacag gtacaatctc cggagatttt aatcttgggg tcaagcttgt       2340
```

```
tggcattaag gattttttgtg gtataggttc taatccgggt attgatggtt cccgcttgct   2400
tggagctata gcacaaggac ctgtttgtgc tgaagcctca gatgtgtata gcccatgtat   2460
gatagctagc actcctcctg ctccatttc agacgtcaca gcagtaactt ttgacttaat    2520
caacggcaaa ataactcctg ttggtgatga caattgaat acgcacattt ataatcctcc    2580
aattatgaat gtcttgcgta ctgctgcttg gaaatctgga actattcatg ttcaacttaa   2640
tgttagggt gctggtgtca aaagagcaga ttgggatggt caagtctttg tttacctgcg    2700
ccagtccatg aaccctgaaa gttatgatgc gcggacattt gtgatctcac aacctggttc   2760
tgccatgttg aacttctctt ttgatatcat agggccgaat agcggatttg aatttgccga   2820
aagcccatgg gccaatcaga ccacctggta tcttgaatgt gttgctacca atcccagaca   2880
aatacagcaa tttgaggtca acatgcgctt cgatcctaat ttcagggttg ccggcaatat   2940
cctgatgccc ccatttccac tgtcaacgga aactccaccg ttattaaagt ttaggtttcg   3000
ggatattgaa cgctccaagc gtagtgttat ggttggacac actgctactg ctgcttagtc   3060
gaggccttta actctggttt cattaaattt tctttagttt gaatttactg ttattcggtg   3120
tgcatttcta tgtttggtga gcggttttct gtgctcagag tgtgtttatt ttatgtaatt   3180
taatttcttt gtgagctcct gtttagcagg tcgtccttc agcaaggaca caaaaagatt    3240
ttaatttat taaaaaaaaa aaaaaaaag accgggaatt cgatatcaag cttatcgacc     3300
tgcagatcgt tcaaacattt ggcaataaag tttcttaaga ttgaatcctg ttgccggtct   3360
tgcgatgatt atcatataat ttctgttgaa ttacgttaag catgtaataa ttaacatgta   3420
atgcatgacg ttatttatga gatgggtttt tatgattaga gtcccgcaat tatacattta   3480
atacgcgata gaaaacaaaa tatagcgcgc aaactaggat aaattatcgc gcgcggtgtc   3540
atctatgtta ctagatctct agagtctcaa gcttggcgcg ccagcttggc gtaatcatgg   3600
tcatagctgt tgcgattaag aattcgagct cggtacccc ctactccaaa aatgtcaaag    3660
atacagtctc agaagaccaa agggctattg agacttttca acaaagggta atttcggaa    3720
acctcctcgg attccattgc ccagctatct gtcacttcat cgaaaggaca gtagaaaagg   3780
aaggtggctc ctacaaatgc catcattgcg ataaaggaaa ggctatcatt caagatgcct   3840
ctgccgacag tggtcccaaa gatggacccc cacccacgag gagcactcgtg gaaaaagaag  3900
acgttccaac cacgtcttca aagcaagtgg attgatgtga catctccact gacgtaaggg   3960
atgacgcaca atcccactat ccttcgcaag cccttcctc tatataagga agttcatttc    4020
atttggagag dacagcccaa gcttcgactc tagaggatcc ccttaaatcg atatggaacg   4080
agctatacaa ggaaacgacg ctagggaaca agctaacagt gaacgttggu atggaggatc   4140
aggaggtacc acttctccct tcaaacttcc tgacgaaagt ccgagttgga ctgagtggcg   4200
gctacataac gatgagacga attcgaatca agataatccc cttggtttca aggaaagctg   4260
gggtttcggg aaagttgtat ttaagagata tctcagatac gacaggacgg aagcttcact  4320
gcacagagtc cttggatctt ggacgggaga ttcggttaac tatgcagcat ctcgattttt   4380
cggtttcgac cagatcggat gtacctatag tattcggttt cgaggagtta gtatcaccgt   4440
ttctggaggg tctcgaactc ttcagcatct ctgtgagatg gcaattcggt ctaagcaaga   4500
actgctacag cttgccccaa tcgaagtgga aagtaatgta tcaagaggat gccctgaagg   4560
tactgagacc ttcgaaaaag aaagcgagta aggggagctc gaattcgctg aaatcaccag   4620
tctctctcta caaatctatc tctctctatt ttctccataa ataatgtgta gtagtttcc    4680
cgataaggga aattagggtt cttataggt ttcgctcatg tgttgagcat ataagaaacc    4740
cttagtatgt atttgtatt gtaaaatact tctatcaata aaatttctaa ttcctaaaac    4800
caaaatccag tactaaaatc cagatctcct aaagtcccta tagatctttg tcgtgaatat   4860
aaaccagaca cgagacgact aaacctggag cccgacgcgc gttcgaagct gaagtaccg    4920
cttaggcagg aggccgttag ggaaagatg ctaaggcagg gttggttacg ttgactcccc    4980
cgtaggtttg gtttaaatat gatgaagtgg acgaaggaa ggaggaagac aaggaaggat    5040
aaggttgcag gccctgtgca aggtaagaag atggaaattt gatagaggta cgctactata   5100
cttatactat acgctaaggg aatgcttgta tttatacct ataccccta ataacccctt     5160
atcaatttaa gaaataatcc gcataagccc ccgcttaaaa attggtatca gagccatgaa   5220
taggtctatg accaaaactc aagaggataa aacctcacca aaatacgaaa gagttcttaa   5280
ctctaaagat aaaagatggc gcgtggccgg cctacagta gagcggagaa ttaagggagt    5340
cacgttatga ccccgccga tgacgcggga caagccgttt tacgtttgga actgacagga    5400
ccgcaacgtt gaaggagcca ctcagccgcg ggtttctgga gtttaatgag ctaagcacat   5460
acgtcagaaa ccattattgc gcgttcaaaa gtcgcctaag gtcactatca gcatgcaaat   5520
atttcttgtc aaaaatgctc cactgacgtt ccataaattc cctcggtat ccaattagag    5580
tctcatattc actctcaatc caaataatct gcaccggatc tggatcgttt gcagtgattg   5640
aacaagatgg attgcacgca ggttctccgg ccgcttgggt ggagaggcta ttcggctatg   5700
actgggcaca acagacaatc ggctgctctg atgccgccgt gttccggctg tcagcgcagg   5760
ggcgcccggt tctttttgtc aagaccgacc tgtccggtgc cctgaatgaa ctgcaggacg   5820
aggcagcgcg gctatcgtgg ctggccacga cgggcgttcc ttgcgcagct gtgctcgacg   5880
ttgtcactga agcgggaagg gactggctgc tattgggcga agtgccgggg caggatctcc   5940
tgtcatctca ccttgctcct gccgagaaag tatccatcat ggctgatgca atgcggcggc   6000
tgcatacgct tgatccggct acctgcccat tcgaccacca agcgaaacat cgcatcgagc   6060
gagcacgtac tcggatggaa gccggtcttg tcgatcagga tgatctggac gaagagcatc   6120
aggggctcgc gccagccgaa ctgttcgcca ggctcaaggc gcatcatgcc gacgcgcatg   6180
atctcgtcgt gacccatggc gatgcctgct tgccgaatat catggtggaa aatggccgct   6240
tttctggatt catcgactgt ggccggctgg gtgtggcgga ccgctatcag gacatagcgt   6300
tggctacccg tgatattgct gaagagcttg gcggcgaatg ggctgaccgc ttcctcgtgc   6360
tttacggtat cgccgctccc gattcgcagc gcatcgcctt ctatcgcctt cttgacgagt   6420
tcttctgagc gggactctgg ggttcgaaat gaccgaccaa gcgacgccca acctgccatc   6480
acgagatttc gattccaccg ccgccttcta tgaaaggttg gcttcggaa tcgtttttccg   6540
gacgccggc tggatgatcc tccagcgcgg ggatctcatg ctggagttct tcgcccacgg    6600
gatctctgcg aacaggcggt cgaaggtgc cgatatcatt acgacagcaa cggccgacaa    6660
gcacaacgcc acgatcctga cgacaatat gatcgcggcg tccacatcaa cggcgtcggc    6720
ggcgactgcc caggcaagac cgagatgcac ctgcgcgttc ggatattttc                6780
gtggagttcc cgccacagac ccggatgatc cccgatcgtt caaacatttg gcaataaagt   6840
ttcttaagat tgaatcctgt tgccggtctt gcgatgatta tcataataatt tctgttgaat  6900
tacgttaagc atgtaataat taacatgtaa tgcatgacgt tatttatgag atgggttttt   6960
atgattagag tcccgcaatt atacatttaa tacgcgatag aaaacaaaat atagcgcgca   7020
aactaggata aattatcgcg cgcggtgtca tctatgttac tagatcggga ctgtaggccg   7080
```

```
gccctcactg gtgaaaagaa aaaccacccc agtacattaa aaacgtccgc aatgtgttat   7140
taagttgtct aagcgtcaat ttgttttacac cacaatatat cctgccacca gccagccaac  7200
agctccccga ccggcagctc ggcacaaaat caccactcga tacaggcagc ccatcagtcc   7260
gggacggcgt cagcgggaga gccgttgtaa ggcggcagac tttgctcatg ttaccgatgc   7320
tattcggaag aacggcaact aagctgccgg gtttgaaaca cggatgatct cgcggagggt   7380
agcatgttga ttgtaacgat gacagagcgt tgctgcctgt gatcaaatat catctccctc   7440
gcagagatcc gaattatcag ccttcttatt catttctcgc ttaaccgtga cagagtagac   7500
aggctgtctc gcggccgagg ggcgcagccc ctggggggga tgggaggccc gcgttagcgg   7560
gccgggaggg ttcgagaagg gggggcaccc cccttcggcg tgcgcggtca cgcgcacagg   7620
gcgcagccct ggttaaaaac aaggtttata aatattggtt taaaagcagg ttaaaagaca   7680
ggttagcggt ggccgaaaaa cgggcggaaa cccttgcaaa tgctggatttt tctgcctgtg   7740
gacagccccc caaatgtcaa taggtgcgcc cctcatctgt cagcactctg ccctcaagt    7800
gtcaaggatc gcgcccctca tctgtcagta gtcgcgcccc tcaagtgtca ataccgcagg   7860
gcacttatcc ccaggcttgt ccacatcatc tgtgggaaac tcgcgtaaaa tcaggcgtt    7920
tcgccgattt gcgaggctgg ccagctccac gtcgccggcc gaaatcgagc ctgcccctca   7980
tctgtcaacg ccgcgccggg tgagtcggcc cctcaagtgt caacgtccgc ccctcatctg   8040
tcagtgaggg ccaagttttc cgcgaggtat ccacaacgcc ggcggccgcg gtgtctcgca   8100
cacggcttcg acggcgtttc tggcgcgttt gcagggccat agacggccgc cagcccagcg   8160
gcgagggcaa ccagcccggt gagcgtcgga aagcgctcg gtcttgcctt gctcgtcggt    8220
gatgtacact agtcgctggc tgctgaaccc ccagccggaa ctgacccac aaggccctag    8280
cgtttgcaat gcaccaggtc atcattgacc caggcgtgtt ccaccaggcc gctgcctcgc   8340
aactcttcgc aggcttcgcc gacctgctcg cgccacttct tcacgcgggt ggaatccgat   8400
ccgcacatga ggcggaaggt ttccagcttg agcgggtacg gctcccggtg cgagctgaaa   8460
tagtcgaaca tccgtcgggc cgtcggcgac agcttgcggt acttctccca tatgaatttc   8520
gtgtagtggt cgccagcaaa cagcacgacg atttcctcgt cgatcaggac ctggcaacgg   8580
gacgttttct tgccacggtc caggacgcgg aagcggtgca cggcgacac cgattccagg    8640
tgcccaacgc ggtcggacgt gaagcccatc gccgtcgcct gtaggcgcga caggcattcc   8700
tcggccttcg tgtaataccg gccattgatc gaccagccca ggtcctggca aagctcgtag   8760
aacgtgaagg tgatcggctc gccgataggg gtgcgcttcg cgtactccaa cacctgctgc   8820
cacaccagtt cgtcatcgtc ggcccgcagc tcgacgccgg tgtaggtgat cttcacgtcc   8880
ttgttgacgt ggaaaatgac cttgttttgc agcgcctcgc gcgggatttt cttgttgcgc   8940
gtggtgaaca gggcagagcg ggccgtgtcg tttggcatcg ctcgcatcgt gtccggccac   9000
ggcgcaatat cgaacaagga aagctgcatt tccttgatct gctgcttcgt gtgtttcagc   9060
aacgcggcct gcttggcctc gctgacctgt tttgccaggt cctcgccggc ggtttttcgc   9120
ttcttggtcg tcatagttcc tcgcgtgtcg atggtcatcg acttcgccaa acctgccgcc   9180
tcctgttcga gacgacgcga acgctccacg gcggccgatg gcgcgggcag ggcaggggga   9240
gccagttgca cgctgtcgcg ctcgatcttg gccgtagctt gctggaccat cgagccgacg   9300
gactggaagg tttcgcgggg cgcacgcatg acggtgcggc ttgcgatggt ttcggcatcc   9360
tcggccgaaa accccgcgtc gatcagttct tgcctgtatg ccttccggtc aaacgtccga   9420
ttcattcacc ctccttgcgg gattgccccg actcacgccg gggcaatgtg cccttattcc   9480
tgatttgacc cgcctggtgc cttggtgtcc agataatcca ccctatcggc aatgaagtcg   9540
gtcccgtaga ccgtctggcc gtccttcctg tacttggtat tccgaatctt gccctgcacg   9600
aataccagcg accccttgcc caaatacttg ccgtgggcct ggcctgaga gccaaaaacac   9660
ttgatgcgga agaagtcggt gcgctcctgc ttgtcgccgg catcgttgcg ccacatctag   9720
gtactaaaac aattcatcca gtaaaatata atattttatt ttctcccaat caggcttgat   9780
ccccagtaag tcaaaaaata gctcgacata ctgttcttcc ccgatatcct ccctgatcga   9840
ccggacgcag aaggcaatgt cataccactt gtccgccctg cgcttctcc caagatcaat    9900
aaagccactt actttgccat ctttcacaaa gatgttgctg tctcccaggt cgccgtggga   9960
aaagacaagt tcctcttcgg gcttttccgt cttttaaaaa tcatacagct cgcgcggatc  10020
tttaaatgga gtgtcttctt cccagttttc gcaatccaca tcggccagat cgttattcag  10080
taagtaatcc aattcggcta agcggctgtc taagctattc gtataggac aatccgatc    10140
gtcgatggag tgaaagagcc tgatgcactc cgcatacagc tcgataatct tttcagggct  10200
ttgttcatct tcatactctt ccgagcaaag gacgccatcg gcctcactca tgagcagatt  10260
gctccagcca tcatgccgtt caaagtcagg gacctttgga acaggcagct ttccttccag  10320
ccatagcatc atgtccttt cccgttccac atcataggtg gtccctttat accggctgtc   10380
cgtcattttt aaatatagg tttcattttc tcccaccagc ttatataccct tagcaggaga  10440
cattccttcc gtatcttta cgcagcggta ttttcgatc agttttttca attccggtga    10500
tattctcatt ttagccattt attatttcct tcctcttttc tacagtattt aaagatccc   10560
caagaagcta attataacaa gacgaactcc aattcactgt tccttgcatt ctaaaacctt  10620
aaataccaga aaacagcttt tcaaagttg ttttcaaagt tggcgtataa catagtatcg   10680
acggagccga ttttgaaacc acaattatgg gtgatgctgc caacttactg atttagtgta   10740
tgatggtgtt tttgaggtgc tccagtgct tctgtttcta tcagctgtcc ctcctgttca   10800
gctactgacg ggtggtgcg taacggcaaa agcaccgccg gacatcagcg ctatctctgc   10860
tctcactgcc gtaaaacatg gcaactgcag ttcacttaca cgccttctca acccggtacg  10920
caccagaaaa tcattgatat ggccatgaat ggcgttggat gccgggcaac agcccgcatt  10980
atgggcgttg gcctcaacac gattttacgt cacttaaaaa actcaggccg cagtcggtaa  11040
ctatgcggtg tgaaataccg cacagatgcg taaggagaaa ataccgcatc aggcgctctt  11100
ccgcttcctc gctcactgac tcgctgcgct cggtcgttcg gctgcggcga gcggtatcag  11160
ctcactcaaa ggcggtaata cggttatcca cagaatcagg ggataacgca ggaaagaaca  11220
tgtgagcaaa aggccagcaa aaggccagga accgtaaaaa ggccgcgttg ctggcgtttt  11280
tccataggct ccgcccccct gacgagcatc acaaaaatcg acgctcaagt cagaggtggc  11340
gaaacccgac aggactataa agataccagg cgtttccccc tggaagctcc ctcgtgcgct  11400
ctcctgttcc gaccctgccg cttaccggat acctgtccgc ctttctccct tcgggaagcg  11460
tggcgctttc tcatagctca cgctgtaggt atctcagttc ggtgtaggtc gttcgctcca  11520
agctgggctg tgtgcacgaa ccccccgttc agcccgaccg ctgcgcctta tccggtaact  11580
atcgtcttga gtccaacccg gtaagacacg acttatcgcc actggcagca gtaacctcg    11640
cgcatacagc cggcagtga gctcatcgtc tgcgcggaaa tggacgggcc cccggcgcca  11700
gatctgggga ac                                                     11712
```

```
SEQ ID NO: 6            moltype = DNA   length = 11766
FEATURE                 Location/Qualifiers
source                  1..11766
                        mol_type = other DNA
                        organism = synthetic construct
SEQUENCE: 6
cctgtggttg gcatgcacat acaaatggac gaacggataa accttttcac gcccttttaa    60
atatccgatt attctaataa acgctctttt ctcttaggtt tacccgccaa tatatcctgt   120
caaacactga tagtttgtga accatcaccc aaatcaagtt ttttggggtc gaggtgccgt   180
aaagcactaa atcggaaccc taaagggagc ccccgattta gagcttgacg gggaaagccg   240
gcgaacgtgg cgagaaagga agggaagaaa gcgaaaggag cgggcgccat tcaggctgcg   300
caactgttgg gaagggcgat cggtgcgggc ctcttcgcta ttacgccagc tggcgaaagg   360
gggatgtgct gcaaggcgat taagttgggt aacgccaggg ttttcccagt cacgacgttg   420
taaaacgacg gccagtgaat tgttaattaa gaattcgaac tccaccgcgg aaacctcctc   480
ggattccatt gcccagctat ctgtcacttt attgagaaga tagtggaaaa ggaaggtggc   540
tcctacaaat gccatcattg cgataaagga aaggccatcg ttgaagatgc ctctgccgac   600
agtggtccca aagatggacc cccacccacg aggagcatcg tggaaaaaga agacgttcca   660
accacgtctt caaagcaagt ggattgatgt gatatctcca ctgacgtaag ggatgacgca   720
caatcccact atccttcgca agacccttcc tctatataag gaagttcatt tcatttggag   780
aggtattaaa atcttaatag gttttgataa aagcgaacgt ggggaaaccc gaaccaaacc   840
ttcttctaaa ctctctctca tctctcttaa agcaaacttc tctcttgtct ttcttgcgtg   900
agcgatcttc aacgttgtca gatcgtgctt cggcaccagt acaacgtttt ctttcactga   960
agcgaaatca aagatctctt tgtggacacg tagtgcggcg ccattaaata acgtgtactt  1020
gtcctattct tgtcggtgtg gtcttgggaa aagaaagctt gctggaggct gctgttcagc  1080
cccatacatt acttgttacg attctgctga ctttcggcgg gtgcaatatc tctacttctg  1140
cttgacgagg tattgttgcc tgtacttctt tcttcttctt ccttgctgatt ggttctataa  1200
gaaatctagt atttctttg aaacagagtt ttcccgtgtt tttcgaactt ggagaaagat  1260
tgttaagctt ctgtatattc tgcccaaatt cgcgatggag caaaacttgt ttgcccttc   1320
tttgatgat acaagctcag ttcgtggttc tttgcttgac acaaaattcg cacaaactcg  1380
agttttgttg tccaaggcta tggctggtgg tgatgtgtta ttggatgagt atctctatga  1440
tgtggtcaat ggacaagatt ttagagctac tgtcgctttt ttgcgcaccc atgttataac  1500
aggcaaaata aaggtgacag ctaccaccaa catttctgac aactcgggtt gttgtttgat  1560
gttggccata aatagtggtg tgaggggtaa gtatagtact gatgtttata ctatctgctc  1620
tcaagactcc atgacgtgga acccagggtg caaaaagaac ttctcgttca catttaatcc  1680
aaacccttgt ggggattctt ggtctgctga gatgataagt cgaagcagag ttaggatgac  1740
agttatttgt gtttcgggat ggaccttatc tcctaccaca gatgtgattg ccaagctaga  1800
ctggtcaatt gtcaatgaga atgtgagcc caccatttac cacttggctg attgtcagaa   1860
ttggttaccc cttaatcgtt ggatgggaaa attgacttttt ccccagggtg tgacaagtga  1920
ggttcgaagg atgcctcttt ctataggagg cggtgctggt gcgactcaag cttcttggc   1980
caatatgccc aattcatgga tatcaatgtg gagatatttt agaggtgaac ttcactttga  2040
agttactaaa atgagctctc catatattaa agccactgtt acatttctca tagcttttgg  2100
taatcttagt gatgcctttg gttttatga gagttttcct catagaattg ttcaatttgc  2160
tgaggttgag gaaaaatgta cttttggtttt ctcccaacaa gagtttgtca ctgcttggtc  2220
aacacaagta aaccccagaa ccacacttga agcagatggt tgtccctacc tatatgcaat  2280
tattcatgat agtacaacag gtacaatctc cggagatttt aatcttgggg tcaagcttgt  2340
tggcattaag gattttgtg gtataggttc taatccgggt attgatggtt cccgcttgct  2400
tggagctata gcacaaggac ctgtttgtgc tgaagcctca gatgtgtata gcccatgtat  2460
gatagctagc actcctcctg ctgattctcg tcttttctaag gttgctcctg ttattaaggc  2520
tagaatgatg gaagatccat tttcagacgt cacagcagta acttttgact taatcaacgg  2580
caaaataact cctgttggtg atgacaattg gaatacgcac atttataatc ctccaattat  2640
gaattgtcttg cgtactgctg cttggaaatc tggaactatt catgttcaac ttaatgttag  2700
gggtgctggt gtcaaaagag cagattggga tggtcaagtc tttgtttacc tgcgccagtc  2760
catgaaccct gaaagttatg atgcgcggac atttgtgatc tcacaacctg gttctgccat  2820
gttgaacttc tcttttgata tcataggggcc gaatagcgga tttgaatttg ccgaaagccc  2880
atgggccaat cagaccacct ggtatcttga atgtgttgct accaatccca gacaaaataca  2940
gcaatttgag gtcaacatgc gcttcgatcc taatttcagg gttgccggca atatcctgat  3000
gccccattt ccactgtcaa cggaaactcc accgttatta aagttaggt tcgggatat   3060
tgaacgctcc aagcgtagtg ttatggttgg acacactgct actgctgctt agtcgaggcc  3120
tttaactctg gtttcattaa attttcttta gtttgaattt actgttattc ggtgtgcatt  3180
tctatgtttg gtgagcggtt ttctgtgctc agagtgtgtt tatttttatgt aatttaattt  3240
ctttgtgagc tcctgtttag caggtcgtcc cttcagcaag gacacaaaaa gatttttaatt  3300
ttattaaaaa aaaaaaaaaa aaagaccggg aattcgatat caagcttatc gacctgcaga  3360
tcgttcaaac atttggcaat aaagtttctt aagattgaat cctgttgccg gtcttgcgat  3420
gattatcata taatttctgt tgaattacgt taagcatgta ataattaaca tgtaatgcag  3480
gacgttattt atgagatggg tttttatgat tagagtcccg caattataca tttaatacgc  3540
gatagaaaac aaaatatagc gcgcaaacta ggataaatta tcgcgcgcgg tgtcatctat  3600
gttactagat ctctagagtc tcaagcttgg cgcgccagct tggcgtaatc atggtcatag  3660
ctgttgcgat taagaattcg agctcggtac ccccctactc caaaaatgtc aaagatacag  3720
tctcagaaga ccaaagggct attgagactt ttcaacaaag ggtaaatttcg ggaacctct   3780
tcggattcca ttgcccagct atctgtcact tcatcgaaag gacagtagaa aaggaagggtg  3840
gctcctacaa atgccatcat tgcgataaag gaaaggctat cattcaagat gcctctgccg  3900
acagtggtcc caagatgga cccccaccca cgaggagcat cgtggaaaaa gaagacgttc  3960
caaccacgtc ttcaaagcaa gtggattgat gtgacatctc cactgacgta agggatgacg  4020
cacaatccca ctatccttcg caagaccctt cctctatata aggaagttca tttcatttgg  4080
agaggacagc ccaagcttcg actctagagg atcccctaa atcgatatgg aacgagtat  4140
acaaggaaac gacgctaggg aacaagctaa cagtgaacgt tggatggag atcaggagg  4200
taccacttct cccttcaaac ttcctgacga agtccgagt tggactgagt ggcggctaca  4260
taacgatgag acgaattcga atcaagataa tccccttggt ttcaaggaaa gctggggttt  4320
cgggaaagtt gtatttaaga gatatctcag atacgacagg acgaagctt cactgcacag  4380
```

```
agtccttgga tcttggacgg gagattcggt taactatgca gcatctcgat tttttcggttt    4440
cgaccagatc ggatgtacct atagtattcg gtttcgagga gttagtatca ccgtttctgg    4500
agggtctcga actcttcagc atctctgtga gatggcaatt cggtctaagc aagaactgct    4560
acagcttgcc ccaatcgaag tggaaagtaa tgtatcaaga ggatgccctg aaggtactga    4620
gaccttcgaa aaagaaagcg agtaagggga gctcgaattc gctgaaatca ccagtctctc    4680
tctacaaatc tatctctctc tattttctcc ataaataatg tgtgagtagt ttcccgataa    4740
gggaaattag ggttcttata gggtttcgct catgtgttga gcatataaga aacccttagt    4800
atgtatttgt atttgtaaaa tacttctatc aataaaattt ctaattccta aaaccaaaat    4860
ccagtactaa aatccagatc tcctaaagtc cctatagatc tttgtcgtga atataaacca    4920
gacacgagac gactaaacct ggagcccaga cgccgttcga agctagaagt accgcttagg    4980
caggaggccg ttagggaaaa gatgctaagg cagggttggt tacgttgact cccccgtagg    5040
tttggtttaa atatgatgaa gtggacgaaa ggaaggagga agacaaggaa ggataaggtt    5100
gcaggccctg tgcaaggtaa gaagatggaa atttgataga ggtacgctac tatacttata    5160
ctatacgcta agggaatgct tgtatttata ccctataccc cctaataacc ccttatcaat    5220
ttaagaaata atccgcataa gcccccgctt aaaaattggt atcagagcca tgaataggtc    5280
tatgaccaaa actcaagagg ataaaacctc accaaaatac gaaagagttc ttaactctaa    5340
agataaaaga tggcgcgtgg ccggcctaca gtatgagcgg agaattaagg gagtcacgtt    5400
atgacccccg ccgatgacgc gggacaagcc gttttacgtt tggaactgac agaaccgcaa    5460
cgttgaagga gccactcagc cgcgggtttc tggagtttaa tgagctaagc acatacgtca    5520
gaaaccatta ttgcgcgttc aaaagtcgcc taaggtcact atcagcatgc aaatatttct    5580
tgtcaaaaat gctccactga cgttccataa attccctcg gtatccaatt agagtctcat    5640
attcactctc aatccaaata atctgcaccg gatctggatc gtttcgcatg attgaacaag    5700
atggattgca cgcaggttct ccggccgctt gggtggagag gctattcggc tatgactggg    5760
cacaacagac aatcggctgc tctgatgccg ccgtgttccg gctgtcagcg caggggcgcc    5820
cggttctttt tgtcaagacc gacctgtccg gtgccctgaa tgaactgcag gacgaggcag    5880
cgcggctatc gtggctggcc acgacgggcg ttccttgcgc agctgtgctc gacgttgtca    5940
ctgaagcggg aagggactgg ctgctattgg gcgaagtgcc ggggcaggat ctcctgtcat    6000
ctcaccttgc tcctgccgag aaagtatcca tcatggctga tgcaatgcgg cggctgcata    6060
cgcttgatcc ggctacctgc ccattcgacc accaagcgaa acatcgcatc gagcgagcac    6120
gtactcggat ggaagccggt cttgtcgatc aggatgatct ggacgaagag catcagggc    6180
tcgcgccagc cgaactgttc gccaggctca aggcgcgcat gcccgacggc gatgatctcg    6240
tcgtgaccca tggcgatgcc tgcttgccga atatcatggt ggaaaatggc cgcttttctg    6300
gattcatcga ctgtggccgg ctgggtgtgg cggaccgcta tcaggacata gcgttggcta    6360
cccgtgatat tgctgaagag cttggcggcg aatgggctga ccgcttcctc gtgctttacg    6420
gtatcgccgc tcccgattcg cagcgcatcg ccttctatcg ccttcttgac gagttcttct    6480
gagcgggact ctgggttcg aaatgaccga ccaagcgacg cccaacctgc catcacgaga    6540
tttcgattcc accgccgcct tctatgaaag gttgggcttc ggaatcgttt tccgggacgc    6600
cggctggatg atcctccagc gcggggatct catgctggag ttcttcgccc acgggatctc    6660
tgcggaacag gcggtcgaag gtgccgatat cattacgacg acaggccg acaagccaca    6720
cgccacgatc ctgagcgaca atatgatcgc ggcgtccaca tcaacggcgt cggcggcgac    6780
tgcccaggca agaccgagat gcaccgcgat atcttgctgc gttcggatat tttcgtggag    6840
ttcccgccac agacccggat gatccccgat cgttcaaaca tttggcaata agtttcttaa    6900
agattgaatc ctgttgccgg tcttgcgatg attatcatat aatttctgtt gaattacgtt    6960
aagcatgtaa taattaacat gtaatgcatg acgttattta tgagatgggt ttttatgatt    7020
agagtcccgc aattatacat ttaatacgcg atagaaaaca aaatatagcg cgcaaactag    7080
gataaattat cgcgcgcggt gtcatctatg ttactagatc gggactgtag gccggccctc    7140
actggtgaaa agaaaaacca cccagtaca ttaaaaacgt ccgcaatgtg ttattaagtt    7200
gtctaagcgt caatttgttt acaccacaat atatcctgcc accagccagc caacagctcc    7260
ccgaccggca gctcggcaca aaatcaccac tcgatacagg cagcccatca gtccgggacg    7320
gcgtcagcgg gagagccgtt gtaaggcggc agactttgct catgttaccg atgctattcg    7380
gaagaacggc aactaagctg ccgggtttga aacacggagt atctcgcgga gggtagcatg    7440
ttgattgtaa cgatgacaga gcgttgctgc ctgtgatcaa atatcatctc cctcgcagag    7500
atccgaatta tcagccttct tattcatttc tcgcttaacc gtgacagagt agacaggctg    7560
tctcgcggcc gagggggcgca gcccctgggg gggatgggag gccgcgttta gcgggccggg    7620
aggggttcgag aagggggggc acccccttc ggcgtgccgg gtcacgcca cagggcgcag    7680
ccctggttaa aaacaaggtt tataaatatt ggtttaaaag caggttaaaa gacaggttag    7740
cggtggccga aaaacgggcg gaaaccttg caaatgctgg atttttctgcc tgtgacagc    7800
ccctcaaatg tcaataggtg cgcccctcat ctgtcagcac tctgccctc aagtgtcaag    7860
gatccgcgcc ctcatctgtc agtagtcgcg ccctccaagt gtcaataccg cagggcactt    7920
atccccaggc ttgtccacat catcctgtggg aaactcgcgt aaaatcaggc gtttcgccg    7980
atttgcgagg ctgccagct ccacgtcgcc ggccgaaatc gagcctgccc ctcatctgtc    8040
aacgccgcgc cggtgagtc ggcccctcaa gtgtcaacgt ccgcccctca tctgtcagtg    8100
agggccaagt tttccgcgag gtatccacaa cgccggcggc cgcggtgtct cgcacacggc    8160
ttcgacggcg ttttctggcgc gtttgcaggg ccatagacgg ccgccagcc agcggcgagg    8220
gcaaccagcc cggtgagcgt cggaaaggcg ctcggtcttg ccttgctcgt cggtgatgta    8280
cactagtcgc tggctgctga accccagcc ggaactgacc ccacaaggcc ctagcgtttg    8340
caatgcacca ggtcatcatt gacccaggcg tgttccacca ggccgctgcc tcgcaactct    8400
tcgcaggctt cgccgacctg ctcgcgccac ttcttcacgc gggtggaatc cgatccgcac    8460
atgaggcgga aggtttccag cttggcgggg tacggctccc ggtgcgagct gaaatagtcg    8520
aacatccgtc gggccgtcgg cgacagcttg cggtacttct cccatatgaa tttcgtgtag    8580
tggtcgccag caaacagcac gacgatttcc tcgtcgatca ggacctggca acgggacgtt    8640
ttcttgccac ggtccaggac gcggaagcgg tgcagcagcg acaccgattc caggtgccca    8700
acgcggtcgg acgtgaagcc catcgccgtc gcctgtaggc gcgacaggca ttcctcggcc    8760
ttcgtgtaat accggccatt gatcgaccag ccaggtcct ggcaaagctc gtagaacgtg    8820
aaggtgatcg gctcgccgat aggggtgcgc ttcgcgtact ccaacacctg ctgccacacc    8880
agttcgtcat cgtcggcccg cagctcgacg ccggtgtagg tgatcttcac gtccttgttg    8940
acgtggaaaa tgaccttgtt ttgcagcgcc tcgcgcggga tttcttgtt gcgcgtggtg    9000
aacagggcag agcgggccgt gtcgtttggc atcgctcgca tcgtgtccgg ccacggcgca    9060
atatcgaaca aggaaagctg catttccttg atctgctgct tcgtgtgttt cagcaacgcg    9120
```

-continued

```
gcctgcttgg cctcgctgac ctgttttgcc aggtcctcgc cggcggtttt tcgcttcttg    9180
gtcgtcatag ttcctcgcgt gtcgatggtc atcgacttcg ccaaacctgc cgcctcctgt    9240
tcgagacgac gcgaacgctc cacggcggcc gatggcgcgg gcagggcagg gggagccagt    9300
tgcacgctgt cgcgctcgat cttggccgta gcttgctgga ccatcgagcc gacggactgg    9360
aaggtttcgc ggggcgcacg catgacggtg cggcttgcga tggtttcggc atcctcggcg    9420
gaaaaccccg cgtcgatcag ttcttgcctg tatgccttcc ggtcaaacgt ccgattcatt    9480
caccctcctt gcgggattgc cccgactcac gccggggcaa tgtgcccctta ttcctgattt   9540
gacccgcctg gtgccttggt gtccagataa tccaccttat cggcaatgaa gtcggtcccg    9600
tagaccgtct ggccgtcctt ctcgtacttg gtattccgaa tcttgccctg cacgaataccc   9660
agcgaccct tgcccaaata cttgccgtgg gcctcggcct gagagccaaa acacttgatg     9720
cggaagaagt cggtgcgctc ctgcttgtcg ccggcatcgt tgcgcacat ctaggtacta     9780
aaacaattca tccagtaaaa tataatattt tattttctcc caatcaggct tgatcccag     9840
taagtcaaaa aatagctcga cactgttc ttccccgata tcctccctga tcgaccggac     9900
gcagaaggca atgtcatacc acttgtccgc cctgccgctt ctcccaagat caataaagcc    9960
acttactttg ccatctttca caaagatgtt gctgtctccc aggtcgccgt ggggaaaagac  10020
aagttcctct tcgggctttt ccgtctttaa aaaatcatac agctcgcgcg gatctttaaa   10080
tggagtgtct tcttcccagt tttcgcaatc cacatcggcc agatcgttat tcagtaagta   10140
atccaattcg gctaagcggc tgtctaagct attcgtatag ggacaatccg cgctcgtgat   10200
ggagtgaaag agcctgatgc actccgcata cagctcgata atcttttcag ggcttttgttc  10260
atcttcatac tcttccgagc aaaggacgcc atcggcctca ctcatgagca gattgctcca   10320
gccatcatgc cgttcaaagt gcaggacctt tggaacaggc agctttcctt ccagccatag   10380
catcatgtcc ttttcccgtt ccacatcata ggtggtccct ttataccggc tgtccgtcat   10440
tttttaaatat aggttttcat tttctcccac cagcttatat accttagcag gagacattcc   10500
ttccgtatct tttacgcagc ggtatttttc gatcagtttt ttcaattccg gtgatattct   10560
cattttagcc atttattatt tccttcctct tttctacagt atttaaagat accccaagaa   10620
gctaattata acaagacgaa ctccaattca ctgttcctg cattctaaaa ccttaaatac    10680
cagaaaacag ctttttcaaa gttgttttca aagttggcgt ataacatagt atcgacggag   10740
ccgattttga aaccacaatt atgggtgatg ctgccaactt actgatttag tgtatgatgg   10800
tgttttttgag gtgctccagt ggcttctgtt tctatcagct gtccctcctg ttcagctact   10860
gacggggtgg tgcgtaacgg caaaagcacc gccggacatc agcgctatct ctgctctcaa   10920
tgccgtaaaa catggcaact gcagttcact tacaccgctt ctcaacccgg tacgcaccag   10980
aaaatcattg atatgccat gaatggcgtt ggatgccggg caacagcccg cattatgggc     11040
gttggcctca cacgatttt acgtcactta aaaaactcag gccgcagtcg gtaactatgc    11100
ggtgtgaaat accgcacaga tgcgtaagga gaaaataccg catcaggcgc tcttccgctt   11160
cctcgctcac tgactcgctg cgctcggtcg ttcggctgcg gcgagcggta tcagctcact   11220
caaaggcggt aatacggtta tccacagaat caggggataa gcaggaaag aacatgtgag    11280
caaaaggcca gcaaaaggcc aggaaccgta aaaaggccgc gttgctggcg tttttccata   11340
ggctccgccc cctgacgag catcacaaaa atcgacgctc aagtcagagg tggcgaaacc    11400
cgacaggact ataaagatac caggcgtttc ccctgaagc ctcctcgtg cgctctcctg     11460
ttccgaccct gccgcttacc ggatacctgt ccgcctttct cccttcggga agcgtggcgc   11520
tttctcatag ctcacgctgt aggtatctca gttcggtgta ggtcgttcgc tccaagctgg   11580
gctgtgtgca cgaaccccccc gttcagcccg accgctgcgc cttatccggt aactatcgtc   11640
ttgagtccaa cccggtaaga cacgacttat cgccactggc agcaggtaac ctcgcgcata   11700
cagccgggca gtgagctcat cgtctgcgcg gaaatggacg ggccccggc gccagatctg    11760
gggaac                                                              11766
```

SEQ ID NO: 7        moltype = DNA  length = 10576
FEATURE               Location/Qualifiers
source                1..10576
                        mol_type = other DNA
                        organism = synthetic construct
SEQUENCE: 7

```
cctgtggttg gcatgcacat acaaatggac gaacggataa accttttcac gcccttttaa      60
atatccgatt attctaataa acgctctttt ctcttaggtt tacccgccaa tatatcctgt     120
caaacactga tagtttgtga accatcaccc aaatcaagtt ttttgggtgt gaggtgccgt     180
aaagcactaa atcggaaccc taaagggagc cccgatttta gagcttgacg gggaaagccg    240
gcgaacgtgg cgagaaagga agggaagaaa gcgaaaggag cggcgccat tcaggctgcg     300
caactgttgg gaagggcgat cggtgcgggc ctcttcgcta ttacgccagc tggcgaaagg    360
gggatgtgct gcaaggcgat taagttgggt aacgccaggt tttcccagt cacgacgttg    420
taaaacgacg gccagtgaat tgttaattaa gaattcgagc tccaccgcgg aaacctcctc    480
ggattccatt gcccagctat ctgtcacttt attgagaaga tagtggaaaa ggaaggtggc    540
tcctacaaat gccatcattg cgataaagga aaggccatcg ttgaagatgc ctctgccgac    600
agtggtccca aagatggacc cccacccacg aggagcatcg tggaaaaaga agacgttcca    660
accacgtctt caaagcaagt ggattgatgt gatatctcca ctgacgtaag ggatgacgca    720
caatcccact atccttcgca agaccccttcc tctatataag gaagttcatt tcatttggag    780
aggtattaaa atcttaatag gttttgataa aagcgaacgt ggggaaaccc gaaccaaacc    840
ttcttctaaa ctctctctca tctctcttaa agcaaacttc tctcttgtct ttcttgcgtg    900
agcgatcttc aacgttgtca gatcgtgctt cggcaccagt acaacgtttt ctttcactga    960
agcgaaatca aagatctctt tgtggacacg tagtgcgacg ccattaaata acgtgtactt   1020
gtcctattct tgtcggtgtg gtcttggaa aagaaagctt gctggaggct gctgttcagc    1080
cccatacatt acttgttacg attctgctga ctttcggcgg gtgcaatatc tctacttctg   1140
cttgacgagg tattgttgcc tgtacttctt tcttcttctt cttgctgatt ggttctataa   1200
gaaatctagt attttcttg aaacagagtt ttcccgtggt tttcgaactt ggagaaagat    1260
tgttaagctt ctgtatattc tgcccaaatt cgcgatgtct ttggatcaga gtagtgtttg   1320
tatcatgtcc aagtgtaggg ctaatctggt ttttggaggc actaatttgc aaatagtcat   1380
ggtaccagga agacgctttt tggcatgcaa acatttcttc acccacataa agaccaaatt   1440
gcgtgtggaa atagttatgg atggaagaag gtactatcat caatttgatc ctgcaaatat   1500
ttatgatata cctgattctg agttggtctt gtactcccat cctagcttgg aagacgtttc   1560
ccattccttgc tgggatctgt tctgttggga cccagacaaa gaattgcctt cagtatttgg   1620
```

-continued

```
agcggatttc ttgagttgta aatacaacaa gtttggggt ttttatgagg cgcaatatgc 1680
tgacatcaaa gtgcgcacaa agaaagaatg ccttaccata cagagtggta attatgtgaa 1740
caaggtgtct cgctatcttg agtatgaagc tcctactatc cctgaggatt gtggatctct 1800
tgtgatagca cacattggtg ggaagcacaa gattgtgggt gttcatgttg ctggtattca 1860
aggtaagata ggatgtgctt ccttattgcc accattggag ccaatagcac aagcgcaata 1920
gctcgaggcc tttaactctg gtttcattaa attttcttta gtttgaattt actgttattc 1980
ggtgtgcatt tctatgtttg gtgagcggtt ttctgtgctc agagtgtgtt tattttatgt 2040
aatttaattt ctttgtgagc tcctgtttag caggtcgtcc cttcagcaag gacacaaaaa 2100
gatttaatt ttattaaaaa aaaaaaaaaa aaagaccggg aattcgatat caagcttatc 2160
gacctgcaga tcgttcaaac atttggcaat aaagtttctt aagattgaat cctgttgccg 2220
gtcttgcgat gattatcata taatttctgt tgaattacgt taagcatgta ataattaaca 2280
tgtaatgcat gacgttattt atgagatggg tttttatgat tagagtcccg caattataca 2340
tttaatacgc gatagaaaac aaaatatagc gcgcaaacta ggataaatta tcgcgcgcgg 2400
tgtcatctat gttactagat ctctagagtc tcaagcttgg cgcgccagct tggcgtaatc 2460
atggtcatag ctgttgcgat taagaattcg agctcggtac cccctactc caaaaatgtc 2520
aaagatacag tctcagaaga ccaaagggct attgagactt tcaacaaag gtaatttcg 2580
ggaaacctcc tcggattcca ttgcccagct atctgtcact tcatcgaaag acagtagaa 2640
aaggaaggtg gctcctacaa atgccatcat tgcgataaag gaaaggctat cattcaagat 2700
gcctctgccg acagtggtcc caaagatgga ccccacccca cgaggagcat cgtgaaaaaa 2760
gaagacgttc caaccacgtc ttcaaagcaa gtggattgat gtgacatctc cactgacgta 2820
agggatgacg cacaatccca ctatccttcg caagacccct cctctatata aggaagttca 2880
tttcatttgg agaggacagc ccaagcttcg actctagagg atccccttaa atcgatatgg 2940
aacgagctat acaaggaaac gacgctaggg aacaagctaa cagtgaacgt tgggatggag 3000
gatcaggagg taccacttct cccttcaaac ttcctgacga aagtccgagt tggactgagt 3060
ggcggctaca taacgatgag acgaattcga atcaagataa tccccttggt ttcaaggaaa 3120
gctggggttt cgggaaagtt gtatttaaga gatatctcag atacgacagg acggaagctt 3180
cactgcacag agtccttgga tcttggacgg gagattcggt taactatgca gcatctcgat 3240
tttctcggttt cgaccagatc ggatgtacct atagtattcg gtttcgagga gttagtatca 3300
ccgtttctgg agggtctcga actcttcagc atctctgtga gatggcaatt cggtctaagc 3360
aagaactgct acagcttgcc ccaatcgaag tggaaagtaa tgtatcaaga ggatgccctg 3420
aaggtactga gaccttcgaa aaagaaagcg agtaagggga gctcgaattc gctgaaatca 3480
ccagtctctc tctacaaatc tatctctctc tattttctcc ataaataatg tgtgagtagt 3540
ttcccgataa gggaaattag ggttcttata gggtttcgct catgtgttga gcatataaga 3600
aaccctagt atgtattgt atttgtaaaa tacttctatc aataaattt ctaattccta 3660
aaaccaaaat ccagtactaa aatccagatc tcctaaagtc cctatagatc tttgtcgtga 3720
atataaacca gacacgagac gactaaacct ggagcccaga cgccgttcga agctagaagt 3780
accgcttagg caggaggccg ttagggaaaa gatgctaagg cagggttggt tacgttgact 3840
cccccgtagg tttggtttaa atatgatgaa gtggacggaa ggaaggagga agacaaggaa 3900
ggataaggtt gcaggccctg tgcaaggtaa gaagatgaa atttgataga ggtacgctac 3960
tatacttata ctatacgcta agggaatgct tgtatttata ccctataccc cctaataacc 4020
ccttatcaat ttaagaaata atccgcataa gcccccgctt aaaaattggt atcagagcca 4080
tgaataggtc tatgaccaaa actcaagagg ataaaacctc accaaaatac gaaagagttc 4140
ttaactctaa agataaaaga tggcgcgtgg ccggcctaca gtatgagcgg agaattaagg 4200
gagtcacgtt atgaccccg ccgatgacgc gggacaagcc gttttacgtt tggaactgac 4260
agaaccgcaa cgttgaagga gccactcagc cgcgggtttc tggagtttaa tgagctaagc 4320
acatacgtca gaaaccatta ttgcgcgttc aaaagtcgcc taaggtcact atcagctagc 4380
aaatatttct tgtcaaaaat gctccactga cgttccataa attccctcg gtatccaatt 4440
agagtctcat attcactctc aatccaaata atctgcaccg gatctggatc gtttcgcatg 4500
attgaacaag atggattgca cgcaggttct ccggccgctt gggtggagag gctattcggc 4560
tatgactggg cacaacagac aatcggctgc tctgatgccg ccgtgttccg gctgtcagcg 4620
caggggcgcc cggttctttt tgtcaagacc gacctgtccg gtgccctgaa tgaactgcag 4680
gacgaggcag cgcggctatc gtggctggcc acgacgggcg ttccttgcgc agctgtgctc 4740
gacgttgtca ctgaagcggg aagggactgg ctgctattgg gcgaagtgcc ggggcaggat 4800
ctcctgtcat ctcaccttgc tcctgccgag aaagtatcca tcatggctga tgcaatgcgg 4860
cggctgcata cgcttgatcc ggctacctgc ccattcgacc accaagcgaa acatcgcatc 4920
gagcgagcac gtactcggat ggaagccggt cttgtcgatc aggatgatct ggacgaagag 4980
catcaggggc tcgcgccagc cgaactgttc gccaggctca aggcgcgcat gcccgacggc 5040
gatgatctcg tcgtgaccca tggcgatgcc tgcttgccga atatcatggt ggaaaatggc 5100
cgcttttctg gattcatcga ctgtggccgg ctgggtgtgg cggaccgcta tcaggacata 5160
gcgttggcta cccgtgatat tgctgaagag cttggcggcg aatgggctga ccgcttcctc 5220
gtgctttacg gtatcgccgc tcccgattcg cagcgcatcg ccttctatcg ccttcttgac 5280
gagttcttct gagcgggact ctggggttcg aaatgaccga ccaagcgacg cccaacctgc 5340
catcacgaga tttcgattcc accgccgcct tctatgaaag gttgggcttc ggaatcgttt 5400
tccggggtcgc cggctggatg atcctccagc gcggggatct catgctggag ttcttcgccc 5460
acgggatctc tgcggaacag gcggtcgaag gtgccgatat cattacgaca gcaacgccgc 5520
acaagcacaa cgccacgatc ctgagcgaca atatgatcgc ggcgtccaca tcaacggcgt 5580
cggcggcgac tgcccaggca agaccgagat gcaccgcgat atcttgctgc gttcggatat 5640
tttcgtggag ttccgccac agaccgggat gatcccgat cgttcaaaca tttggcaata 5700
aagtttctta agattgaatc ctgttgccgg tcttgcgccg tcttgcatat attatctgtt 5760
gaattacgtt aagcatgtaa taattaacat gtaatgcatg acgttattta tgagatgggt 5820
ttttatgatt agagtcccgc aattatacat ttaatacgcg atagaaaaca aaatatagcg 5880
cgcaaactag gataaattat cgcgcgcggt gtcatctatg ttactagatc gggactgtag 5940
gccggccctc actggtgaaa agaaaaacca cccagtacga ttaaaacgt ccgcaatgtg 6000
ttattaagtt gtctaagcgt caatttgttt acaccacaat atatcctgcc accagccacg 6060
caacagctcc ccgaccggca gctcggcaca aaatcaccac tcgatacagg cagcccatca 6120
gtccgggacg gcgtcagcgg gagagccgtt gtaaggcggc agactttgct catgttaccg 6180
atgctattcg gaagaacggc aactaagctg ccgggtttga aacacggatg atctcgcgga 6240
gggtagcatg ttgattgtaa cgatgacaga gcgttgctgc ctgtgatcaa atatcatctc 6300
cctcgcagag atccgaatta tcagccttct tattcatttc tcgcttaacc gtgacagagt 6360
```

```
agacaggctg tctcgcggcc gaggggcgca gcccctgggg gggatgggag gcccgcgtta   6420
gcgggccggg agggttcgag aaggggggc acccccccttc ggcgtgcgcg gtcacgcgca   6480
cagggcgcag ccctggttaa aaacaaggtt tataaatatt ggtttaaaag caggttaaaa   6540
gacaggttag cggtggccga aaaacgggcg gaaaccccttg caaatgctgg attttctgcc   6600
tgtggacagc ccctcaaatg tcaataggtg cgcccctcat ctgtcagcac tctgcccctc   6660
aagtgtcaag gatcgcgccc ctcatctgtc agtagtcgcg cccctcaagt gtcaataccg   6720
cagggcactt atccccaggc ttgtccacat catctgtggg aaactcgcgt aaaatcaggc   6780
gttttcgccg atttgcgagg ctggccagct ccacgtcgcc ggccgaaatc gagcctgccc   6840
ctcatctgtc aacgccgcgc cgggtgagtc ggccctcaa gtgtcaacgt ccgcccctca   6900
tctgtcagtg agggccaagt tttccgcgag gtatccacaa cgccggcggc cgcggtgtct   6960
cgcacacggc ttcgacggcg tttctggcgc gtttgcaggg ccatagacgg ccgccagccc   7020
agcggcgagg gcaaccagcc cggtgagcgt cggaaaggcg ctcggtcttg ccttgctcgt   7080
cggtgatgta cactagtcgc tggctgctga accccccagcc ggaactgacc ccacaaggcc   7140
ctagcgtttg caatgcacca ggtcatcatt gacccaggcg tgttccacca ggccgctgcc   7200
tcgcaactct tcgcaggctt cgccgacctg ctcgcgccac ttcttcacgc gggtggaatc   7260
cgatccgcac atgaggcgga aggtttccag cttgagcggg tacggctccc ggtgcgagct   7320
gaaatagtcg aacatccgtc gggccgtcgg cgacagcttg cggtacttct cccatatgaa   7380
tttcgtgtag tggtcgccag caaacagcac gacgatttcc tcgtcgatca ggacctggca   7440
acgggacgtt tccttgccac ggtccaggac gcggaagcgg tgcagcagcg acaccgattc   7500
caggtgccca acgcggtcgg acgtgaagcc catcgccgtc gcctgtaggc gcgacaggca   7560
ttcctcggcc ttcgtgtaat accggccatt gatcgaccag cccaggtcct ggcaaagctc   7620
gtagaacgtg aaggtgatcg gctcgccgat aggggtgcgc ttcgcgtact ccaacacctg   7680
ctgccacacc agttcgtcat cgtcggcccg cagctcgacg ccggtgtagg tgatcttcac   7740
gtccttgttg acgtggaaaa tgaccttgtt ttgcagcgcc tcgcgcggga ttttcttgtt   7800
gcgcgtggtg aacagggcag agcgggccgt gtcgtttggc atcgctcgca tcgtgtccgg   7860
ccacggcgca atatcgaaca aggaaagctg catttccttg atctgctgct tcgtgtgttt   7920
cagcaacgcg gcctgcttgg cctcgctgac ctgttttgcc aggtcctcgc cggcggtttt   7980
tcgcttcttg gtcgtcatag ttcctcgcgt gtcgatggtc atcgacttcg ccaaacctgc   8040
cgcctcctgt tcgagacgac gcgaacgctc cacggcggcc gatggcgcgg gcagggcagg   8100
gggagccagt tgcacgctgt cgcgctcgat cttggccgta gcttgctgga ccatcgagcc   8160
gacgactgg aaggtttcgc ggggcgcacg catgacggtg cggcttgcga tggtttcggc   8220
atcctcggcg gaaaacccg cgtcgatcag ttcttgcctg tatgccttcc ggtcaaacgt   8280
ccgattcatt caccctcctt gcgggattgc cccgactcac gccggggcaa tgtgcccta   8340
ttcctgattt gacccgcctg gtgccttggt gtccagataa tccaccttat cggcaatgaa   8400
gtcggtcccg tagaccgtct ggccgtcctt ctcgtacttg gtattccgaa tcttgccctg   8460
cacgaatacc agcgaccct tgcccaaata cttgccgtgg gcctcggcct gagagcaaa   8520
acacttgatg cggaagaagt cggtgcgctc ctgcttgtcg ccggcatcgt tgcgccacat   8580
ctaggtacta aaacaattca tccagtaaaa tataatattt tattttctcc caatcaggct   8640
tgatccccag taagtcaaaa aatagctcga catactgttc ttccccgata tcctccctga   8700
tcgaccggac gcagaaggca atgtcatacc acttgtccgc cctgccgctt ctcccaagat   8760
caataaagcc acttactttg ccatctttca caaagatgtt gctgtctccc aggtcgccgt   8820
gggaaaagac aagttcctct tcgggctttt ccgtctttaa aaaatcatac agctcgcgcg   8880
gatctttaaa tggagtgtct tcttcccagt tttcgcaatc cacatcggcc agatcgttat   8940
tcagtaagta atccaattcg gctaagcggc tgtctaagct attcgtatag gacaatccg   9000
atatgtcgat ggagtgaaag agcctgatgc actccgcata cagctcgata atcttttcag   9060
ggctttgttc atcttcatac tcttccgagc aaaggacgcc atcggcctca ctcatgagca   9120
gattgctcca gccatcatgc cgttcaaagt gcaggaccttt tggaacaggc agcttttcctt   9180
ccagccatag catcatgtcc ttttcccgtt ccacatcata ggtggtccct ttataccgga   9240
tgtccgtcat ttttaaatat aggttttcat tttctcccac cagcttatat accttagcag   9300
gagacattcc ttccgtatct tttacgcagc ggtatttttc gatcagtttt ttcaattccg   9360
gtgatattct cattttagcc atttattatt tccttcctct tttctacagt atttaaagat   9420
accccaagaa gctaattata acaagacgaa ctccaattca ctgttccttg cattctaaaa   9480
ccttaaatac cagaaaacag cttttttcaaa gttgttttca aagttggcgt ataacatagt   9540
atcgacggag ccgattttga aaccacaatt atgggtgatg ctgccaactt actgatttag   9600
tgtatgatgg tgtttttgag gtgctccagt ggcttctgtt tctatcagct gtccctcctg   9660
ttcagctact gacggggtgg tgcgtaacgg caaaagcacc gccggacatc agcgctatct   9720
ctgctctcac tgccgtaaaa catggcaact gcagttcact tacaccgctt ctcaacccgg   9780
tacgcaccag aaaatcattg atatggccat gaatggcgtt ggatgccggg caacagcccg   9840
cattatgggc gttggcctca acacgatttt acgtcactta aaaaactcag gccgcagtcg   9900
gtaactatgc ggtgtgaaat accgcacaga tgcgtaagga gaaataccg catcaggcgc   9960
tcttccgctt cctcgctcac tgactcgctg cgctccggtcg ttcggctgcg gcgagcggta  10020
tcagctcact caaaggcggt aatacggtta tccacagaat caggggataa cgcaggaaag  10080
aacatgtgag caaaaggcca gcaaaaggcc aggaaccgta aaaaggccgc gttgctggcg  10140
ttttccata ggctccgccc ccctgacgag catcacaaaa atcgacgctc aagtcagagg  10200
tggcgaaacc cgacaggact ataaagatac caggcgtttc cccctggaag ctccctcgtg  10260
cgctctcctg ttccgaccct gccgcttacc ggatacctgt ccgcctttct cccttcggga  10320
agcgtggcgc tttctcatag ctcacgctgt aggtatctca gttcggtgta ggtcgttcgc  10380
tccaagctgg gctgtgtgca cgaaccccc gttcagccccg accgctgcgc cttatccggt  10440
aactatcgtc ttgagtccaa cccggtaaga cacgacttat cgccactggc agcaggtaac  10500
ctcgcgcata cagccgggca gtgacgtcat cgtctgcgcg gaaatggacg ggcccccggc  10560
gccagatctg gggaac                                                   10576
```